United States Patent [19]
Huettner et al.

[11] 4,133,030
[45] Jan. 2, 1979

[54] CONTROL SYSTEM PROVIDING FOR THE TRANSFER OF DATA IN A COMMUNICATIONS PROCESSING SYSTEM EMPLOYING CHANNEL DEDICATED CONTROL BLOCKS

[75] Inventors: Robert E. Huettner, Acton, Mass.; John P. Grandmaison, Hampton, N.H.; John H. Vernon, Milford, Mass.; Richard A. Lemay, Bolton, Mass.; Edward Beauchemin, Marlboro, Mass.

[73] Assignee: Honeywell Information Systems Inc., Waltham, Mass.

[21] Appl. No.: 760,773

[22] Filed: Jan. 19, 1977

[51] Int. Cl.² .................... G06F 3/00; G06F 13/00
[52] U.S. Cl. .................................................. 364/200
[58] Field of Search ... 364/200 MS File, 900 MS File; 444/1

[56] References Cited
U.S. PATENT DOCUMENTS

| | | | |
|---|---|---|---|
| 4,025,901 | 5/1977 | Bachman et al. | 364/200 |
| 4,028,668 | 6/1977 | Riikonen | 364/200 |

*Primary Examiner*—Melvin B. Chapnick
*Attorney, Agent, or Firm*—John S. Solakian; Nicholas Prasinos; Ronald T. Reiling

[57] ABSTRACT

Data is transferred between a main memory in a data processing system and communication channels under the control of communications control blocks provided in an auxiliary memory, each of which control blocks includes a starting address, range and status information so as to enable the transfer of data to data blocks included in the main memory as indicated by the starting address in the control blocks. A predetermined number of control blocks is allocated in the auxiliary memory for each communications channel and the transfer of all such data is performed utilizing as many of the predetermined number of control blocks as required for the channel until the transfer is complete as indicated by the last such control block utilized in the transfer. Control blocks are loaded in the auxiliary memory under control of the central processor of the system and are periodically accessed by the processor to determine the status of data transfer operations. Circuits are provided for preventing the loading in the auxiliary memory of more than the predetermined number of control blocks for a channel and for preventing the execution of a status inquiry for a channel when no control blocks for that channel are in the active state.

14 Claims, 21 Drawing Figures

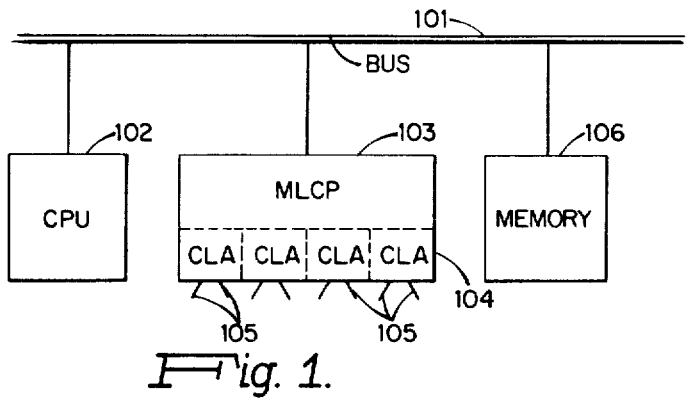

Fig. 1.

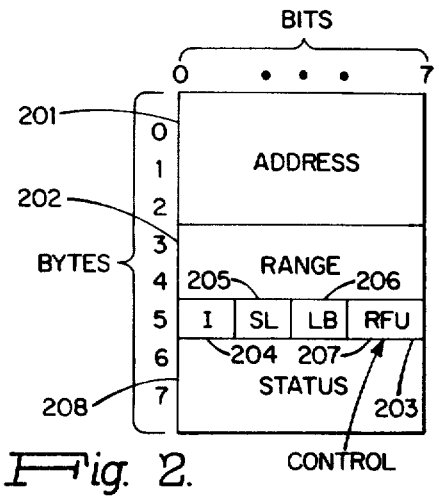

Fig. 2.

| LCT BYTE ADDRESS | | CONTENTS |
|---|---|---|
| RECEIVE | TRANSMIT | |
| 00 | 32 | RFU |
| 01 | 33 | RFU |
| 02 | 34 | RECEIVE/TRANSMIT (R/T) CONFIGURATION |
| 03 | 35 | R/T CRC RESIDUE-BYTE 1 |
| 04 | 36 | R/T CRC RESIDUE-BYTE 2 |
| 05 | 37 | R/T PROGRAM INDICATORS |
| 06 | 38 | R/T CCP POINTER-4 MSB |
| 07 | 39 | R/T CCP POINTER-8 LSB |
| 08 | 40 | R/T CHANNEL COMMAND |
| 09 | 41 | R/T CHANNEL CONTROL |
| 10 | 42 | R/T DATA-LEFT BYTE |
| 11 | 43 | R/T DATA-RIGHT BYTE |
| 12 | 44 | R/T RETURN CHANNEL NUMBER(RCN) 8MSB |
| 13 | 45 | R/T INTERRUPT LEVEL; RCN 2LSB |
| 14 | 46 | R/T CLA STATUS |
| 15 | 47 | R/T CLA STATUS MASK |
| 16 | 48 | R/T STATUS-BYTE 1 |
| 17 | 49 | R/T STATUS-BYTE 2 |
| 18 | 50 | R/T CCP SUBROUTINE POINTER-8LSB |
| 19 | 51 | R/T CCP SUBROUTINE POINTER-4MSB |
| 20 | 52 | R/T CLA CONTROL |
| 21 | 53 | RFU |
| 22 | 54 | RFU |
| 23 ↓ 31 | 55 ↓ 63 | LCT WORK LOCATIONS ↓ ↓ LCT WORK LOCATIONS |

Fig. 3.

CONTROL SYSTEM PROVIDING FOR THE TRANSFER OF DATA IN A COMMUNICATIONS PROCESSING SYSTEM EMPLOYING CHANNEL DEDICATED CONTROL BLOCKS

CROSS-REFERENCE TO RELATED APPLICATIONS

The system described herein is related to the systems of the following copending commonly assigned applications: Ser. No. 760,783, "Process and Apparatus Employing Microprogrammed Control Commands For Transferring Information Between A Central Processor And Communications Channels," filed Jan. 19, 1977, by John P. Grandmaison et al; Ser. No. 760,782, "Communications Processor Employing Line-Dedicated Memory Tables For Supervising Data Transfers," filed Jan. 19, 1977 by Richard A. Lemay et al; Ser. No. 760,772, "Communications Line Service Interrupt Technique For A Communications Processing System," filed Jan. 19, 1977 by Robert J. Farrell et al; and Ser. No. 760,784, "Communication Line Status Scan Technique For A Communications Processing System," filed Jan. 19, 1977 by John H. Vernon et al.

BACKGROUND OF THE INVENTION

The present invention generally relates to data processing systems and more particularly to processors utilized for servicing communication lines.

A programmable communications processor can be described as a digital computer which is peripheral to another data processing computer and which is programmed to perform operational and interface requirements of a data communications network. With the communications processor performing data communications functions, the entire data processing system may be made to be quite flexible and adaptable despite changes in communications requirements. Data communications processors, controllers or adaptors have been said to be programmable and in many cases have been to various degrees. Some such programmable devices are programmed through switches, and others permit the central processor programs to set up the various parameters of the communications lines. Some such communications processors utilize a somewhat standard central processor to provide a front-end to another central processor thereby achieving programmability and some flexibility, usually at the expense of added cost. It is desirable that the communications control unit or communications processor be programmable to the maximum extent possible thereby providing flexibility and adaptability independent of the changing conditions in the system, including the various communications line disciplines which may be encountered. It is therefore desirable to include mechanisms by which programs are allowed to execute in the communications processors, thereby enabling control of the various lines including the check of status changes and manipulation of data and the loading, receiving or transmitting of such data between the communications lines and the main memory of the system. It is further desirable to enable such programming control included in the communications processor to control the speed and various identification bits such as stop, mark, space and synchronous bits, as well as to service various control characters and bits and parity indications. It is further desirable to include a mechanism for the orderly execution of a variety of such programs to control the transfer of data over the communications lines, and to react to interrupt conditions.

One of the major bottlenecks in a communications system can be the interface to the main memory and the control of the data transfer thereto. Systems have been designed in the past which require the memory access for every byte or portion of a byte received. It is accordingly desirable to improve the speed of the system by providing multiple block transfer capability for each transmission or reception so that the communications processor can be commanded to transfer bits, bytes or blocks of data and to indicate that such transfers have been completed by the communications processor through the generation of an interrupt. It is further desirable to tailor the communications processor to the performance of the communications task thereby minimizing the overhead introduced by somewhat standard central processors when employed in communications processors, thereby increasing the speed of the system and providing other desirable capabilities in the system. Thus it is desirable to include programs which are shareable by the various line disciplines. Further, it is desirable to improve the throughput, i.e., minimize the time required to transfer (receive or transmit) data, and to insure that one communication line does not take an excessive amount of the allotted communications time in functioning in its receive or transmit mode.

It is accordingly a primary object of the invention to provide an improved programmable communications processor for use in a data processing system.

SUMMARY OF THE INVENTION

A data processing system for transferring data included in a message, the system comprising a main memory having a plurality of data blocks for storing such data, each of such data blocks having a starting address and a range indicative of the number of storage locations in such block. In addition to a plurality of communications channels, a plurality of control blocks is provided for indicating the starting address range and status of the data blocks. Apparatus for transferring the data between the data blocks in the main memory and the communications channels is provided under the control of control blocks, which apparatus for transferring includes apparatus for allocating a predetermined number of control blocks for each of the channels and further apparatus for transferring the data to that control block indicated by the starting address in a first such control block. Apparatus is further provided in the apparatus for transferring for switching to another control block upon completing the transfer of data as indicated by the range in the first control block and generating an interrupt signal upon completion of the transfer of all data in such message as indicated by the status in the last control block utilized to control the transfer of such data.

BRIEF DESCRIPTION OF THE DRAWINGS

The advantages of the foregoing configuration of the present invention will become more apparent upon reading the accompanying detailed description in connection with the figures in which:

FIG. 1 is a general block diagram of a multiline communications processor (MLCP) coupled in a data processing system;

FIG. 2 illustrates the format of communication control blocks used by the processor of the present invention in the dynamic accessing of memory;

FIG. 3 illustrates a line control table used by the processor of the present invention in controlling the data streams of the communication lines coupled in a typical system;

DETAILED DESCRIPTION OF THE PREFERRED EMBODIMENTS

Figure 4:
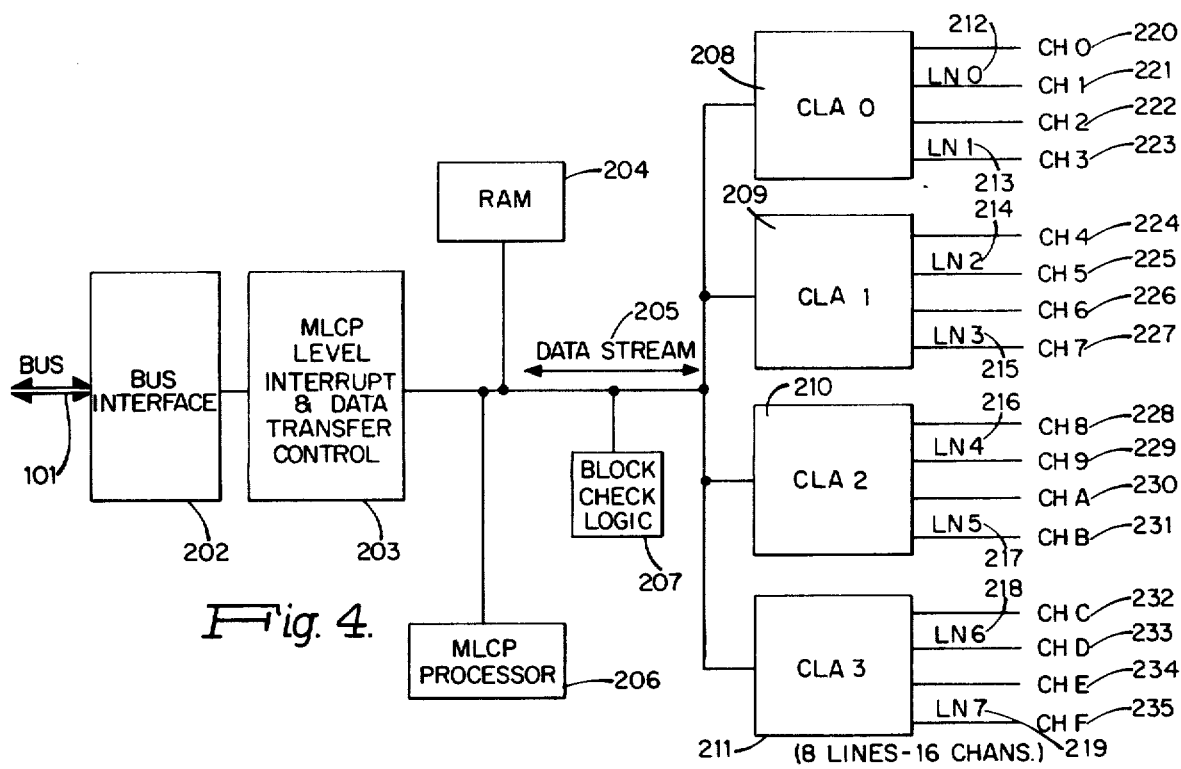
FIG. 4 is a general block diagram of the major hardware structures of a preferred embodiment of the multiline communications processor in accordance with the principles of the present invention.

Now referring to FIG. 1, a typical data processing system employing a multiline communications processor (MLCP) 103 is illustrated. The common electrical system bus 101 interconnects the various components of the data processing system. One component of the data processing system is a central processing unit (CPU) 102. Another component of the data processing system is a memory unit 106. In addition to the multiline communications processor 103, there may typically be other input/output controllers coupled with the bus 101 as a part of the data processing system. In the preferred embodiment, functionally there is no restriction on the number of additional controllers in the data processing system, whether they be other CPUs, memories, MLCPs, or other input/output controllers for devices such as card readers or tape storage devices. Details of such a data processing system and the manner in which the various units are coupled with the system bus 101 are shown in U.S. Pat. No. 3,993,981, issued on Nov. 23, 1976, which patent is incorporated herein by reference.

The MLCP 103 may include, for example, four communications lines adapters (CLA) 104. A CLA 104 may include, for example, either one or two line interfaces between the communications lines and the MLCP 103, depending upon the complexity of the line adapter function to be supported by a particular CLA. The communications lines interfacing with the MLCP 103 are shown collectively as lines 105 in FIG. 1. It is understood that the communications lines may simply be electrical connections to a device such as a terminal or may be connections through a modem over public telephone lines.

In the preferred embodiment, each communications line interfacing to the MLCP is a full duplex data path, as described in the book entitled, "Introduction to Teleprocessing", by James Martin, 1972, published by Prentice-Hall, Inc., (see pages 35 and 36). Thus, each line is viewed as a pair of input/output channels to the data processing system. Each channel is capable of either sending or receiving a communications type of data stream between memory blocks in the memory 106 and the communications interface 104 via direct memory access (DMA) type operations. In the process of transferring these data streams, the MLCP 103 is capable of fully delimiting the data with special character generation, special character detection, and data transmission block check information, all of these functions being specifically tailored to the particular communications line (channel). The MLCP by means of Communication Control Program (CCP) (discussed hereinafter) is also capable of edit functions and conversion of prespecified sequences in the data stream.

At the CLA interface 104, the CLA provides both the communications line interface and parallel/serial conversion of the byte or character data stream from the data processing system into bit stream serial form for the communications line. The MLCP 103 provides control of the line interface and supplies bytes or characters on transmit and also byte buffers on receive functions to the CLA 104 as required.

The multiline communications processor allows direct memory accessing of the memory 106 as defined by communications control blocks (CCBs). CCBs are used by the multiline communications processor to describe the address of memory areas used, range of memory areas used, control of data accesses to that area, and to store status results from operations using that area for a block transfer of data between the communications line and the rest of the data processing system. There may be for example up to four CCBs per channel (2 channels per line) in the MLCP. The CCBs for each MLCP channel, which are stored in the MLCP, are set up through instructions executed by the CPU 102.

FIG. 2 illustrates the format of a CCB. The direct memory access of an area in memory 106 to be accessed for the communications line is described by its address 201 and the range (or size) 202 of that memory area. Byte number 5 shown as field 203 contains control information applying to that CCB. The I field 204, if set to a binary ONE, indicates that an interrupt condition should be sent to the central processing unit 102 upon completion of either reading or writing into this memory buffer by the communication line's DMA operation. The SL field 205, when set to a binary ONE, indicates that the CDB referenced by this CCB is available for use by the CCP. It is reset by a get next block (GNB) instruction which terminates use of this CCB. This indicator can be interrogated at a later time. The LB field 206, when set to a binary ONE, indicates that the memory area described by this CCB will be the last memory block of a message to be transmitted for this particular channel. Thus, the DMA operation for this communications line will be terminated with the transmission of the final character of this block of memory. The field 207 RFU (Reserved for Future Use) is provided to allow many extensions of the MLCP functionality. The status field 208 is used by the MLCP to store information indicating whether the DMA operation performed for the block of memory described by the CCB was successful and if not, what kind of error condition was detected. For instance, if a parity error or cyclic redundancy error were detected, a bit would be set in the status field 208 to indicate such.

Control of the data streams for each of the communication lines is provided by use of line control tables (LCTs) and communication control programs (CCPs) which are loaded into the MLCP by instructions from the CPU 102. A line control table applies to a single communications line which interfaces with the MLCP (i.e., both directions of the full duplex line and thus its pair of associated channels). Line configuration data, line status, and line control information appear in the LCT during MLCP operations. Each LCT comprises a block of sixty-four contiguous bytes which may be broken down into three basic areas: work area, receive channel area, and transmit channel area. LCTs are written into the MLCP for each line interfaced with the CPU 102.

FIG. 3 illustrates a typical line control table. Bytes 2 and 34 of the line control table describe the particular type of line configuration, e.g., line speed, character size, etc. Bytes 3 and 4 as well as 35 and 36 apply to the cyclic redundancy checking used in the data communications for that line. Other fields contain information for both the line's receive channel and the line's transmit channel; i.e., information such as the particular channel numbers assigned to that line direction, status information, control information, data storage for the two byte word of information sent out on the transmit channel and received on the receive channel, and other indicators concerning channel operations as hereinafter more particularly described.

The instructions to the MLCP 103 for manipulating the data in the data areas, as described by the CCBs, are stored in the channel control program (CCPs), which may be loaded by the CPU 102 into the MLCP. Each channel through the LCT points to a CCP which can be used by that channel only or may be shared with other channels in a re-entrant fashion. In addition, a CCP may be modified to reflect a change in requirements of the particular channel. A channel's CCP contains instructions which designate how the MLCP will accept the communications data streams for each channel and how it will act on the elements of that data stream. A CCP for a specific communications line is located by the pointer contained in the LCT (see FIG. 3, byte addresses 6, 7, 18 and 19 for the receive channel). The CCP pointer points to the next location in the CCP to be referenced by the communications channel when channel service must be provided. The number of machine instructions in each CCP is of arbitrary length. A typical CCP is described hereinafter.

FIG. 4 illustrates a general block diagram of the preferred embodiment of the multiline communications processor (MLCP) 103. The data stream 205 represents the communications data stream travelling from any one of the eight full-duplex communication lines 212 through 219 (shown collectively as lines 105 in FIG. 1). The 16 channels (two channels per line) 220 through 235 shown in the diagram represent the pair of channels for each full-duplex communications line. The bus 101 represents the electrical bus which provides a vehicle for communications between the MLCP and the remainder of the data processing system. The bus interface 202 accomplishes the appropriate hardware dialogs, i.e., information transfers, for the electrical bus. Details of such bus interface may be seen in the aforementioned United States Patent.

The MLCP processor 206 maintains central control over operations of the various communications data streams. The communications line adapters, CLA 0 through CLA 3, 208 through 211 respectively, perform the communications line interface dependent functions on up to two lines per CLA. The random access memory, RAM, 204 contains the memory used by the MLCP processor 206 for storing the various data and control information as described in the discussion of CCBs, LCTs and CCPs.

The MLCP level interrupt and data transfer control 203 determines when the MLCP should perform operations on the electrical bus for communications with other elements in the data processing system and when and which communication line adapters should be serviced. Representative interrupt structure details may be seen in U.S. Pat. No. 3,984,820, issued on Oct. 5, 1976, which is incorporated herein by reference. The block check logic 207 performs the cyclic redundancy checks on the incoming communications line data and generates the block check characters for outgoing communications line data as directed by the CCP for that line.

Figure 5:
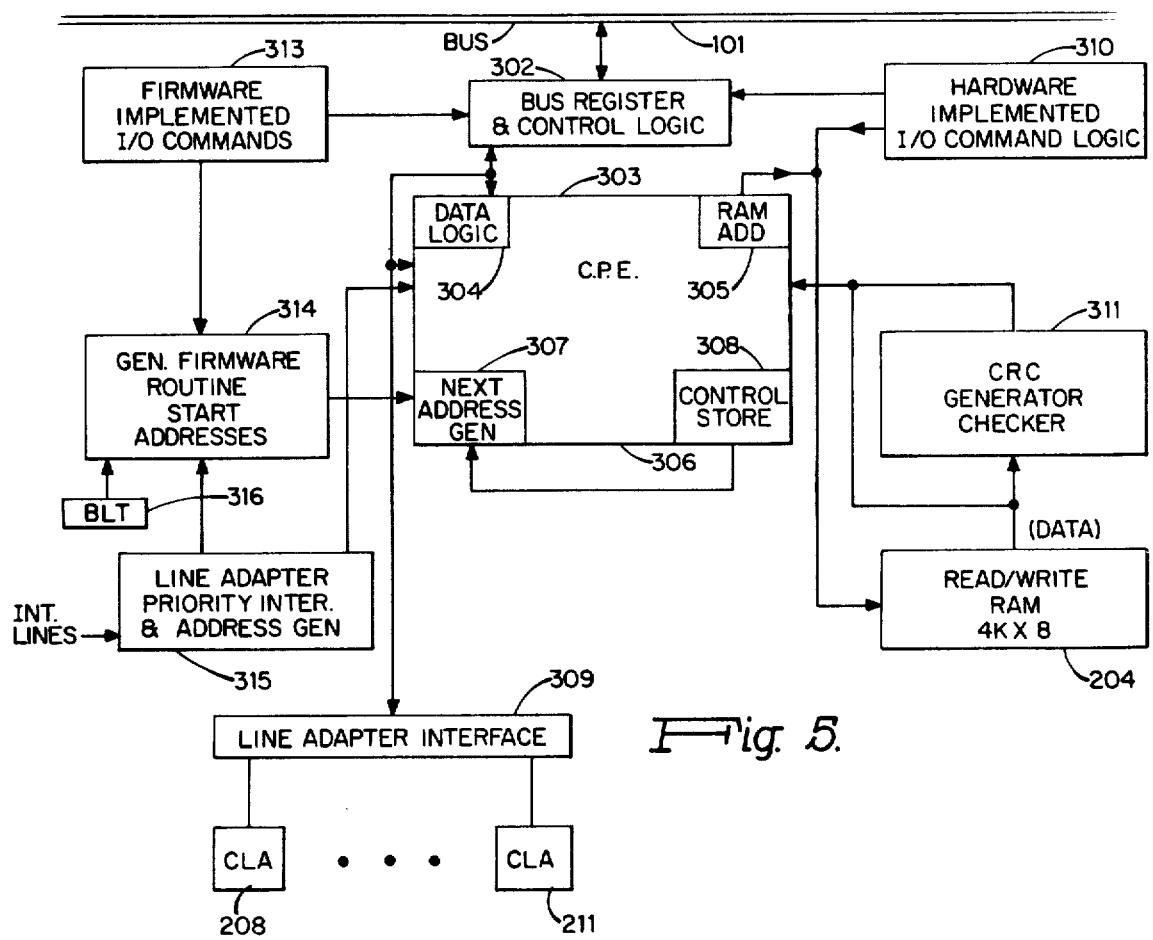
FIG. 5 is a more detailed block diagram showing the hardware elements in a preferred embodiment of the multiline communications processor in accordance with the principles of the present invention.

FIG. 5 illustrates a more detailed block diagram representation of the multiline communications processor of the present invention. The electrical bus 101 is coupled to the bus register and control logic 302 which is included in interface 202 of FIG. 4.

Element 303 included in processor 206 shows the central processing element (CPE) of the MLCP. The CPE 303 executes those portions of the data communications functions which are performed by microprogramming in the preferred embodiment, as well as a self-test of the MLCP. Element 310 shows the portion of the MLCP which executes the portion of the data communications functions which are implemented by hardware logic only (without any microprogramming instructions) in the preferred embodiment. More particularly, logic 310 is used to determine if the command to be executed by the MLCP is a hardware implemented command or a firmware implemented command, and provides various bus 101 control signals and further provides CCB address information to RAM 204. Element 313, firmware implemented I/O (or more specifically, data communications) commands, represents the logic which is controlled by firmware commands in control store 308 of central processing element 303.

Both the firmware implemented I/O commands 313 and the hardware implemented I/O commands 310 operate by means of the bus register and control logic 302 to coordinate MLCP functions with the external elements of the data processing system via the bus 101. The read/write random access memory (RAM) 204 is the local memory for the MLCP. The size of this memory 204 may be for example, 4,096 eight-bit bytes. The CPE 303 and the hardware implemented I/O command logic 310 are coupled to the read/write RAM 204.

Figure 6:
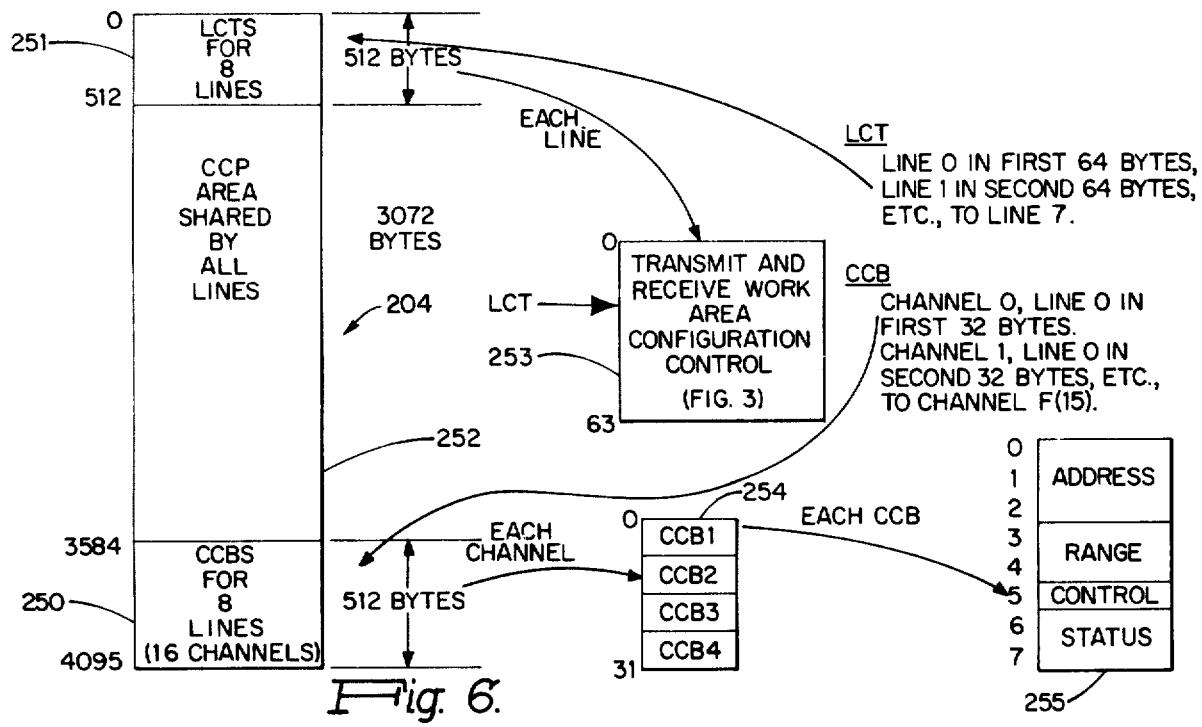
FIG. 6 is a diagram illustrating the organization of a local storage included in the communications processor of the present invention.

The MLCP's RAM 204 contents are used to direct the operation of each MLCP channel. As shown in FIG. 6, the read/write RAM 204 is divided into three basic parts. The first is the Communication Control Blocks (CCB) area 250 in which Communication Control Blocks, up to four per channel, reside in a protected area of the RAM. These locations can be accessed only by I/O instructions or by a blockread or write instruction. The second is the Line Control Table (LCT) area 251 by which each of the 8 lines in the MLCP has its own Line Control Table which contains status, configuration, setup and control information for the associated line. Finally, there is the Channel Control Program (CCP) area 252 which is an area of the RAM 204 reserved for CCPs, which are lists of instructions used to process a channel's data communication character stream. As can be seen, there are by way of example eight LCTs of 64 bytes each (or sixteen LCTs of 32 bytes each, one per channel) as shown by block 253, the details of the contents of each LCT being shown in FIG. 3. As can also be seen, there are four CCBs per channel as shown by block 254, each CCB, as shown by block 255 and in detail in FIG. 2, being eight bytes, so that the area 250 must include 512 bytes for the eight lines (sixteen channels).

Referring back to FIG. 5, the line adapter interface 309 represents the hardware logic which interfaces data and control information between the data stream 205 of FIG. 4 and the communication line adaptors (CLAs). Element 314 represents the hardware which generates the firmware microprogramming routines' starting addresses to address the appropriate firmware procedures which implement the various data communications functions. Thus, the output of the firmware start address generator 314 is coupled with the central processing element 303. Element 316, labelled BLT, represents the basic logic testing input to the firmware start address generator 314. The BLT represents an additional request to generate a firmware routine starting address for the test and verification routine which performs this basic logic testing function.

The CRC generator/checker 311 represents the hardware logic for the cyclic redundancy check generator and checker, which performs the data communication blocks redundant character generation and checking functions. The read/write memory 204 is coupled with the CRC generator checker 311 to provide an input describing the particular type of cyclic redundancy check desired, depending upon the particular line being operated upon.

The line adapter priority interrupt and address generator 315 operates to determine which of the four line adapters of the MLCP previously described should be serviced, and within that particular line adapter, which of up to four line directions (four channels) in particular. Each of the 16 possible channels of the MLCP has an interrupt line. These 16 interrupt lines are inputs to the line adapter and priority interrupt and address generator 315. The priority interrupt and address generator 315 creates a four-bit address representing the highest priority channel which is waiting to be serviced. The particular address is put on a set of bistable latches which will be interrogated by the central processing element 303. The priority interrupt and address generator 315 also determines the priority between other contending elements who contend for use of the CPE with the 16 channels, an example of those other elements being the deferred interrupts and firmware implemented I/O commands.

It can be noted here that the priority for the channels within the MLCP is an internal priority. The priority of a channel within the MLCP is determined by that channel's address which depends on the CLA position on the MLCP. The lowest number address is the highest priority channel. Typically, the highest speed data communications lines, unless buffered, would have the lowest address and thus the highest priority. There is also a different, single external priority associated with the MLCP itself. This external priority is the priority of the MLCP with respect to other units coupled with the bus 101.

With respect to the central processing element 303, more specifically, the microprogramming firmware of the CPE is contained in the control store 308. The control store 308 is a read only memory. The next address generator 307 generates the address of the next microprogramming instruction to be executed by the CPE 303. There are two inputs to the next address generator 307. The first is an address from the firmware starting address logic 314. The other is from the control store itself for the case where the previous instruction specifies the next address to be executed, that address generally being within the same firmware subroutine. The data logic 304 outputs data to both the communication lines and the bus 101. The RAM address register 305 holds the low order eight bits of the address used to address the read/write memory 204. Twelve bits of addressing are needed to address the 4,096 byte memory. The remaining four high order bits are stored in an external register called the read/write address latch (element 411 of FIG. 7).

The central element of the hardware logic of the central processing element CPE 303 is four 2-bit microprocessor large scale integration (LSI) integrated circuits, which are tied together to form an 8-bit processor. In one embodiment, the 2-bit microprocessor integrated circuit is the Intel Corporations's 3002 Central Processing Element, which is described in Intel's publication entitled, "Schottky Bipolar LSI Microcomputer Set-3002 Central Processing Element", 1975. The next address generator 307 is implemented in such embodiment by an LSI integrated circuit, the Intel Corporation's 3001 Microprogram Control Unit, which is described in Intel's publication entitled, "Schottky Bipolar LSI Microcomputer Set-3001 Microprogram Control Unit", 1975. A detailed description of the above units may be obtained by referencing the above two Intel publications which are incorporated herein by reference. The operation of a typical next address generator may also be found in U.S. Patent application Ser. No. 674,698, filed on Apr. 7, 1976, now U.S. Pat. No. 4,079,451.

The operation of the previously described firmware implemented I/O commands 313 is thus implemented using the microprogrammed microprocessor CPE 303 in combination with the control store 308 and the next address generator 307. The operation of the previously described hardware implemented I/O command logic 310 is executed completely independent of the microprocessor, i.e., the CPE's operation.

The hardware implemented I/O commands are those which relate to the setting up for CCB (DMA) operations. The hardware implemented I/O command logic 310 keeps track of when the main CPU 102 issues a command on the electrical bus which gives the MLCP a new address and range for a data communications memory block (in the form of a CCB). This hardware logic decides whether this new block of information is valid (e.g., there is by way of example a limit of four total CCBs per channel based generally on the size of available memory). Multiple CCBs enable the system to place data in successive blocks without interrupting data transfer. If the new CCB is valid, the logic 310 increments an internal pointer for that channel to which the CCB is designated and sets the proper indicators for either accepting or rejecting the next CCB as more specifically described with respect to FIG. 8.

The hardware implemented I/O command logic 310 and the microprocessor CPE 303 contend for use of the read/write memory 204. If one is using the memory, then the other has to wait for the memory to be freed.

The bus register and control logic 302 contains a 40-bit register for interfacing with the 16 data lines and 24 address lines of the electrical bus 101. The 40-bit bus register is loaded in parallel from the bus. The microprocessor CPE 303 operates the bus register as five 8-bit shift registers, thus shifting a byte at a time. Hence, the interface between the bus register and control logic 302 and the microprocessor 303 is an 8-bit data path going into the data section 304 of the microprocessor 303. Dialogues on the electrical bus 101 include an address and a 6-bit function code (or I/O command code) which is passed along to specify which of up to $2^6$ possible functions the bus operation implies. The bus register and control logic 302 makes a determination as to whether or not the address on the bus 101 addresses the MLCP 103. If the I/O command is addressed to the MLCP and is recognized by the MLCP as being a firmware implemented command, the firmware routine starting address generator 314 generates an address for the appropriate routine as previously described.

The microprocessor 303 also has the ability to execute a firmware routine whch does a self-test of the MLCP. The address for this firmware routine is generated by the firmware address generator 314 upon the command of the BLT logic 316. The self-test firmware routine is activated after an initialization or master clear signal is detected on the electrical bus 101. The manner in which this self-test may be implemented is described in U.S. Patent application Ser. No. 756,298 filed Jan. 3, 1977 entitled "Data Processing System Self-Test Enabling Technique," inventors - Virendra S. Negi and Ming T. Miu.

The line adapter priority interrupt and address generator 315 is also an input to the firmware routine starting address generator 314. This logic 315 requests the generation of a firmware routine starting address by the starting address generator whenever interrupt servicing is needed by a line adapter. If neither a self-test, a firmware implemented I/O command, nor interrupt servicing for a line adapter is requested, the central processing element 303 goes into what is called the background mode. A background mode consists essentially of scanning for service requests. In this state continuous tests are made for any of the above conditions which request the starting of a new CPE subroutine execution.

Figure 7:
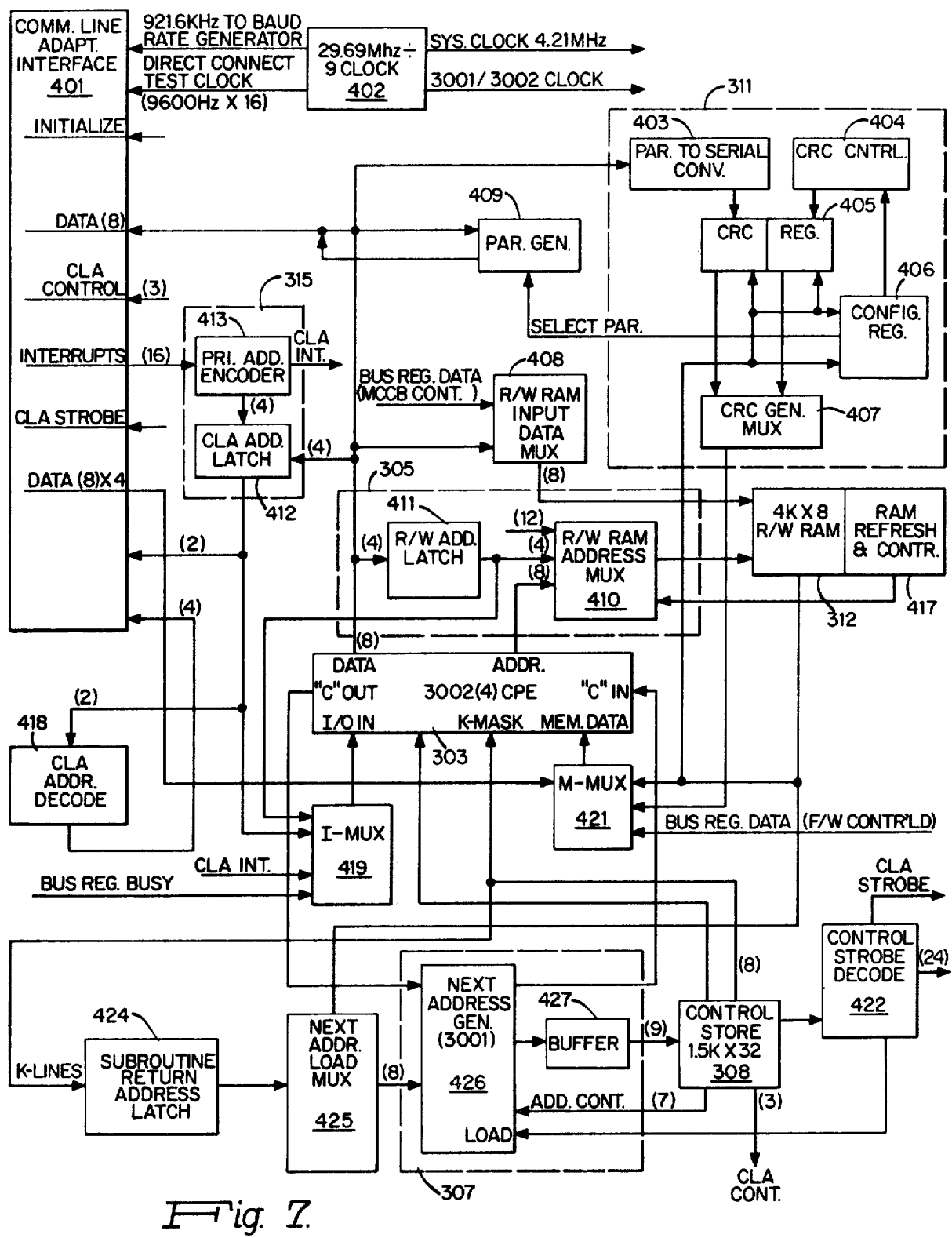
FIG. 7 is a block diagram of the communications line adapter interface logic and the central processing element of the multiline communications processor of the present invention.
Figure 8:
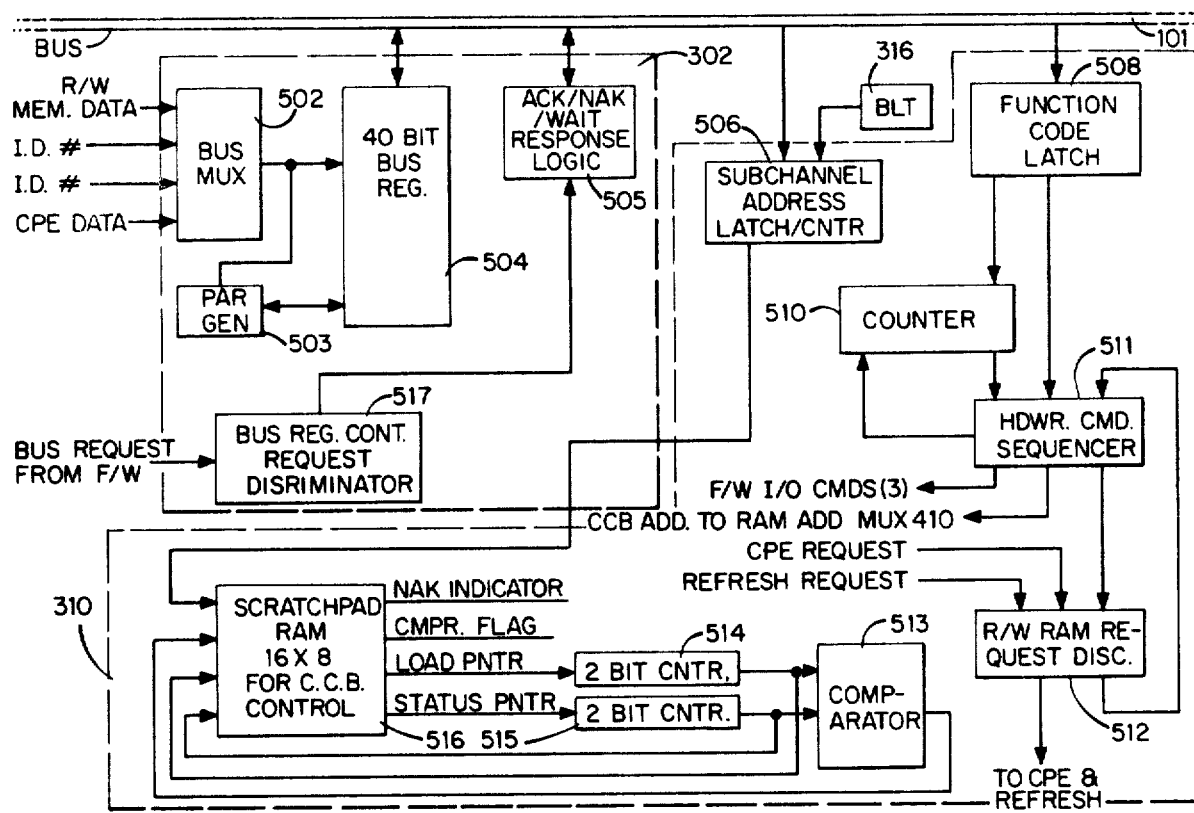
FIG. 8 is a block diagram illustrating the major hardware interface elements of the processor of the present invention for interfacing with an electrical bus.

Before discussing the MLCP in further detail, as shown in FIGS. 7 and 8, portions of the foregoing descripton are restated, summarized and to some extent amplified upon. It has been seen that the MLCP 103 is a programmable communications processor that provides an interface between the bus 101 and up to eight full-duplex communications lines. Low speed lines, and medium speed lines, and high speed lines by way of example up to 72,000 bits per second, are capable of being supported by the MLCP. The MLCP provides the common elements shared by all communications lines. These elements include the firmware-controlled microprocessor, a random access memory (RAM), block-check logic, and the bus interface. Line-specific logic is contained on CLAs which plug into the MLCP. Each CLA connects either one or two lines. The MLCP relieves the central processor 102 of most overhead responsibilities related to communication processing. User-created channel control programs (CCPs)-formed from an MLCP-specific instruction set-are loaded into the MLCP's RAM (along with other control information), where they typically perform the following functions during communications processing: transfer of communications data to and/or from communications data blocks (CDBs) in the main memory; message delimiting; control character detection; parity and/or cyclic redundancy check generation and verification, and minor editing functions.

Each line connected to a CLA is a full-duplex data path, and each line direction is a channel to the MLCP. Each channel is capable of either receiving or transmitting communications data between communications data blocks in main memory and remote communications terminals. This data may be viewed as a sequential data stream, with the MLCP providing the necessary control and transformation of the main memory data into and out of the data formats necessary for communications lines and terminals. Each data character that passes through the MLCP is handled individually, as directed by the channel control program (CCP). In the process of transferring this data stream, the CCP can also be programmed to recognize certain data elements - or sequences of data elements - as control characters, message delimiters, DMA block boundaries, or block-check characters.

The MLCP supports the interface to main memory CDBs by means of the communications control blocks (CCBs), which are set up and maintained in the MLCP RAM by input/output instructions executed in the central processor. CLAs provide line interfaces converting output data characters into bit serial form during transmit operations and converting bit serial input into data character form during receive operations. The MLCP provides control of the line interface, supplying data characters to the CLA on transmit. As data passes through the MLCP from the bus to the CLA or vice versa, the MLCP (CCP) exercises its control over the contents and format of the data stream, generating appropriate interrupts and status and control information as specified by the MLCP operator in the channel control program or as directed by firmware as the result of indicators set by the operator. Control information for each channel is stored in the line control table (LCT) for the channel. The layout of the MLCP RAM, indicating the storage areas for the LCTs, CCPs, and CCBs has been shown in FIG. 6. In addition to the MLCP's ability to accommodate data transfers and related message delimiting and editing for data communications, it also controls the data-communications-equipment/data-terminal-equipment interface provided in the CLA for each communications line. Data for this latter function is stored in dedicated bytes of the line control table; this data can be modified and controlled by CCP instructions, as required by a specific application.

The MLCP processing priorities (from high to low) are as follows: servicing main memory program input/output instructions to the MLCP; servicing CLA channel request interrupts; and background firmware scanning. Main memory program input/output instructions to the MLCP are serviced as the MLCP's highest priority activity. The MLCP responds to CLA channel request interrupts when no MLCP-related input/output instructions from the main memory program are outstanding. The MLCP services its channels on a priority basis. When more than one channel has a CLA channel request interrupt pending for MLCP servicing or when simultaneous channel request interrupts occur, they are serviced by the MLCP according to their priority levels. The priority level of a channel is simply a function of its channel number, with the lowest numbered channel having the highest priority. Background firmware scanning of activities within the MLCP will occur after the MLCP has serviced all main memory program input/output instructions to the MLCP and all CLA channel request interrupts. This scan can be used to interrupt the main memory program or to start a CLA whenever a data set or CLA status change has occurred. Firmware scanning and related actions are enabled for a channel by settings of certain bit positions in that channel's line control table (LCT). In one embodiment, firmware scan typically occurred at least every one-half second.

In addition to preparing a main memory program, which operates in the central processor 102, the MLCP programmer is responsible for creating the following information or program and writing it into the MLCP: communications control blocks; channel control program(s); and line control tables. Before communications processing begins, the channel control program(s) and line control tables must be prepared and then be loaded into the MLCP. Communications control blocks are dynamically supplied by the main memory program during communications processing.

One or more programs must reside in main memory to interact with the MLCP. A main memory program interfaces with one or more communications channels. The general responsibilities of a main memory program are as follows: optionally, it writes the LCT area and the CCP area of MLCP RAM as part of the communications application loading process. It stores MLCP channels' interrupt level in LCTs (unless this action has been performed during loading of the MLCP RAM) and then handles all interrupts that come back at these levels. It performs MLCP and channel control functions such as initialization and starting/stopping channel operations when errors are detected. It sets up the required CCBs and maintains them throughout execution of the application. It maintains CDBs in main memory. This activity includes (1) handling the CDBs as they are completed, (2) supplying pointers to CDBs (for use by the CCBs) when required, and (3) monitoring the status and error conditions for each CDB and reacting appropriately. It monitors the status of the communications interface and CLAs and takes appropriate action when certain changes take place.

For each channel, space exists in the MLCP RAM for a "list" of four consecutive 8-byte communications control blocks (CCBs). Each CCB is used to store main memory address information that indicates the area to which communications data is to be delivered (receive operation) or from which communications data is to be obtained (transmit operation). The main memory area is called a communications data block (CDB). MLCP firmware uses the programmer-supplied information in the CCB when transferring data to or from the main memory CDB. The CCB also contains a control field and a firmware storage area for status and error indicators relating to the data transfer to or from the CDB. Setup and maintenance of the four CCBs dedicated to each channel must be performed from the main memory program associated with that channel.

A channel control program (CCP) directs the movement of each data character through the MLCP. The CCP can cause a data character to be processed in a simple, straightforward manner requiring a minimum of time, or at the discretion of the programmer, the CCP can conduct more extensive checking and editing functions that require more MLCP processing time. If the CCP is programmed to perform data character, byte, or bit beyond basic message delimiting and block-checking functions, this processing will be performed at the expense of throughput. Because of the nature of the instruction set and the design of the MLCP, each CCP is reentrant and therefore usable for more than one channel. A major factor permitting reentrant CCPs is that the control information necessary to operate a channel is stored in the LCT and the CCB associated with only that one channel. The following functions can be performed by a CCP: data editing; parity and/or cyclic redundancy check generation and verification; communications interface and error detection and handling. All CCPs concurrently resident in the MLCP share the 3072 bytes of RAM allocated for CCP usage.

For each line, space exists in the MLCP RAM for one 64-byte line control table. Each LCT is logically divided in half, with the first 32-bytes dedicated to the receive channel of the line and the second 32 bytes dedicated to the transmit channel. Each channel-related half of an LCT comprises the following elements: program-supplied input data; programming work bytes; programming information supplied by firmware; and bytes reserved for firmware use. The program-supplied input data bytes provide information required for character configuration, CCP control, interrupt control, firmware control relative to status and error conditions, and data set and CLA control. The programming work bytes can be used in any way needed by the main memory program or CCPs. Programming information supplied by firmware consists of status and error information related to the data set or CLAs as well as to data transfer operations. A number of bytes are reserved for firmware use.

Figure 9:
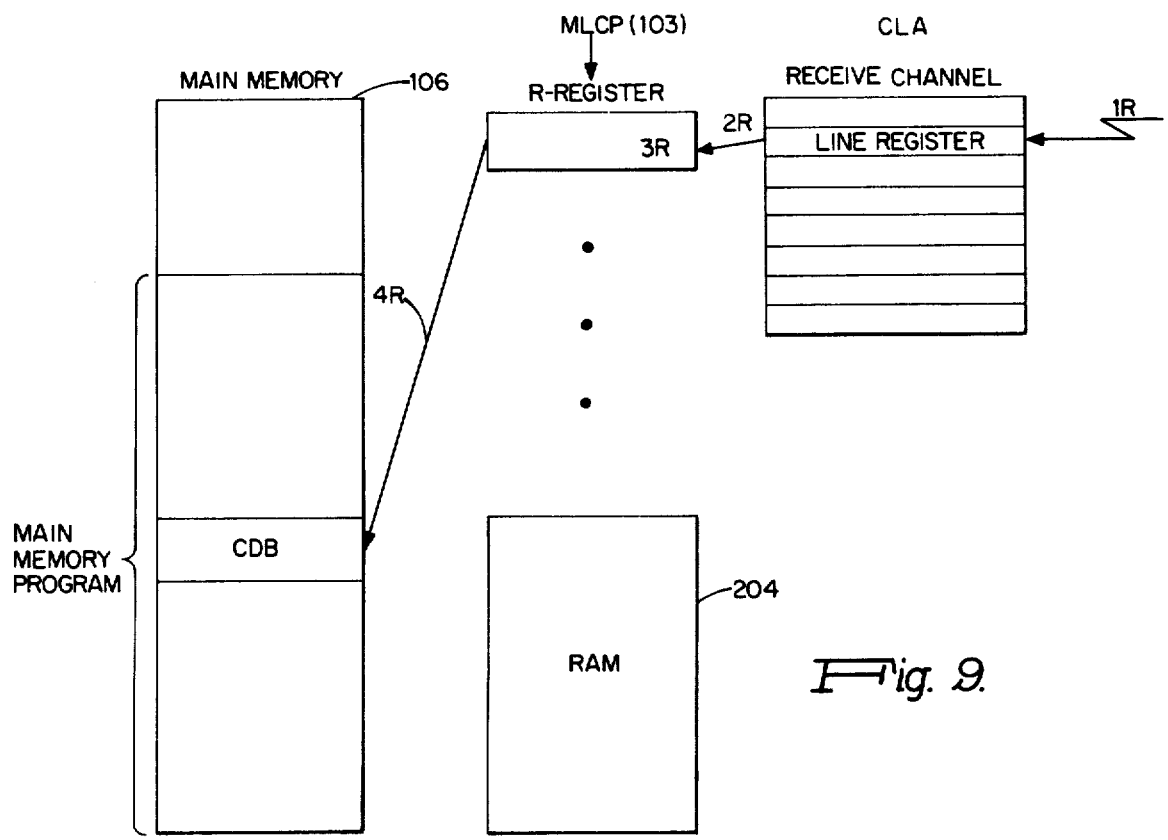
FIG. 9 is a block diagram generally illustrating the manner in which data is received by the MLCP of the present invention.
Figure 10:
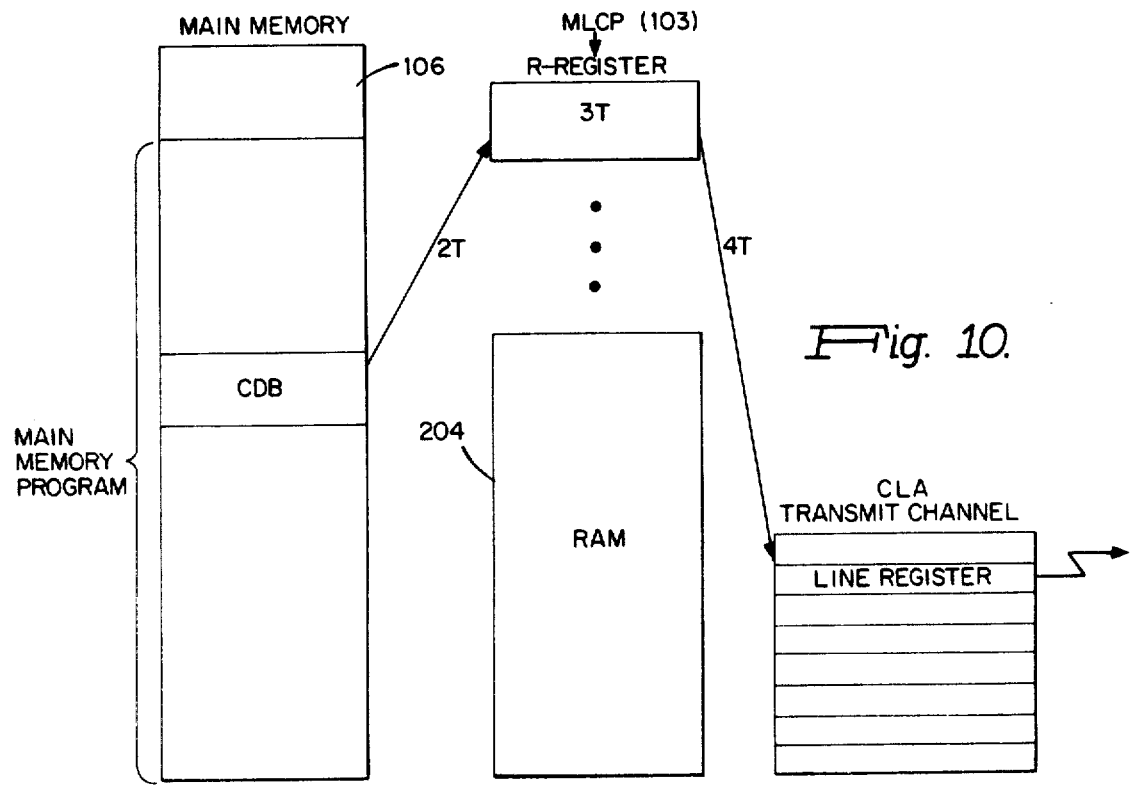
FIG. 10 is a block diagram generally illustrating the manner in which data is transmitted by the MLCP of the present invention.

Now with reference to FIGS. 9 and 10, the general order of events as data is received over a channel and the general order of events as data is transmitted from a main memory program are respectively indicated. With reference to FIG. 9, a data character received on line 1R in a receive channel's line register in the CLA causes the CLA to generate a channel request interrupt to the MLCP on line 2R. In response, the CCP is started and it loads the received data character into the MLCP's R-register, which is one of the registers included in CPE 303. As indicated by the symbol 3R, the CCP edits/modifies the data character in the R-register as required, and at 4R, the CCP transfers the data character from the R-register to a CDB in main memory 106. The CCP then assumes a wait mode and the MLCP starts processing the next function pending for it.

With reference to FIG. 10, the CLA generates a channel request interrupt at time 1T, signifying that it can accept a data character for transmission. By line 2T, the CCP loads a data character from the main memory CDB into the MLCP's R-register. As indicated by the symbol 3T, the CCP edits/modifies the data character in the R-register as required and on line 4T, the CCP sends the data character to the transmit channel's line register of the CLA. From there, the data character is automatically transmitted. The CCP now assumes a wait mode and the MLCP starts processing the next function pending for it.

For receiving data, a channel request interrupt from the CLA to the MLCP indicates that an input (receive) data character is available in a receive channel's line register of the CLA. The MLCP performs a context restore for the channel (preparing the appropriate CCP for execution). The CCP is turned on at the instruction just after the previous WAIT (Wait) instruction executed by this CCP; the CCP uses an RECV (Receive) instruction to load the MLCP's R-register with the data character from the line register. The CCP edits and manipulates the data character in the R-register as required by the application. The CCP then transfers the data character from the R-register to the CDB by means of an ST (Store) instruction. The CCP then branches back to the WAIT (Wait) instruction. This is the basic CCP receive processing loop for each data character of a communications message. The loop can also contain branch and/or TLU (Table Look-Up) instructions for other checks relative to the data character. A CCP subroutine could also be used.

For transmitting data, the CLA issues a channel request interrupt to the MLCP, indicating that it is ready to accept a data character for transmission. The CCP is turned on after the context restore; the CCP then either loads a data character into the MLCP's R-register or uses the character reloaded into the R-register during the context restore. Next, the CCP can edit and manipulate the data character as required before transferring it to the transmit channel's line register of the CLA by means of a SEND (Send) instruction. The data character is then automatically transmitted from the CLA. If desired, after issuing the SEND (Send) instruction, the CCP can immediately issue a WAIT (Wait) instruction; in this case, when the CCP is next activated, it will have to load the R-register with the data character to be transmitted next (editing and manipulating it as necessary) before issuing a SEND and a WAIT instruction. Alternatively, after issuing the SEND instruction, the CCP can load the R-register with the data character to be transmitted next (editing and manipulating it as necessary) before issuing the WAIT instruction; in this case, the data character will be reloaded into the R-register during the context restore that accompanies reactivation of the CCP.

The relationship between physical CDBs and logical communications messages is completely under program control. In receive mode when the CCP executes an ST (Store) instruction for the last character in a CDB, the range in the CCB decreases to zero and the last character indicator is set to 1. To check for the end of receive data before a CDB becomes full, the CCP can search for a specific control character in the input data stream; the CCP can use a TLU (Table Look-Up) or a C (Compare) instruction to check for this condition. Whenever processing ends relative to a CDB, the CCP can obtain the next CDB by issuing a GNB (Get Next Block) instruction. In transmit mode, termination of CDB processing normally occurs when CCB range decreases to zero and the last character indicator is set. In some cases, earlier termination may be necessary because of some other condition discovered by the CCP. In any case, to continue transmission with another CDB and CCB, the CCP must issue a GNB (Get Next Block) instruction.

As mentioned above, the relationship between physical CDBs and logical communications messages is completely under program control. If a logical communications message uses only one CDB, processing for that CDB is basically as described just above; however, instead of the CCP routinely proceeding from one CDB to another, CDB processing should continue as required by the application. If logical communications messages comprise more than one CDB, individual messages may use either a variable or fixed number of CDBs. In any case, the last CDB in a message can be identified to the CCP if the main memory program has set the last block (LB) indicator in the CCB control byte. The last block indicator can be set by an I/O (Output CCB Control) instruction from the main memory program. In receive mode, the last CDB can be indicated by a control character in the incoming data stream.

Now referring to FIG. 7, there is shown a detailed block diagram of the hardware of the MLCP 103 which interfaces with the line adapters (CLAs 104 in FIG. 1) as well as the hardware/firmware used to interact with the electrical bus 101. Element or lines 401 is the interface between the CLAs and the MLCP. Within this interface, four CLA select lines, decoded by decoder 418 from the CLA address latch 412, specify for which line adapter the interface message is designated. The line adapter is logically a group of up to eight registers from the viewpoint of the CPE. Thus, the total set of line adapters is viewed as a group of eight registers, addressed by the three control (register select) lines and the CLA address lines, one CLA select line and two coded lines from the CLA address latch 412 to specify one of the four possible channels on each CLA. The eight output data lines in the interface are for passing information from the MLCP to the CLAs. At the interface, sixteen signals (CRI) are also transmitted from each CLA to the MLCP priority address encorder logic 413, each signal representing an interrupt condition for its respective channel. The interface has a CLA strobe from the MLCP to indicate when the data on the MLCP output lines is valid. There are four sets of 8-bit incoming data lines transferred together from the four CLAs. There is also an initialize signal from the MLCP to the CLAs.

The CLA interface has three clock signals which are transferred from the MLCP clock 402. One clock is used for direct connection of synchronous lines in the case where a modem is not used. This type of communications connection is described in the aforementioned book entitled, "Introduction to Teleprocessing". There is also a 921.6kHz clock signal which is sent to the CLAs to drive the logic on the CLAs which determines the bit rate being used for transmissions on the communications line. This second clock signal is used by asynchronous CLAs to drive a band rate generator which provides a clock for the asynchronous lines. The clock 402 also provides a 240 nanosecond system clock cycle required by the logic 3002 portion of the CPE 303. This system clock is the third clock to the CLAs, and is used to synchronize interrupts.

The four 3002 CPE microprocessor integrated circuits provide the arithmetic, logic, and scratch pad memory register functions for the MLCP. The scratch pad memory contains ten general purpose registers and temporary accumulator storage locations. Data from sources external to the 3002 CPE integrated circuits is brought into the CPE on one of three separate input buses. Data being sent out of the CPE is carried out on either of two output buses. Within the CPE, data is stored in the scratch pad memory or in the main accumulator. Data from the input buses, the registers, or the main accumulator is available to the arithmetic/logic section (ALS) under the control of two internal multiplexers. Additional inputs and outputs are included for carry propagation, shifting, and microfunction selection. There is a seven signal micro-function bus input which is directly coupled to the CPE from the control store 308. These signals select the ALS function, generate a scratch pad address, and control internal multiplexers which select various inputs from the multiple input buses.

Figures 12, 13, 14, 15, 16:
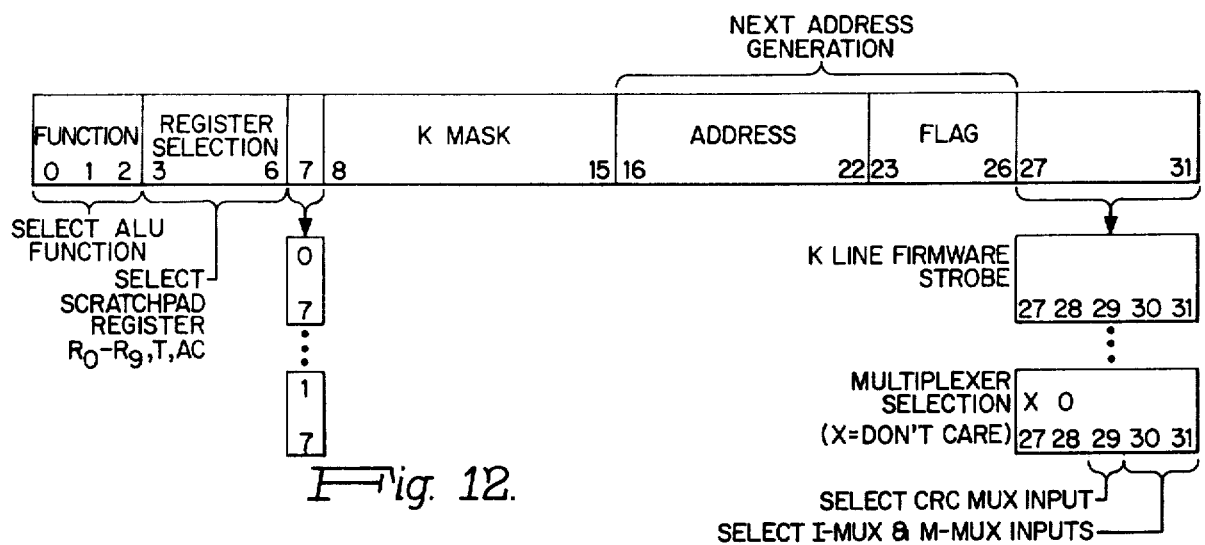
FIG. 12 illustrates the format of the control store word of the MLCP of the present invention.
FIGS. 13 through 16 illustrate the details of various bytes included in the line control tables of the MLCP of the present invention.

The control store 308 may be 1,536 words of 32 bits each. In each 240 nanosecond clock cycle, one control store word is fetched and operated on by the CPE 303. Only seven of the 32 bits are directly input into the CPE to control its operations in a given clock cycle. These seven bits are the seven microfunction signals described above. The specific actions caused by each possible combination of the seven microfunction signals are described in the aforementioned publication entitled, "Schottky Bipolar LSI Microcomputer Set-3002 Central Processing Element". Seven more of the bits of a control store word are input directly into the next address generator 426. These next address bits in combination with the CPE branch instructions are used to form the address of the next control store microinstruction word to be fetched and executed. The detailed format of the control store or firmware word may be seen from FIG. 12. Briefly, bits 0 through 6 are used by the microprocessor to specify the function which it is to perform. Bits 0 through 2 are decoded to specify functionality while bits 3 through 6 are decoded to select the desired microprocessor scratchpad register. Bit 7 is a dual-purpose bit. For R/W RAM 312 access bit 7 is set to ONE for write or to ZERO for read operations. Bit 7 determines usage of control store bits 27 through 31. If bit 7 is ONE, bits 27 through 31 are used to select the inputs for the M-, I-, and CRC-multiplexers. If bit 7 is ZERO, bits 27 through 31 are used to generate a number of MLCP strobe signals. Bits 8 through 15 are used as masking bits (K-bits) by the microprocessor. Bits 16 through 26 are used by the microprogram control unit as inputs to the next address generator (bits 16 through 22) and to the flag control logic (bits 23 through 26). Bits 27 through 31 can be used for multiplexer input selection or for strobe pulse generation, according to the state of control store bit 7.

Eight of the bits coming from the control store word constitute what are called K lines. The K-mask input of the CPE 303 may be used to mask out certain bits for bit testing operations within the CPE. The K-mask may also be used during arithmetic operations of the CPE to mask portions of the field being operated on. Additionally, the K-mask may be used to supply constants to the CPE 303 from the control store word. For example, the bits of the K-mask may be used to form an address of a byte within a line control table (LCT).

Five bits of the control store 308 form the control field and are decoded to generate by means of decode 422 control strobe signals which in turn cause various actions within the MLCP logic. For example, a certain pattern of bits within the control field inhibits the clock signals from certain logic gates. Another set of control field bit patterns shifts the I/O bus register 302. Other bit patterns can set or reset such flip-flops as a bus register busy flip-flop, send a request via the bus 101 for a memory cycle, request the use of the bus for a bus cycle, etc. Other strobes control the CRC generator 311, and the loading of registers.

The control field also provides the selection function for various multiplexers of the central logic, e.g., for the multiplexers on the input busses of the CPE 303. In conjunction with one output of the control store 308 coupled to next address generator 426, two of the control field bits (output 30 and 31 of the control store) are stored in a hardware register which provides the source selection function for the various multiplexers.

There are four lines from the control store word which are concerned with the flag control tests used by the various microinstructions executed by the CPE 303. These flags are the four flag logic control signals input into the next address generator 3001 microprogram control unit, as described in the aforementioned publication entitled, "Schottky Bipolar LSI Microcomputer Set-3001 Microporgram Control Unit".

As previously mentioned the next address generator 426 provides the address for the next control store word which will be fetched and executed by the CPE 303. That address output by the next address generator 426 is driven by the buffer 427 and then input into the control store 308 for the actual fetch of the microinstruction word. It has already been discussed how the next address generator 426 has two basic address sources, one the address lines from the control store word itself and the other coming from a request to start a new microprogramming routine. The next address load multiplexer 425 provides the actual inputs for the addresses which start new microprogramming routines. There are two inputs to the next address load multiplexer 425 which start new firmware routines. One input to the next address load multiplexer 425 is an 8-bit byte from the read/write memory 312, this byte being an actual instruction opcode (OP) of a CCP instruction in the MLCP memory. The other input to the next address load multiplexer 425 is the output of the firmware subroutine return address register (latch) 424. The firmware provided by control store 308 may include the mechanism by which it will determine the highest priority condition to be granted use of the central processing element, CPE 303. One such condition is provided by CLA interrupt lines from the priority address encoder 413. It can be noted that the priority address encoder 413 has as its input the 16 interrupt lines from the communications line adapter interface 401, one line for each channel. Note also that the priority address encoder 413 determines which of the 16 lines is of the highest priority (in this case, the line with the lowest number where the lines are numbered 0 through 15) and encodes that line number into a four bit address which is loaded in the CLA address latch 412. Another such condition is firmware I/O command signal which indicates a particular firmware implemented I/O command which needs to be executed. When an I/O command is received, it indicates that the bus register and control 302 has already accepted the command for execution and is now waiting to continue with this execution by the CPE 303. A further such condition is the deferred DMA cycle signal which indicates that a channel is in the process of transferring a one or two-byte word of data from the communication line to the memory 106 of the data processing system via direct memory accessing and that the channel desires the use of the central processing element 303 to continue transferring additional words of memory in this block transfer mode.

The BLT 316 (basic logic test or self-test) is also a condition which, after a general initialize, uses the central processing element 303. The final such condition is a background loop signal which contends for use of the CPE 303 for the purpose of simply checking to see if any interrupts have been delayed from CLA channels because a higher priority CLA interrupt has taken priority or else if a channel control program for a specific channel has requested a check for a status change, as for instance in checking for a ring indicator or a clear to send signal from or for a communications line.

When a firmware routine is being executed by the microprocessor CPE 303, other routines are not allowed to interrupt the executing routine. At the end of the executing routine, the highest priority signal requesting a firmware routine execution has its address received at the input of the next address generator 426 via the next address load multiplexer 425. Note that if there is no signal requesting a higher priority firmware routine execution, the background loop will be executed in which a scan is performed which looks for other conditions needing routine executions. The ending of all firmware routines causes a loading of the next firmware routine, that routine being the one with the highest priority. The load signal generated by the last microinstruction of a CCB instruction routine is actually generated by the particular pattern of the control field signals of the microcontrol word via the control strobe decoder logic 422.

The next address generator 426 also performs the function of holding the next address in the next address register (microprogram address register of the 3001 circuit) for one clock cycle and performs the logic operations for branching capabilities on two flags (the carry flag and zero test flag) from the CPE 303. The generator 426 is capable of latching results of the carry and zero flags. The generator 426 can also force the carry input of the CPE 303 to either zero or one.

The data and address outputs shown in the central processing element 303 are the data out and main memory address output signals from the 3002 microprocessor integrated circuits. It can be seen that the address output of the CPE 303 is input into the read/write RAM address multiplexer 410.

The read/write RAM address multiplexer 410 is used to select the address which will in turn be used to read out the read/write random access memory 312 of the MLCP. Note that the address lines from the CPE 303 are combined with four high order address lines from the read/write address latch 411. The read/write address latch 411 is infrequently changed, as most sequential addresses used by the MLCP for accessing the read/write random access memory 312 are within the same 256 bytes of memory address addressed by the fixed value of the high order four bits stored in the read/write address latch 411. When it is necessary to change the value contained in the read/write address latch 411, this latch is loaded from the data output of the CPE 303.

Another input to the read/write RAM address multiplexer 410 is from the RAM refresh and conrol logic 417. This address input is the dynamic memory refresh address. The read/write memory 312 may be a dynamic semiconductor memory, and if so, must have the logic values restored in it periodically so as to reamplify the electrical signals stored in the memory (see U.S. Pat. No. 3,760,379 for a description of a memory refresh control system). The RAM refresh control logic 417 thus needs to address to perform memory operations and hence it has an input into read/write RAM address multiplexer 410 so as to enable the proper operation of memory 312. The final input to the read/write RAM address multiplexer 410 is a 12-bit address from the hardware implemented I/O command logic 310 shown in detail in FIG. 8. This address is used to contend for read/write memory operations for that hardware implemented I/O command logic.

The output of the read/write RAM address multiplexer 410 is coupled directly to the address input portion of the read/write random access memory 312. There is logic to resolve the conflict between the three potential requests for providing a memory address: i.e., that conflict among the refresh logic 417, the hardware implemented I/O command logic 310 and the central processing element 303 which will be described hereinafter.

In a preferred embodiment of the present invention, the read/write random access memory 312 is implemented with 4 kilobit memory chips which are physically composed of a 64 by 64 bit array. Each one of the 64 columns of the 64 by 64 array must be addressed every 32 microseconds to refresh the data stored in each of the eight chips composing the eight bits of memory. The RAM refresh and control logic 417 contains a one-shot oscillator which outputs a signal every 32 microseconds, which is used to initiate the cycle to read the read/write memory 312. Only a read cycle of the read/write RAM memory is needed to accomplish the refresh function. The RAM refresh and control logic 417 also contains a counter which is incremented with each read of a column, thus providing a continual looping around through all 64 columns of the read/write memory 312.

The read/write RAM input data multiplexer 408 inputs 8-bit bytes of data to be written into the read/write RAM memory 312. One source of data into the read/write RAM input data multiplexer 408 is the data output lines from the CPE 303. In the 3002 logic, the data output lines are fed by the accumulator register from arithmetic logic sections of the CPE. The other input to the read/write RAM input data multiplexer 408 is an 8-bit data path from the bus register, which is input under control of the hardware implemented I/O command logic 310.

The M multiplexer 421 is coupled to the memory data input of the CPE 303. The memory data input of the CPE is one input into one of the two internal multiplexer inputs of the arithmetic logic section of the 3002 integrated circuits. One input into the M multiplexer 421 is the 8-bit data byte read out of the read/write random access memory 312. Another input is an 8-bit byte data path from the bus register 302, providing bus register data for firmware controlled I/O commands. Another input to the M multiplexer 421 is the output from the cyclic redundancy check generator multiplexer 407. The final input of the M multiplexer 421 is an 8-bit path constituting the data input from the CLAs.

The 8-bit data inputs from each of the four communication lines adapters are coupled in an ORed arrangement of the communication line adapter interface. As mentioned earlier, various select lines generated by latched control field signals of the control store word are used to determine which of the four inputs to the M multiplexer 421 are to be selected.

The I multiplexer 419 is coupled to the external device input of the CPE 303. There are three main inputs to the I multiplexer 419. The first is the address contained in the CLA address latch 412 which, as described previously, contains the address of the channel currently being serviced, i.e., the one with the highest priority that was recognized and has its address latched by the priority address encoder 413. Another input to the I multiplexer 419 is the CLA interrupt output from encoder 413 to allow operation of the firmware-implemented next address generation commands.

The remaining inputs of the I multiplexer 419 are various indicator signals such as bus parity error, bus register busy signal, and other signals which enable the resolution of priority between the firmware implemented I/O commands and the hardware implemented I/O command logic for use of the bus. These independent signals constitute one set of eight inputs for the two-way multiplexer 419, which accommodates up to eight input signals.

The MLCP implements cyclic redundancy checks (CRC) for data communications blocks. In the preferred embodiment, the cyclic redundancy check generator implements one of four CRC polynomial codes whose generator polynomial is sixteen bits or less. The MCLP multiplexes the use of the CRC generator checker among the various channels for which it is performing an operation. In performing CRC generation, the residue from each channel is kept in the line control table memory portion for that channel in the R/W RAM memory 312 when the CPE 303 is not operating the CRC logic for that particular channel. When the CRC generator is to operate on the channel, the residue for the CRC generation is fetched from the read/write RAM memory 312, loaded in the CRC register 405, operated on by the CRC control logic 404, and put back in the memory via the CRC generator multiplexer 407. The configuration information, which applies to a particular channel, contains information such as the number of bits per character, the number of characters per block, the type of polynomial, and so on. It is also loaded from the read/write RAM memory 312 according to the channel being operated on. Note that these operations of fetching the residue from the read/write memory 312, determining the configuration, loading in the configuration register 406, executing the CRC generation or checking through the CRC control logic 404, and then storing the residue back into the read/write RAM memory 312 and done for the current data character being processed by the CPE 303. The CPE then stores the new residue back into memory to use the next time a character is processed for this same channel.

The parallel to serial converter 403 converts the 8-bit byte from the data output of the CPE 303 in the serial data by serially bit shifting the eight (or six) bit byte into the CRC register 405. The CRC multiplexer 407 sequences each of the two 8-bit bytes contained in a 16-bit shift register 405 into the M-multiplexer 421 a byte at a time. From the M-multiplexer 421, the CPE 303 can then perform addtional appropriate operations on that data.

Note that the CRC register 405 has a selectable feedback function to accomplish the CRC function since the function requires the output of the shift register to be fed back into one or more of the 16 bits of the shift register.

The partiy generator 409 performs a parity generation for data coming out of the data output lines of the CPE 303 and being transmitted to the line adapter interface 401. The CRC configuration register 406 inputs into the parity generator 409 the type of parity required according to the particular subchannel being operated on.

FIG. 8 provides a detailed block diagram of the hardware used in the MLCP to perform the electrical bus interface and also to implement the hardware implemented I/O commands. The 40 bit-bus register 504 contains the driver and receiver cricuits necessary for connecting to the electrical bus. As preivously noted, this 40 bit-bus register is manipulated as a series of five 8-bit bytes by the central processing element 303. Input into the bus register 504 is via the bus multiplexer 502. There are four data inputs into the bus multiplexer 502. The first is the read/write memory data path used by the hardware implemented I/O command logic. Another input to the bus multiplexer 502 is the CPE data input from the CPE 303. The remaining two inputs to the bus multiplexer 502 are the upper portion of the identification (ID) code and the lower portion of the ID code. This code is the 10-bit ID code which has to be put on the electrical bus 101 in response to an input ID request from the bus 101. The hardware implemented I/O command logic 310 sequences the upper and lower parts of the ID code in two separate data transfers to the bus register 504.

The parity generator/checker 503 performs a parity generation and check for data coming from the bus 101 and going onto the bus.

The ACK/NAK/WAIT response logic 505 is hardware logic which provides the response generally common to all components connected to the bus of the preferred embodiment, as described in the aforementioned U.S. Pat. No. 3,993,981. The WAIT response indicates that the bus register 504 is full. This WAIT function is generated independent of the actions of either the hardware implemented I/O functions or the CPE 303.

The NAK response on the bus 101 is caused by the hardware implemented I/O commands. The hardware implemented I/O command logic generates a NAK response under three conditions: first, if the bus generates a command which attempts to load a CCB for a channel which is one beyond the maximum of four CCBs per channel; two, if an I/O bus command requests to input status to a CCB in a channel beyond a previously set up (loaded) CCB; and three, if the MLCP is executing its BLT in response to a general initialize command. If the bus register is not occupied and neither of the three conditions for a NAK response are present, the ACK, NAK, WAIT response logic 505 generates an ACK response.

The bus register control and request discriminator logic 517 accomplishes the function of determining whether the hardware implemented I/O command logic or a bus request from the CPE firmware will be allowed to interact with the ACK/NAK/WAIT response logic 505 and the bus 101 in the case where the hardware implemented I/O command logic and the CPE are both contending for the bus.

The elements of the hardware implemented I/O command logic 310 are shown to include the function code latch 508, subchannel address latch/counter 506, counter 510, hardware command sequencer 511, scratch pad RAM 516, two-bit counters 514 and 515, and the comparator 513. Each of these elements will be described in detail below.

The function code latch 508 is a bistable register which stores the function codes of the I/O command received from the bus 101. The hardware command sequencer 511 is a programmable read only memory (PROM) which uses the function code from latch 508 as a starting address for a routine. Operation of a hardware implemented I/O command is then accomplished by a series of control states defined by the hardware command sequencer 511, which determines these control states depending on the output of the function code register 508 and the value of the counter 510. The number of hardware sequences executed is defined by the count loaded into the counter 510. The count loaded in the counter 510 would typically be between three and eight, indicating no less than 3 steps nor more than 8 steps.

The hardware command sequencer 511 generates several types of output signals. One kind of output signal is a request for a memory operation. This request is input into the read/write RAM request discriminator 512. At the same time as a request for memory is output by the hardware command sequencer 511, it would also output an address to the read/write RAM address multiplexer 410 to provide the address for the requested memory operator. The address would actually be the address of the CCB needed for execution of a hardware implemented I/O command. A final output from the hardware command sequencer 511 is a line which indicates that an I/O command is to be then executed by firmware. The particular type of I/O command desired is given by the function code in the I/O bus register 504.

The read/write RAM request discriminator 512 is the logic previously referred to which determines whether a hardware implemented I/O command memory request will be granted, or whether a firmware (CPE) memory request, or a refresh memory request will be granted. The R/W RAM request discriminator 512 is implemented as a set of two flip-flops for each of the three memory request sources. Each of the three units requesting a memory cycle has its memory request granted flip-flop set if the memory is not busy and the control of the read/write memory 312 is given to that unit. The request granted flip-flops are coupled directly to the respective units. If the unit does not get the memory because it is busy, then that unit's memory request flip-flop is set. The CPE has the highest priority for a memory request, the hardware implemented I/O commands have the second highest priority, and the refresh request has the lowest priority. The assignment of these priorities is intended to give to time-critical CPE firmware operations on communications data streams top priority, the less critical hardware I/O implemented command second priority and the least time critical operation, the read/write memory refresh, the lowest priority. The refresh request is considered the lowest priority since it is extremely likely that within the 32 microseconds time gap in which the refresh operation needs to occur, that there will be many free memory cycles not used by either the CPE or the hardware implemented I/O command logic. Thus, there is no reason to delay the higher priority request to allow a refresh operation since the refresh operation has up to 32 microseconds to wait for its operation in any case.

The subchannel address latch/counter 506 is used to temporarily store a 4-bit address of the MLCP channel addressed by an I/O command. This subchannel address latch/counter 506 is used in conjunction with the scratch pad RAM memory 516 which stores pointers and flags for each MLCP channel. Thus, the function of the subchannel address latch/counter 506 is to address one of the 16 locations of the scratch pad RAM 516.

Since each channel has up to four CCBs associated with it, a two-bit address is needed to address one of its four CCBs. In each of the 16 words (8 bits per word in this case) of scratch pad RAM 516, there being one word for each MLCP channel, the following information is contained: a two-bit load pointer to serve as an address for loading the next CCB into the read/write RAM memory 312 area associated with that channel, a two-bit status pointer to address the CCB to which status information should be directed, a NAK indicator which indicates that the channel already has the maximum number of CCBs and thus that a request to add a new CCB should receive a NAK, and a compare flag to indicate that an attempt was made to store status beyond an available CCB of that subchannel. The NAK indicator is stored to give the quickest possible response to an invalid bus command instead of recalculating whether another pointer is allowed and later finding out that a NAK condition exists.

The two bit counter 514 does the incrementing of load pointers output from the scratch pad RAM 516. The two bit counter 514 is coupled both back into the input of RAM 516 for updating the scratch pad locations for a particular channel and also into the comparator 513 for determining whether an indicator flag for that particular channel should be set. The two bit counter 515 does the incrementing for the status pointer for a channel output from the scratch pad RAM 516. It is also coupled into the input of scratch pad RAM 516 and into the comparator 513 for determining the proper value for the indicator flags. The output of comparator 513 is coupled back into the scratch pad RAM 516 for enabling the writing of updated values into the RAM.

During the self-test time, it is necessary to initialize all MLCP channels to a condition indicating that they contain no CCBs or non-zero NAK or compare flags. Thus, when the BLT or basic logic test flip-flop 316 is set to a binary ONE indicating self-test time, the channel address latch/counter 506 is incremented from zero through 15 to address each channel to zero out its pointers and indicators.

Before discussing further hardware and firmware details of the present invention, an overview of the operational states of the MLCP and the MLCP firmware will be presently discussed.

Figure 18:
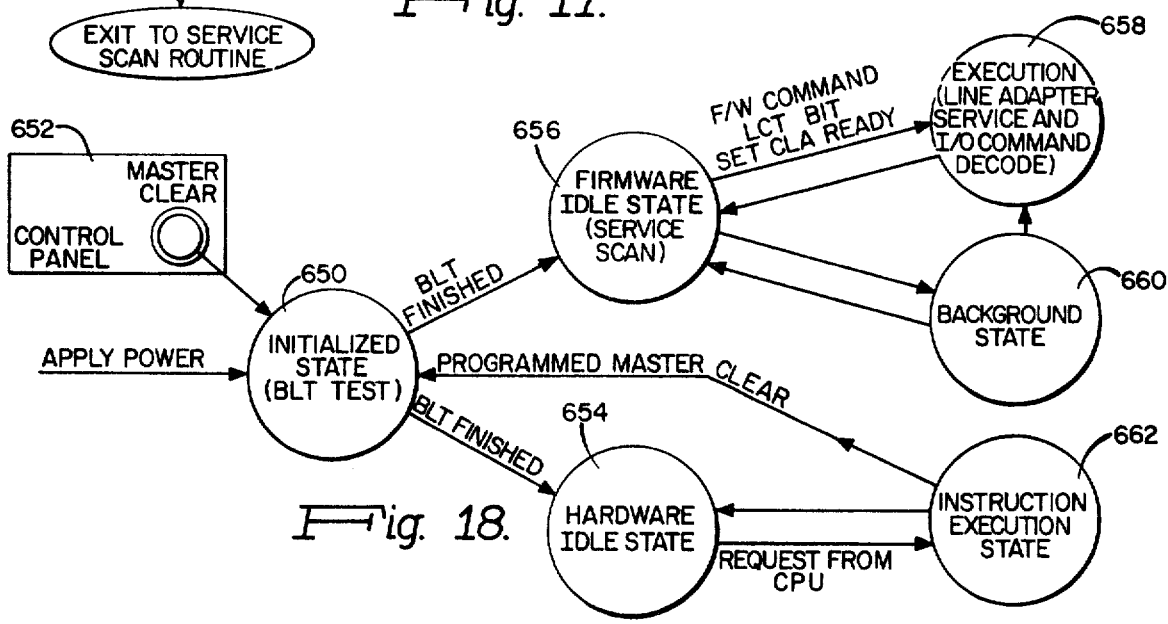
FIG. 18 illustrates in block diagram form the general operational states of the MLCP of the present invention.

As shown in FIG. 18, the MLCP includes several operational states. The MLCP initialized state 650 can be entered by means of a system control panel MASTER CLEAR 652 as a result of applying system power, or by a programmed master clear operation. Initialization clears the R/W RAM 312, resets all MLCP control logic, and resets all line adapters. Whenever the MLCP is intialized, its Basic Logic Test (BLT) is executed, after which both hardware and firmware enter idle states 654 and 656 respectively. In the firmware idle state 656, the firmware is running its Service Scan routine 604, which checks for line adapter requests or for the presence of an I/O command. Depending upon what the scan routine encounters, firmware may enter either the execution state 658 or the background state 660. The firmware execution state 658 is the state in which I/O commands are decoded and line adapters are serviced. In the background state 660, firmware checks for deferred DMA requests, and loads CCPs, CCBs, and LCTs, and checks for CLA status changes.

Once intitialized, MLCP hardware enters its idle state 654. In this state, MLCP hardware remains quiescent until a request is received from the CPU 102, after which the hardware enters the instruction execution state 662. Hardware implemented commands are executed in this state. Should the instruction include a programmed master clear, the hardware returns to the initialized state 650.

Figure 11:
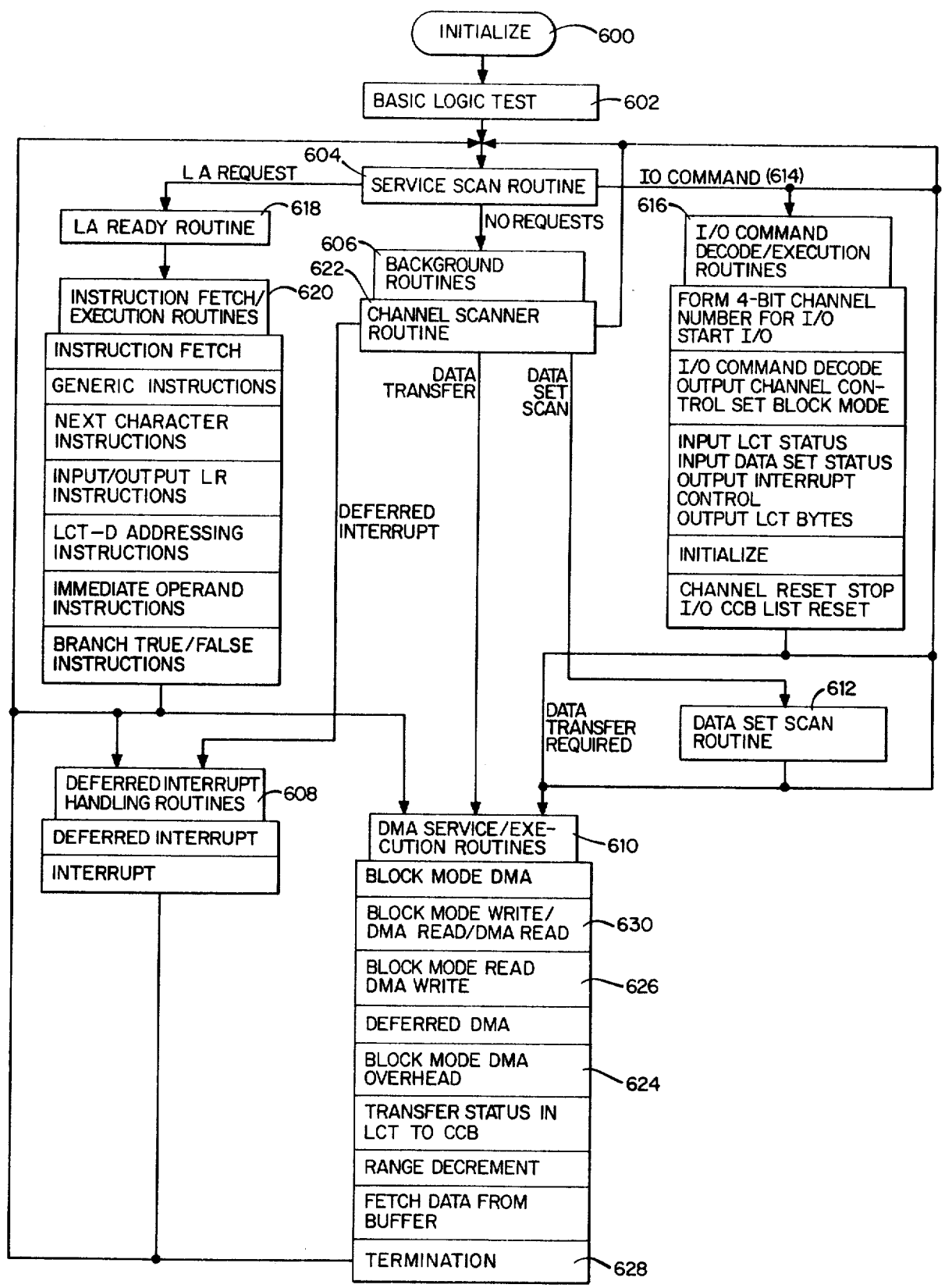
FIG. 11 is a block diagram illustrating an overview of the firmware flow of the MLCP of the present invention.

The MLCP firmware included in control store 308 is divided into essentially eight major areas with many of the areas comprised of a combination of multiple subroutines. FIG. 11 shows the partitioning of the eight areas, and the subroutine names for each block. Upon initialization 600 of the MLCP, the firmware enters a routine for verification of the hardware referred to as the Basic Logic Test (BLT) 202. The BLT has only one possible path for firmware continuation: entry into the Service Scan routine 204. At this point it is necessary for the firmware to decide which of its three available routes it must follow. Provided that there are no requests of any type present, the Service Scan routine 204 will exit to the Background routine 606. The process of looping from the service scan to the background and back to the service scan continues until one of four conditions occurs: a deferred interrupt is detected, a data transfer is initiated, a data set (CLA) scan is required, or an I/O command was detected while in the Service Scan routine. When any one of these four situations is present, the Background routine 606 will enter the applicable firmware area: Deferred Interrupt Handling routine 608, DMA Service/Execution routine 610, the Data Set Scan routine 612, or the Execution routine 616. When completion of the required routines is accomplished, re-entry into the service scan/background loop is performed.

If an I/O command 614 was detected while in the Service Scan routine, an area called the I/O Command Decode/Execution routines 616 is entered. After processing the proper command operation, the firmware may return to the service scan background loop, or if a data transfer is necessary, it will go to the DMA Service/Execution routine 610. The third path provided for in the Service Scan routine 604 is to the Line Adaptor Ready routine 618 (if a line adapter request is present). The Instruction Fetch/Execution routines 620 are subsequently utilized to provide the appropriate data manipulation. After completion of the instruction execution, the firmware permits the service scan/background loop to be entered either directly or by way of the Deferred Interrupt Handling routines 608. A path is also provided to the DMA Service/Execution routines 610 (if a data transfer is required).

The BLT 602 is initiated by way of a master clear which may be the result of a software command, maintenance panel reset, or the powering up process. It is utilized to clear the entire 4K random access memory 312 to zero. During this clearing procedure the addressing, next address generation, random access memory storage elements, refresh logic, if utilized, and other hardware elements are verified. The data is written, then read and compared for a zero result. In the event of a data error, the firmware enters a location in which a branch on itself is performed, effectively halting microinstruction processing. After the successful completion of the BLT 602, a firmware command is issued which extinguishes a light emitting diode (LED) located at the rear edge of the MLCP board, the MLCP being implemented on a single logic board. See U.S. Patent application Ser. No. 644,653, filed on Dec. 29, 1975, now U.S. Pat. No. 4,042,832, for details relating to the manner in which the LED indicates an error condition. The firmware then enters the Service Scan routine 604.

The Service Scan routine 604 can be entered from any one of the eight major areas of the firmware, which are shown in FIG. 11. This routine is used to determine what, if any, type of request is pending. Initially, the Service Scan routine 604 ascertains if the I/O Command line 614 is set. If set, the firmware proceeds to the I/O Command Decode routine 616, which establishes the necessary action to be taken. If the I/O Command line is not set the CLAs (or line adapter, LA) so-called ready flip-flop (which indicates whether the CLA needs service) is scanned to establish whether a line adapter request is present. If this flip-flop is set, the firmware begins the Line Adapter Ready routine 618 and starts the processing and execution of the channel control program. The Service Scan routine will go to the Channel Scanner routine when there are no line adapter or I/O command requests.

The Channel Scanner routine 622 is also sometimes referred to as the Background routine 606. This routine executes several low priority process checks to determine if any action on the part of the firmware is necessary. The Channel Scanner routine first checks to see if there is any deferred data transfers of if a block mode operation is pending. If any of these conditions is met, the firmware branches to the appropriate routine within the DMA Service/ Execution routines 610 area and performs the required action. The Channel Scanner 622 will then, if no prior action was required, determine if there is a deferred interrupt pending on this channel. If a deferred interrupt flag is set, the routine goes to the Deferred Interrupt routine 608 and processes the interrupt. The last check made by the Channel Scanner routine is to establish if a data set scan is required. When the scan bit is set, the Data Set Scan routine 612 is entered, and the scan procedure is implemented. After all these indicators have been checked, and if no low priority actions are necessary, the Channel Scanner routine 622 re-enters the Service Scan routine 604 to scan high priority requests.

The Instruction Fetch/Execution routines 620 are the portion of the firmware utilized for implementation of the Channel Control program (CCP). The CCPs are delegated to a section of the random access memory 312 and in order to be implemented their instruction must be read from storage, and finally executed. The firmware routines performing these operations consist of three phases: 1. the instruction fetch, 2. the instruction decode, and 3. the instruction execution. The Instruction Fetch routine 620 accesses the program-counter of the MLCP and loads it into the random access memory address register 305. When the address register is loaded, the program-counter is incremented and restored. The random access memory location is then read to obtain the instruction for the decode process. The decode process consists of two levels: a major decode and a minor decode. The major decode is a one-of-sixteen identifier which determines the format type. Once the format type has been established, the minor decode specifies the actual instruction of this format to be performed. Finally, the instruction execution routines perform the indicated action and if applicable may set or reset CCP program indicators. The processing of a CCP is continued by the repeating of these three operations until a WAIT instruction is recognized or thirty-two instuctions are executed, causing an exit from the Instruction Fetch/ Execution routines 620 to the Service Scan routine 604.

Firmware response is not required for all types of I/O commands. Where firmware action is required, the function code read from an I/O data buffer register is decoded to determine if an input or output operation is to be performed. Once this functionality is decoded, a further decode is done to allow the correct execution routine to be entered. Entry into the I/O Command Decode/Execution routines 616 is gained from the Service Scan routine 604 if an I/O command is detected. The DMA Overhead routine 624 utilizes the Service Scan routine to access the I/O Command Decode/Execution routine 616 if use of the I/O data buffer register is required. After the I/O command execution, when entry is from DMA overhead, the DMA routines 610 are returned to for continuation or exit to the Service Scan routine 604. When the Command Decode/Execution routines 616 have been entered from the Service Scan routine, the exit will be back to the Service Scan routine.

The DMA Service/Execution routines 610 are utilized to read data from or write data to the system main memory 106. Many of the routines within this area are used to update address, range, data, and pertinent status information.

The DMA Write Operation 626, performed to transmit data from the MLCP into the main memory, requires the use of several of the routines which comprise the DMA Service/Execution area. These routines request the I/O data register and gain access in one of two ways if it is busy: if busy because of the hardware, a stall (see U.S. Patent application Ser. No. 704,219, filed on July 12, 1976 for details of a typical stall operation) is performed until the hardware is available, or if busy because of an I/O command pending, the command is processed, and a return to these routines is performed. The routines then load the three bytes of address and the two of data into the I/O data register. Control signals are then set, and the DMA cycle is initiated. The firmware then waits for cycle completion and exits to the Service Scan routine 604 directly or by way of the Termination routine 628.

The DMA Read Operation is performed in order to receive data from the main memory into the MLCP, and requires the application of several routines which comprise the DMA Service/ Execution routines 610. The routines request access to the I/O data register in one of two ways if it is busy: if busy due to the hardware, a stall is initiated until the hardware is available, or if busy because of an I/O command pending, the command is processed, and a return to these routines is performed. The routines then load the main memory address and the channel number of the source into the I/O data register. Control signals are then set, and the request cycle is initiated. The firmware then stalls, waiting for a response from the main memory. In the event of a NAK response, the non-existent resources error is set, and the Service Scan routine 604 is entered by way of the Termination routine 628. If an acknowledge was received by the MLCP, the firmware then waits for a Second Half Read cycle (see U.S. Pat. No. 3,993,981) at which time the data integrity is verified. The data bytes are loaded into the random access memory, and an exit to the proper procedure is performed.

The Deferred Interrupt Handling routines 608 utilize a counter which indicates the number of different interrupts which have been NAK'd previously. If the counter is at some value other than zero for the scan of this channel, the firmware will test a Resume Interrupt indicator. If this indicator is reset, the Service Scan routine is entered. In the case where the Resume Interrupt indicator is set, the deferred interrupt counter is decremented, and the interrupt is generated. To execute the interrupt generation, the I/O data register is loaded with: the channel number of destination, the interrupt level number, and the channel number of the source. The firmware then sets up the proper bus 101 control signals and initiates a request cycle. A stall is used to wait for the response, and if the response is a NAK, the deferred interrupt counter is incremented, and the routine requesting the interrupt is returned to. When an acknowledge response is received, the requesting routine is returned to directly without incrementing the deferred interrupt counter.

The Data Set Scan routine 612 is entered from the Channel Scanner routine 622 as a result of bit 0 of this channel's LCT command byte being set. The routine takes the action necessary to read the status for this channel from the adapter. When the new status is received from the adapter, it is compared against the adapter status stored in the LCT. If the status is unchanged, a return to the Service Scan routine 604 is performed. If the new status from the adapter has changed, the new status is written into the LCT, and the LCT channel command byte is examined to ascertain what action is necessary. The Data Set or CLA Scan routine will now be discussed in further detail with reference to FIGS. 13 through 17.

For each communications line, the MLCP controls the CLA by means of a line register for that line. The value in the line register affects the operations of both channels of one line. The line register of a CLA is loaded from a CCP that services one or both channels of the related communications line. If so directed by the CCP, MLCP firmware in control store 308 will periodically scan CLA status relative to a given communications line - as reflected in a status register for that line. Whenever the MLCP firmware scan detects certain types of status changes (as predefined by the CCP), it will store the entire contents of the status register in LCT byte 14 or LCT byte 46, depending on whether it is receiving or transmitting, respectively. Subsequent actions to be taken are also predefined by the CCP.

The CLA Scan routine 612 will be entered and then executed depending upon whether there is a CLA status change. The flow of this scan operation is shown in detail in FIG. 17, which is self-explanatory, with details of the pertinent LCT bytes shown in FIGS. 13 through 16.

The CLA scan routine will now be described. A CCP requests an MLCP firmware scan of the status register by setting to 1 bit 0 (scan control) of LCT byte 8 or LCT byte 40. By setting appropriate bits in a mask contained in LCT byte 15 or LCT byte 47, the CCP predefines which type of CLA status changes will cause the entire contents of the status register to be copied into LCT byte 14 or LCT byte 46. The CCP predefines the subsequent action(s) to be taken by appropriate settings of bits 1, 2, and 3 in LCT byte 8 or LCT byte 40. If bit 1 of LCT 8/40 is set to 1, a detected status change will cause bit 3 of LCT byte 17 or LCT byte 49 to be set to 1. If bit 2 is set to 1, a detected status change will cause the "active" CCB to be terminated and the main memory program to be interrupted. If bit 3 is set to 1, a detected status change will cause the CCP to be started. (This action will be taken only if bit 2 is reset to 0.) Each time a firmware scan occurs, the following sequence of actions is performed. An exclusive OR operation is performed on (1) the contents of LCT byte 14 or LCT byte 46, and (2) the contents of the status register. A logical AND operation is performed on the result from the preceding step, and the contents of the mask in LCT byte 15 or LCT byte 47. If a non-zero result is produced by the logical AND operation in the preceding step, a CLA status change has occurred. The contents of the status register are copied into LCT byte 14 or byte 46 and subsequent action(s) are based on the settings of bits 1, 2, and 3 of LCT byte 8 or LCT byte 40. (If the CCP is started in response to a status change, it can read LCT byte 14 or 46 to ascertain what type of status change has occurred.) The MLCP firmware scan is a low-priority activity that is independent of input/output operations from the main memory program and CCP processing.

Now referring to the channel control program in further detail, a channel control program (CCP) must be created and then stored in MLCP RAM 312 where it serves as the interface between one or more MLCP communications channels and communications data blocks (CDBs) in the main memory. Each CCP handles a communications data stream being received by, or transmitted from, these CDBs. The data stream is handled one character at a time, and the CCP can modify or delete an individual character in the data stream or it can transfer the character unchanged. The CCP can also manipulate certain bytes in the line control table (LCT) pertaining to the channel serviced by the CCP; this LCT information relates to communications control blocks (CCBs) and the CLAs. Each CCP in the MLCP resides in consecutive locations of the CCP area of RAM, which extends from byte 512 to byte 3583, inclusive (see FIG. 6). Mulitple CCPs can co-exist in RAM - provided they do not overlap. A CCP can service more than one communications channel, but each channel's LCT and CCBs exist in channel-specific RAM locations outside the CCP area, regardless of whether that channel is serviced by a "dedicated" CCP or by a CCP that services multiple channels. The channel-specific LCT and CCB storage areas permit CCPs to be re-entrant and therefore able to service more than one channel. MLCP firmware allows a CCP to call one level of subroutine (outside the CCPs consecutive RAM locations) and later to be returned to at the next sequential instruction following the call.

A CCP is stored in the MLCP RAM 312 and the CCPs initial starting address must be written into the appropriate bytes (6, 7, 38, 39) of the LCT for the channel to be serviced by this CCP. When the CCP is started for the first time, its initial starting address - stored in the LCT - will be loaded into the MLCP's P-register (program counter) located in CPE 303 by MLCP firmware. Once all desired CCPs have been stored in RAM 312 and all setup activity has occurred, the CCP can be started by the main memory program's execution of an I/O (Output Channel Control - start input/output) instruction. Normally, the first action of the CCP is to load various line registers of the appropriate channel of the CLAs. The CCP may then execute a WAIT instruction, pending the first communications message activity.

During processing, a CCP can be started by any of the following means: a channel request interrupt from the appropriate CLA (a request for CCP service); execution of an I/O (Output Channel Control - start input/output) instruction in the main memory program; or a change in CLA status. Each time a CCP is started, the MLCP restores its channel-specific "context" from the appropriate LCT. This context includes the proper settings of the MLCP P-register (program counter), R-register (general register), and program indicators. When the CCP is started, the MLCP allows it to execute, without interruption, as many as 32 instructions. After 32 instructions have been executed, a so-called firmware pause occurs and the CCP is interrupted; the CCP's context is stored in firmware-reserved bytes of the appropriate LCT. The firmware pause allows background firmware scanning to occur and channel request interrupts to be serviced. When the CCP is resumed following the pause, its saved context is automatically restored by firmware. The data character processing loop of a CCP typically handles a single character of the data stream and terminates with a WAIT instruction. When the CCP's WAIT instruction is executed, the MLCP firmware stores, in the appropriate LCT the current contents of the P-register, R-register, and program indicators. This context will be restored by the MLCP when this CCP is started again.

The MLCP registers and program indicators of particular significance to the CCP are as follows: P-register (program counter) - a 12-bit register that contains the RAM address of the next CCP instruction to be executed; R-register - an 8-bit general register used by CCP instructions; E(Equal)-indicator - an indicator that stores the results of the last execution of a C (Compare) instruction, if the comparison was equal, the E-indicator is set to a 1 (true), this indicator can be tested by a BET (Branch if Equal True) and a BEF (Branch if Equal False) instruction; LC (Last Character)-indicator - an indicator that is set to 1 (true) after execution of a format LD (Load) or ST (Store) instruction that has caused the value of the CCB range field to reach zero. The LC-indicator remains set to 1 until the first LD or ST instruction is executed for the next CCB, at which time the LC-indicator is reset to 0 (false). This indicator can be tested by the BLCT (Branch if Last Character True) and BLCF (Branch if Last Character False) instructions. Also the LB (Last Block-indicator) which indicator is set to 1 (true) when the "active" CCB describes the last CDB in a message (the LB-indicator will be set to 1 provided the LB-bit in this CCB's control field was set to 1 when this CCB was set up). At other times the LB-indicator is reset to 0 (false). This indicator acts as a flag to the CCP - it can be tested by the BLBT (Branch if Last Block True) and BLBF (Branch if Last Block False) instructions. It is not used by MLCP firmware.

There are five types of executable instructions available to the CCP; namely branch instructions, double operand instructions, input/output instructions, send/receive instructions, and generic instructions. Branch instructions are used for branch to target locations depending upon the state of the pertinent indicator, i.e., BLCT, which means branch if last character true, will be executed if the MLCP LC indicator is set to a binary ONE. Double operand instructions are used to execute on two operands in response to a single such instruction. Input/output instructions are used to transfer control, synchronization, transmit fill, status, and character configuration information between the MLCP R-register and the appropriate line registers of a CLA. The input/output instructions can also be used to transfer data characters between the MLCP and a line register of a CLA. Send/receive instructions are used to transfer data between the MLCP R-register and a line register of a CLA. Other information is transferred between the R-register and CLA line registers by means of the input/output instructions.

By way of example, nine generic instructions are available to the CCP, including NOP, WAIT, GNB, DEC, RET and INTR generic instructions described as follows. NOP (No operation) means no operation is performed. The WAIT instruction is used as the last instruction of each CCP and means suspend execution of this CCP and store, in the appropriate LCT, the contents of the MLCP P-register, R-register, and program indicators. (These contents will be restored when this CCP is again serviced by the MLCP.) GNB (Get Next Block) means transfer the contents of the LCT status bytes to the status field of the "active" CCB; at the same time, set the CCB status complete bit to 1 and, in the CCB control field, reset to 0 the "valid" CCB bit, which is bit 1 as shown in FIG. 2; next, move the "active" CCB pointer to the following CCB in the list for this channel. (The next format LD (Load) or ST (Store) instruction will refer to this "new" CCB.) DEC (Decrement R-register) means decrease by 1 the contents of the MLCP R-register. RET (Return From Subroutine) means restore to the MLCP P-register the 12-bit CCP address stored in firmware-reserved LCT bytes when a BS (Branch to Subroutine) instruction was executed. INTR (Interrupt) means to interrupt the central processor unit. This instruction allows the CCP to supplement or override the main memory program's control of which CCBs, when complete, will cause an interrupt to the central processor. One use of this instruction would be to allow a CCP to interrupt the central processor for a receive channel when the CCP has detected the end of a variable-length input message. In this case, because the input message is of indeterminate length, the main memory program could not forecast which CCB will be "active" when the last input character is received - and an interrupt upon completion of each intermediate CCB is generally undesirable because of the burden it imposes on the central processor.

As has been described hereinbefore, each CCP executes so as to process a stream of characters, a character at a time, and so continues to do this unless it suspends itself or is suspended so as to enable another source to be serviced. Such other sources may include, for example, another CCP or an I/O instruction. The CCP being executed is suspended if in fact it has executed a predetermined number of instructions. By way of illustration, thirty-two (32) consecutive instructions may have been executed in the particular CCP before it is caused to suspend by what may be termed a so-called service pause technique. This number of instructions is picked so as to insure that an error condition will not be caused to occur on another channel, for example, a data overrun condition.

Figure 19:
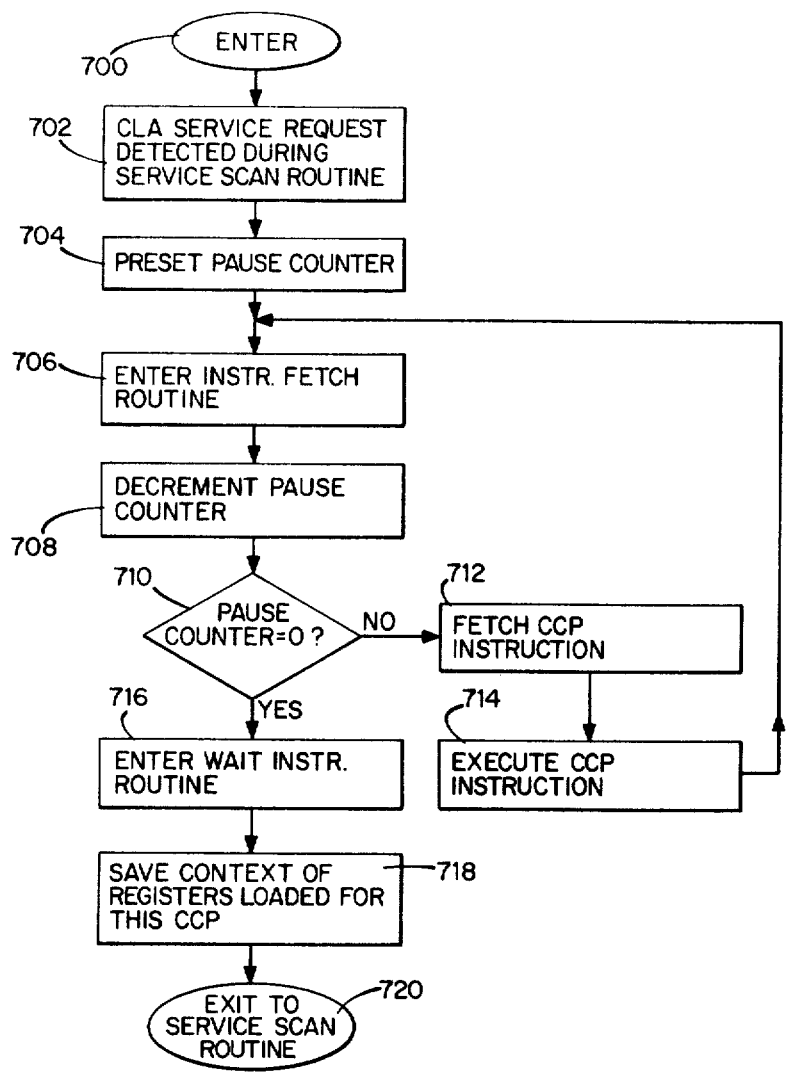
FIG. 19 is a flow diagram illustrating the pause function of the MLCP of the present invention.

Accordingly, now referring to FIG. 19, upon executing the scan routine 604, if in fact a communication line needs servicing and accordingly must initiate the execution of a CCP, the operation indicated by FIG. 19 is entered at block 700 and the CLA service request is detected as indicated in block 702. At this point, a so-called pause counter is preset, that is, the pause counter is preset each time a new CCP is to be executed, or each time the same CCP is reentered from the service scan routine. This is indicated in block 704. The pause counter may be included in the CPE 303 in one of the working registers thereof. With the pause counter preset to a given preset value, the instruction fetch routine 706, shown in FIG. 11 as routines 620, are enabled for execution, following which the pause counter is either decremented or incremented depending upon how the pause counter has been preset. The pause counter is decremented as indicated in block 708 following which it is determined whether the pause counter is equal to a predetermined value such as zero. For example, if the pause counter has been preset to the number 32, and if thereafter decremented, when the pause counter equals zero, this will mean that this CCP should be suspended so as to enable another source to be provided with the service which it may require. If the pause counter does not equal zero as indicated by the No answer from block 710, the CCP instruction is actually fetched as indicated in block 712 and executed as indicated in block 714, following which the next instruction for this particular CCP is again fetched after the entering of the instruction fetch routine as indicated in block 706. This process continues until the pause counter equals zero in which case a Yes answer is indicated by block 710 and the execution of this particular CCP is suspended, following which the process exits to the service scan routine. Thus, the Yes answer from block 710 causes the WAIT instruction routine to be entered as indicated in block 716 except that the service request is not reset, and the context associated with such CCP execution to be saved in the appropriate registers as indicated in block 718. The communication line service pause may then exit to the service scan routine as indicated by block 720. Thus each source which requires servicing, including the I/O command as well as the various channels which require CCP executing including the channel just suspended, will not be blocked from such service for an excessive period of time. Accordingly, each such source requiring service will be so serviced without incurring any error due to timing delays in the system.

As indicated hereinbefore, there is more than one CCB per channel. With up to two so-called CCBs per channel, the two CCBs are set up so that when one CCB is complete, another CCB will take over. However, when the first block is used up, and since the data stream is still coming in, then the other block must be switched to immediately. This switching must be done very quickly so that in fact no characters will be lost. It has been found however that even two such CCBs are not sufficient. For example, on receive, it is possible to complete the first block and then get the message in the second block very quickly. Accordingly, a third block is needed immediately. This is so because for example right after a message which fills up the entire first block, just a small portion of the message may complete the second block, without providing the time needed to reset the first block. The need for a third block is apparent. In most cases, because of the early termination in the second block, the CPU has not had sufficient time to react and indicate that the first two blocks, or at least the first block, is now available for use again. Thus a third block is necessary and possibly at least four blocks.

Thus, in using at least three CCBs, the interrupt bit 204 in the control byte 5 of FIG. 2 in indicated in one of such CCBs in by way of example the three CCB system, depending upon line speed and the size of blocks in main memory, and is set so that at least one CCB is available upon receipt of the interrupt from the CPU. Upon receipt of such interrupt by the CPU, it then reacts accordingly and initializes the CCB thereafter for further use.

The mechanism for switching between CCBs is as follows. First of all it it noted that each CCB has a particular range. This range refers to the size of the block in memory. There are instructions in the central processing unit and CCPs which are designated branch if last character is true (or false), which enables such switching between CCBs. The manner in which such CCBs are addressed has been shown by element 310 shown in FIG. 8. This hardware implemented I/O command Logic 310 will now be discussed in more detail with respect to FIG. 20, which also shows the manner in which a CCP may also be interrupted in its execution by an I/O command issued by the CPU 102.

Figure 20:
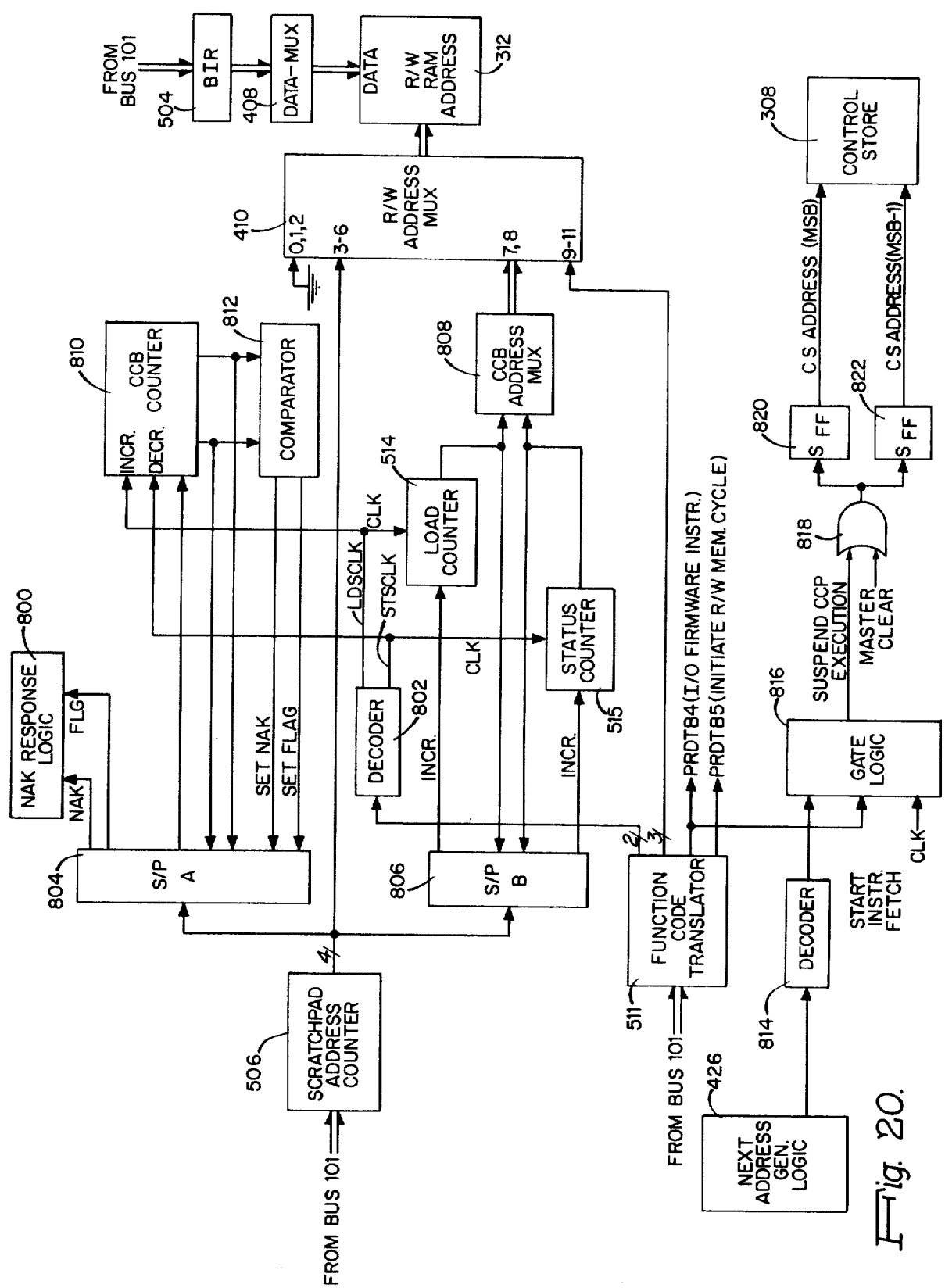
FIG. 20 is a detailed logic block diagram of hardware implemented command logic of the MLCP of the present invention.

As can be seen from FIG. 20, there are three inputs as shown from bus 101. The first input is to scratchpad address counter 506, a second input is to function code translator 511, and a third input is to the bus input register 504. Each of these elements for receiving signals from the bus 101 have been discussed hereinbefore. Coupled to the output of scratchpad address counter 506 are two scratchpad memories A and B, respectively elements 804 and 806, which are referred to in FIG. 8 collectively as scratchpad 516. Both scratchpads are 16 by 4 bit arrays, there being 4 bits for each of the 16 channels. Scratchpad 804 is utilized to store a NAK indicator, a flag indicator and a CCB count. The scratchpad element 806 is utilized to store the load count of counter 514 and the status count of counter 515 respectively.

As indicated above, scratchpad 804 is utilized to store the CCB count. This is the count of CCB counter 810 which is utilized to provide control of the accessing of the various CCBs. For example, since there are no more than four CCBs per channel, it is imperative in order to avoid errors that no more than four CCBs be loaded for a particular channel. Further, it is also imperative that erroneous status information not be read. Accordingly, if there are no CCBs loaded, the CPU must be blocked in any attempt to read the status of a CCB for which there is no valid information. Thus, what the CCB counter 810 does is to keep track of the count in the load and status counters 514 and 515 respectively by, in fact, keeping a count of the differential between the two counts of counters 514 and 515. For example, if for a particular channel there are two CCBs loaded, then CCB counter 810 will indicate a count of two for that channel. If the next command from the CPU is to determine the status of a CCB for that channel when using an input next status command, the use of that CCB would be completed and in response to such command, the CCB will reset and the CCB counter 810 will be decremented to indicate a count of one.

The bus input register 504 is coupled to receive data over the bus 101 and to write such data into the RAM 312 by way of the data multiplexer 408. The register 504 is also coupled as shown in FIG. 8 to transmit data to the bus 101. The data received from the register 504 or transferred thereto is that data which is in the location addressed by the address multiplexer 410. Address multiplexer 410 basically has four inputs as shown. Because the CCBs are located in the address range of 3584 to 4095 as indicated in FIG. 6, the most significant bits 0, 1 and 2 are forced by means of a ground connection and inversion (not shown) to a binary ONE so as to independently of the addressing of bits 3 to 11, address the initial location in the RAM 312 for the CCBs. The next four most significant bits 3 through 6 on the input of the address multiplexer 410 are received from the scratchpad address counter 506 which in turn receives such four address (channel select) bits from bus 101. Counter 506 is utilized to address one of the 16 locations of the scratchpads 804 and 806, as well as the four highest order bits utilized for actually addressing the CCB area in the RAM 312. Bits 7 and 8 are addressed by means of the CCB address multiplexer 808 which receives inputs from either the load counter 514 or status counter 515. Thus, while inputs 3 through 6 enable the blocks of four CCBs to be addressed, the address inputs to lines 7 and 8 enable addressing to the individual CCB each of which is only 8 bytes in length. The final input is received from the function code translator 511 to the least most significant bits 9 through 11 of the address multiplexer 410 thereby enabling the addressing of an individual byte in a CCB.

As previously indicated, scratchpad 804 is also capable of storing NAK and flag indications. The NAK indications is set in scratchpad 804 if there have been four CCBs loaded for a particular channel since the most recent input next status command. The NAK indication is immediately sent back to the CPU indicating an erroneous command if the CPU attempts to load another CCB for the particular channel. In this manner the CPU is notified immediately with a NAK indication without having to wait for the MLCP to check at this time the validity of the command from the CPU. The flag indication on the other hand is utilized to store the fact that there are no CCBs currently loaded for this particular channel thereby indicating by means of a NAK signal that the request for status of the CCBs for that channel is erroneous and that there are no CCBs set up thereby eliminating the reading of invalid status information from the CCB.

By way of illustration of the operation of the logic of FIG. 20, a decode is made of a portion of the function code received by translator 511 by means of decoder 802 which indicates by means of either an LDSCLK signal or a STSCLK signal that either a load command or a status command respectively has been received from the CPU. The load command will increment the CCB counter 810, whereas the status command will decrement the CCB counter 810. In addition, as the CCB is loaded in response to a load command, the contents of the CCB counter are stored in scratchpad memory 804 for later use relative to the particular channel addressed. The value so stored is loaded back into the CCB counter at the beginning of a subsequent load command. The same operation is true for the status command, except that the CCB counter 810 is decremented and instead of incrementing the load counter, the status counter 515 is incremented. Following such status execution, the updated status from the counter 515 is loaded into the scratchpad memory 806 as was the case for the load counter 514.

Thus, each time there is either a load or status command from the CPU so as to address a CCB, then either the load counter 514 or the status counter 515 is incremented and the CCB counter 810 is either incremented or decremented. After each such command the values of the counters 810, 514 and 515 are stored in the respective scratchpad memories 804 and 806. Comparator 812 is utilized to determine whether or not the CCB counter 810 has reached the maximum count or if it indicates a minimum count. If there is a maximum count of four, the SETNAK signal is generated so as to provide an immediate NAK response to the CPU by means of the NAK response logic 800 should the CPU issue another load CCB command for that particular channel. Comparator 812 is also coupled to provide a SETFLAG command if the CCB counter value is all zeros thereby indicating that there are no further CCBs set up for this channel and accordingly if the next command for this channel is a status command, it will also receive a NAK response by means of logic 800. The NAK response logic 800 is fully described in the aforementioned U.S. Pat. No. 3,993,981, issued on Nov. 23, 1976.

The function code translator 511 also provides translation or decoding of signals received from the bus, for example, to initiate a read/write memory cycle as indicated by the signal PRDTB5 or functions to indicate an I/O firmware instruction as indicated by the signal PRDTB4. This signal is utilized to enable the CPU to break into the execution of a channel control program so as to provide a response without delay to an I/O command issued from the CPU regardless of the fact that a CCP was then being executed. As indicated hereinbefore, the CCP will not be interrupted unless it issues its own WAIT command or if it is forced to issue a WAIT command by means of the pause technique of the MLCP. The MLCP may also have the CCP programs interrupted if there is an I/O command from the CPU. This I/O command as indicated by the PRDTB4 signal, will be received by gate logic 816 which in addition to receiving the system clock signal also receives an indication of the start instruction fetch as decoded by means of decoder 814 coupled to the output of the next address generation logic 426. Thus, the CCP will not be interrupted in its execution until it has in fact completed execution of its current instruction and is in the process of fetching another instruction. If gate logic 816, which functionally may be an AND gate, is fully enabled, then a suspend CCP execution signal will be provided to OR gate 818. This signal will cause the control store 308 to be forced to an address which is the starting address of the firmware for processing input/output instructions issued by the CPU. The organization of the firmware commands in control store 308 is such that these I/O commands are processed by a routine which will be addressed if the two most significant bits of the control store address are forced to binary ONEs and the remaining bits are set (or reset) as for the CCP instruction fetch. The Master Clear signal, via gate 818 will also set these two flip-flops 820 and 822 and other flip-flops used to address control store 308 in order to initialize the MLCP. This is accomplished by the setting of flip-flops 820 and 822 which are a portion of the address mechanism for addressing control store 308. Thus the selected I/O command will be addressed and the CCP execution will be interrupted so as to process the indicated higher priority I/O command.

Figure 21:
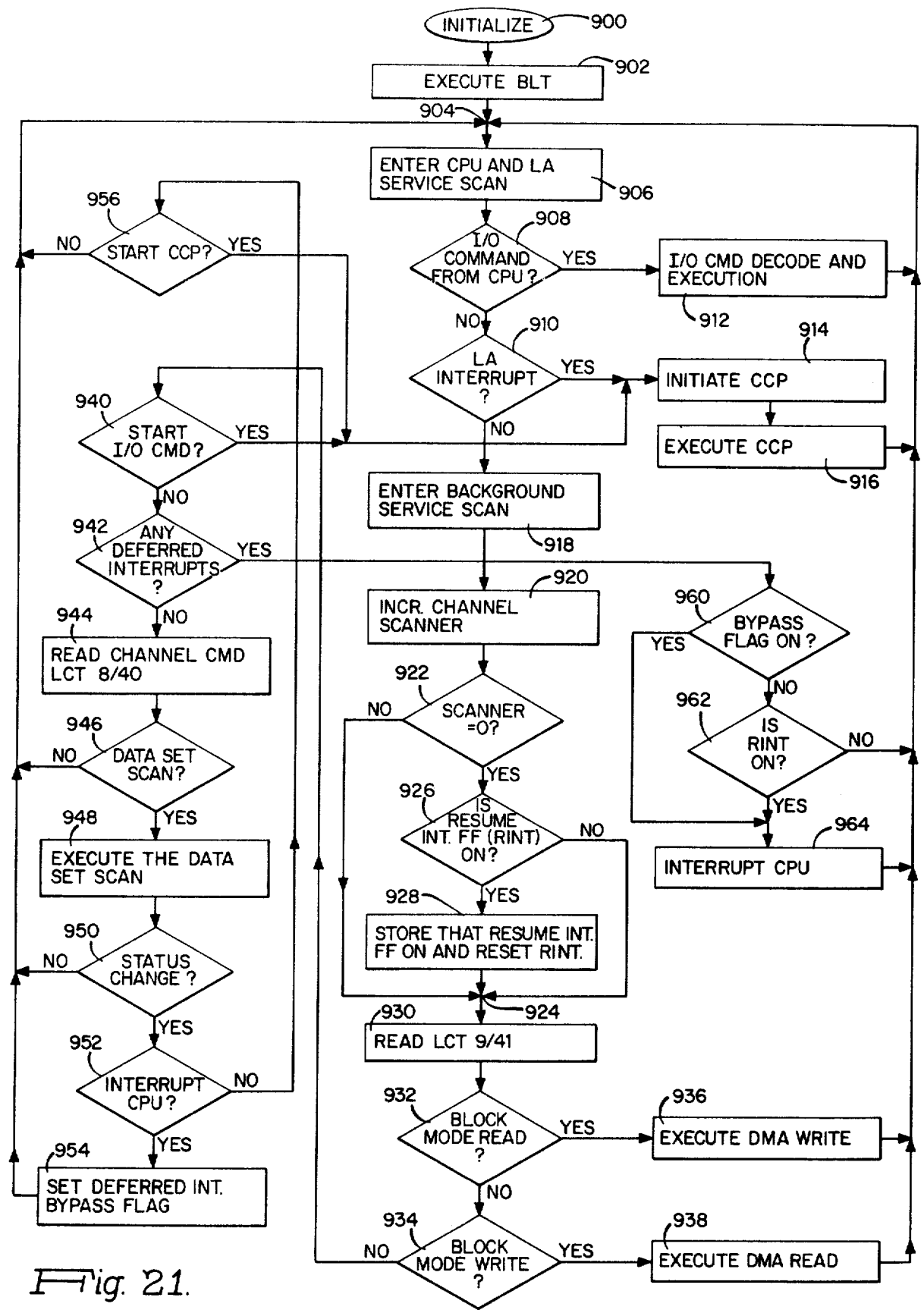
FIG. 21 is a functional flow diagram of the firmware of the MLCP of the present invention.

The various functional routines provided by firmware of the MLCP of the present invention has been discussed with respect to FIG. 11. The major functional steps performed by the firmware in the overall operation of the MLCP is shown in FIG. 21 which shall be presently discussed. Further details of the firmware operation thereof are shown in the firmware flow diagrams for the various routines of the MLCP of the present invention in the Appendix hereto. Now referring to FIG. 21, as indicated by block 600 in FIG. 11, initialize is performed as indicated by block 900 in FIG. 21. Following this the basic logic test is performed as indicated by block 902. At this point a major junction in the CPU firmware is entered and more particularly at point 904 at which the service scan routine, by which the CPU and line adapters are serviced, is entered as indicated by block 906. During the service scan, the priority is whether or not an output command has been issued from the CPU as indicated by block 908 following which if there is a No answer, it is determined whether or not a line adapter has made an interrupt as indicated by block 910. If there has been an I/O command from the CPU, then the I/O command is decoded and executed as indicated by block 912 and point 904 is again entered. If there is a line adapter interrupt as indicated by block 910, then the channel control program is initiated and then executed as indicated by blocks 914 and 916 respectively, following which point 904 is again entered.

If there is a No result from the line adapter interrupt block 910, then the background service scan routine will be entered at which time the channel scanner is incremented. The channel scanner is stored in the CPE 303 and is used to address the LCT. Typically, each channel is scanned consecutively before any other service is provided. Thus the background service scan routine is entered as indicated by block 918, following which the channel scanner is incremented as indicated by block 920. At this point, the channel scanner is checked to see if the scanner is equal to zero as indicated by block 922. The significance of this check is to enable each of the channels, 16 in number, to be scanned consecutively to determine the need for servicing thereof. If the answer to block 922 is No, then point 924 is entered so as to provide the service for that particular channel addressed by the channel scanner. If the answer to block 922 is Yes, then block 926 is entered to determine whether or not the resume interrupt flip-flop is on. The significance of this is that interrupts will not be made to the CPU, if in fact the interrupt level at which the CPU is executing is a higher priority, that is, a lower priority number than the unit coupled to the bus 101 which is desirous of causing an interrupt. See U.S. Pat. No. 3,984,820, issued on Oct. 5, 1976 for details of the interrupt mechanism providing this function. When the CPU changes its interrupt level, it will issue an interrupt level change to the devices coupled on the bus 101 indicating that there has been a level change and accordingly an interrupt may be tried again. This will set the resume interrupt flip-flop (RINT) and in that case a Yes answer will be generated by decision box 926. The Yes answer having been so generated, this fact is stored in a more or less permanent storage and the RINT flip-flop is reset, as indicated by block 928. If the answer to block 926 is No, then point 924 would have been directly entered. In any case, after the operation as indicated in block 928, the LCT byte 9 or 41 will be read for the particular LCT pointed to by the channel scanner, as indicated by block 930, following which there will possibly be either a block mode read or a block mode write operation depending upon the answers to decision blocks 932 and 934.

Figure 17:
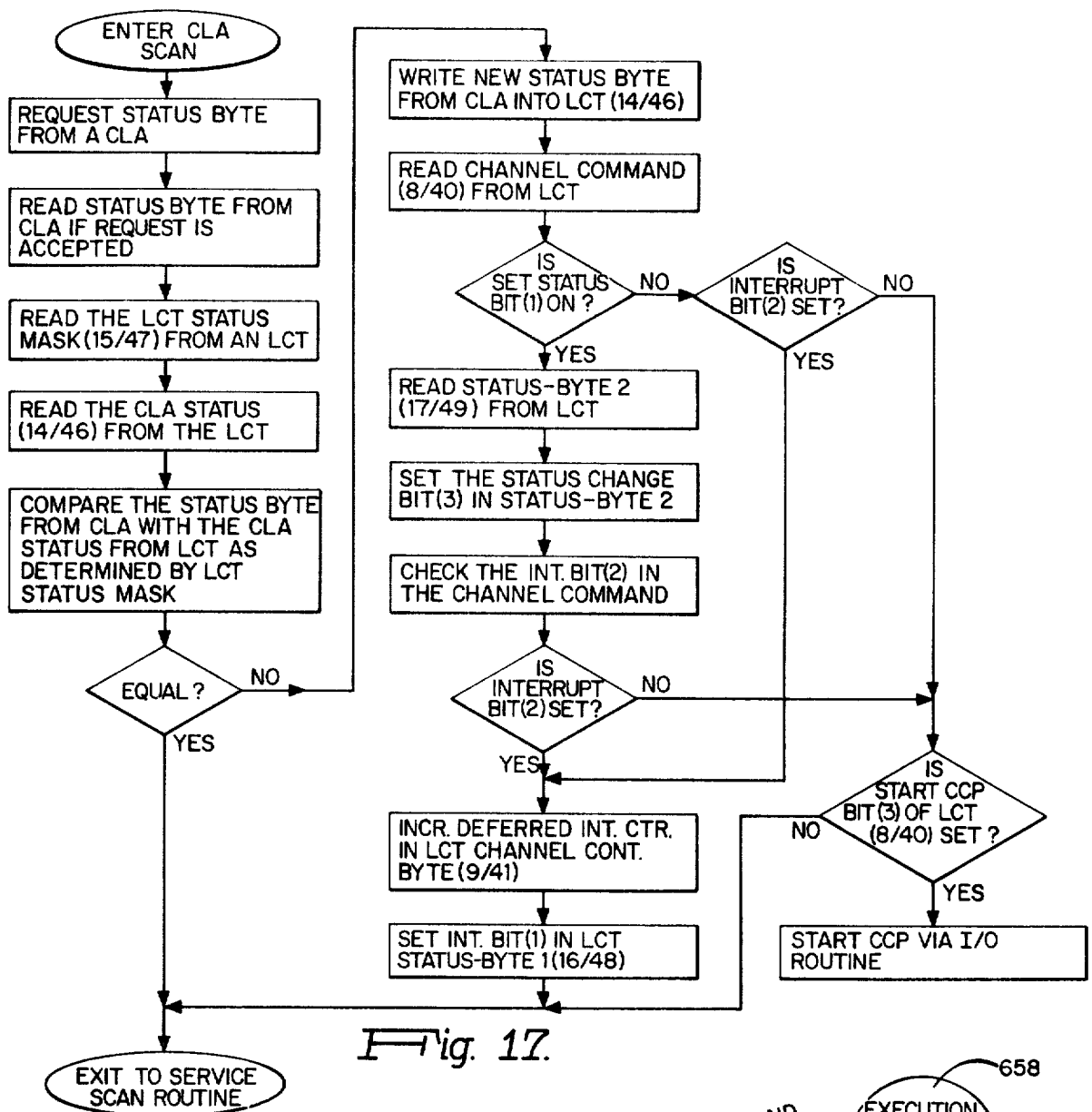
FIG. 17 is a flow diagram of a scan operation utilized by the MLCP of the present invention.

Block mode read means that the data will be read from the MLCP and written into the main memory and accordingly the Yes answer from block 932 will cause an execution of the DMA write routine which writes the data into the main memory 106. This is indicated by block 930. If there is no block mode read indicated, then a block mode write is entered if the answer to block 934 is Yes, in which case the DMA read is executed as indicated by block 938. After the execution as indicated by blocks 936 and 938, the service scan routine is entered by way of point 904. If there is no block mode write then decision block 940 is entered by which it is determined whether or not there is a start input/output command. If the answer is Yes, then the channel control program is initiated as indicated by block 914 following which it is executed as indicated by block 916. If the answer to block 940 is No, then the data set scan routine is entered if the decision of block 942 is No, that is, that there are no deferred interrupts. This No answer will cause the channel command to be read into the LCT 8 or 40 for the particular channels LCT as indicated by block 940. The decision is finally made as to whether or not there is a data set scan and if the answer is No, then point 904 is entered, whereas if the answer is Yes, as indicated by block 946 then the data set scan is actually begun as indicated by block 948. If there is no status change, as indicated by block 950, then point 904 is again entered, whereas if there is a status change, then the decision of block 950 is executed and decision block 952 is entered. Further details of this data set scan are shown in FIG. 17. If the answer to block 952 is Yes, then a deferred interrupt bypass flag is set as indicated by block 954 and the service scan routine is again entered. If the answer to block 952 is No, then the question is asked as to whether or not a channel control program should be started, as indicated by block 956. If the answer is No, the service scan routine is again entered, if the answer is Yes, then the channel control program is initiated and executed as indicated by blocks 914 and 916.

If the answer to block 942 is Yes, that is, that there are deferred interrupts, then block 960 is entered to determine whether or not the bypass flag may have been set during a previous execution of block 954. If it is on, a Yes answer will be indicated by block 960, and block 962 will be entered by which the CPU will be interrupted. Following this, a service scan will be entered and an interrupt to the CPU may be executed by way of an I/O command received back from the CPU which is executed as indicated by block 912 if the answer to decision block 908 is Yes. Otherwise, other sources requiring service will be sought.

If the bypass flag is not on as indicated by decision block 960, then the question is asked as to whether or not the resume interrupt flip-flop is on as indicated by block 962. If the RINT flip-flop is not on, then the service scan routine is again entered, whereas if it is on, then block 964 is entered by which the interrupt of the CPU is generated as indicated just above. Thus, the various interrupt sources are handled in a unique way so as to provide efficient operation of the system while increasing the throughput thereof.

It has thus been seen that the primary function of the CLAs is to act as a converter such that on transmit, it converts a byte into serial by bit format and on receive it converts the serial by bit format into bytes for transfer to the main memory, a word (two bytes) at a time. Another function of the CLAs is to take the burden from the MLCP of handling various electrical characteristics associated with different types of lines. It has been seen that the function of the MLCP is on receive mode to take those characters and to assemble them into blocks in main memory. The MLCP further performs various control operations on those blocks such as a control character detection error checking, and so forth. Thus, on receive, the MLCP receives the characters from the CLAs which in turn receives characters bit by bit from the communication lines. The MLCP accumulates up to two received bytes or characters at a time and stores them in the appropriate LCT byte locations. By means of the CCB, it transfers and thereby stores a string of such bytes in the appropriate block in main memory. In the process of assembling these blocks, by means of the CCBs, these blocks are labeled as good or bad, that is, the status indicator indicates whether it has received a good string of characters or not.

In transmit mode the reverse is true, that is the MLCP takes a block of characters in main memory a byte at a time, actually a word at a time, because of the width of the data transfer on bus 101, and transfers by byte the characters to the CLA which in turn transmits the bytes serial by bit. When the transfer of such block is complete, the MLCP interrupts and informs the CPU of such event. Thus, by means of the CCBs, given the starting address in main memory and the range, the transfer of information between the main memory and the communication lines is virtually independent of the CPU and only require minimum controls by the CPU. In so doing, at the end of the transfer of the message, even though more than one CCB is used for that message, the CPU is notified and at that time it takes the appropriate action.

It has further been seen that within the MLCP, there are three basic elements which operate on the bytes or characters which are transmitted or received. As indicated hereinbefore, they are the CCBs, CCPs, and the LCTs. The CCP is primarily a control mechanism which utilizes the CCBs and LCTs to operate on such characters. For example, the CCP processes the various bytes and, for example, may accumulate the data for the CRC checks, make a translation, count the number of such bytes, or check for control characters and depending upon the receipt of such control characters add additional information or delete certain information. The CCP is normally started by either the CLA indicating that it needs a character from the CPU or that it has a character for the MLCP for transfer to the main memory.

Thus, the CLAs functions as a bit processor whereas the CPU basically functions as a block processor since it in fact sets up the CCPs in the MLCP. The MLCP via its CCP functions as a byte or character processor. By way of illustration, if there is a block of characters set up in main memory which must be transmitted to, for example, three different terminals over three different communication lines, with each such terminal requiring a different communication format, then by use of three CCPs, the data from a single block in the main memory may be transferred over such three communication lines and in the proper format for each of the receiving terminals. Transfer of such bytes from the block in memory is accomplished at a rate dependent upon the lines for that particular terminal so that, for example, high speed communication lines may receive the entire block in less than a second, whereas a TELETYPE unit may receive the information over a period of ten seconds. Thus in so transferring the bytes for the example of three communication lines, a byte is transferred from the main block in main memory to three different LCTs, each LCT corresponding to a different line and may be transferred three separate times for each such LCT. These bytes are transferred to the LCT dependent upon the speed at which the CLA for that particular communication line is requesting service.

APPENDIX

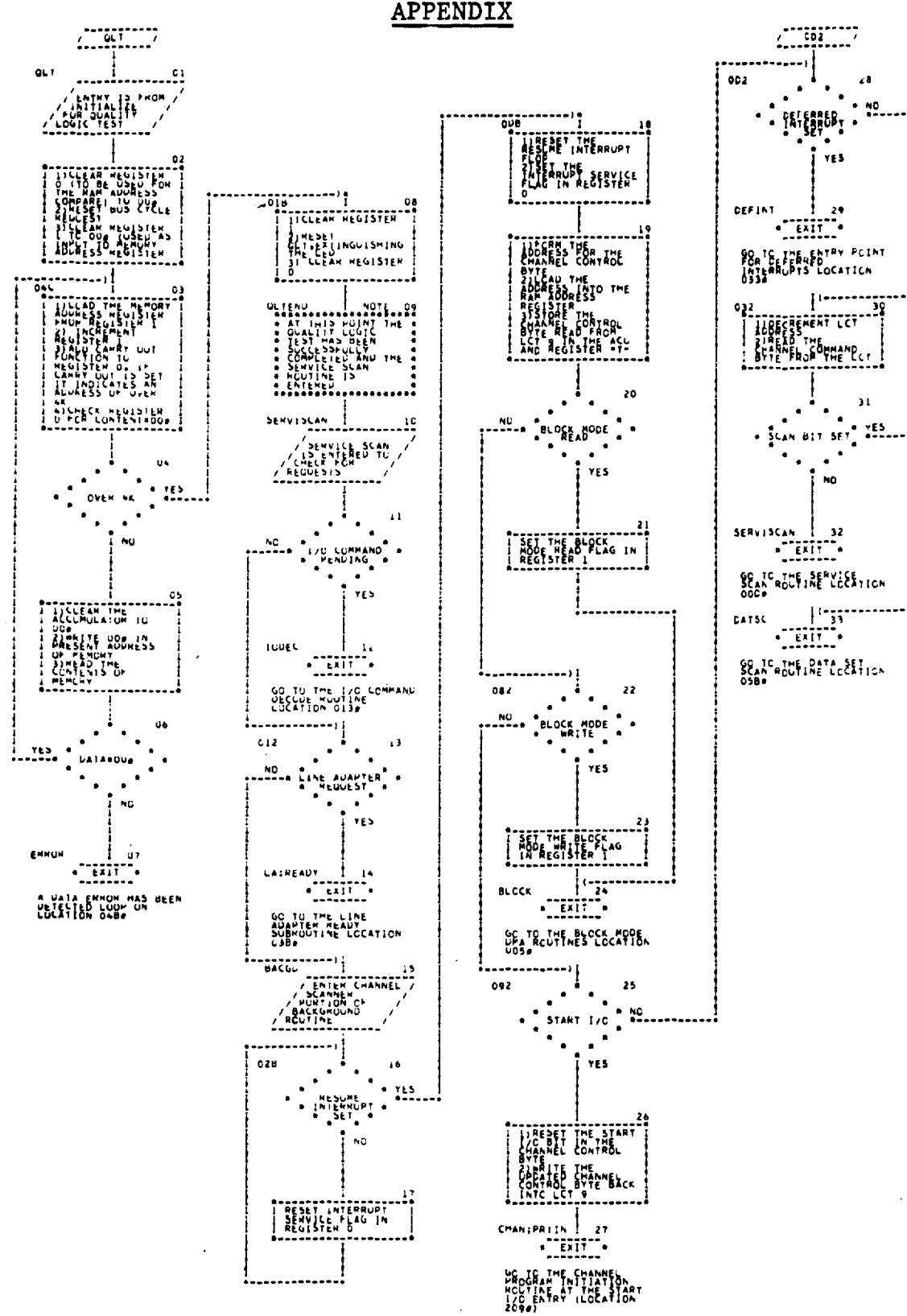

Quality Logic Test/Service Scan/
Channel Scanner Routines

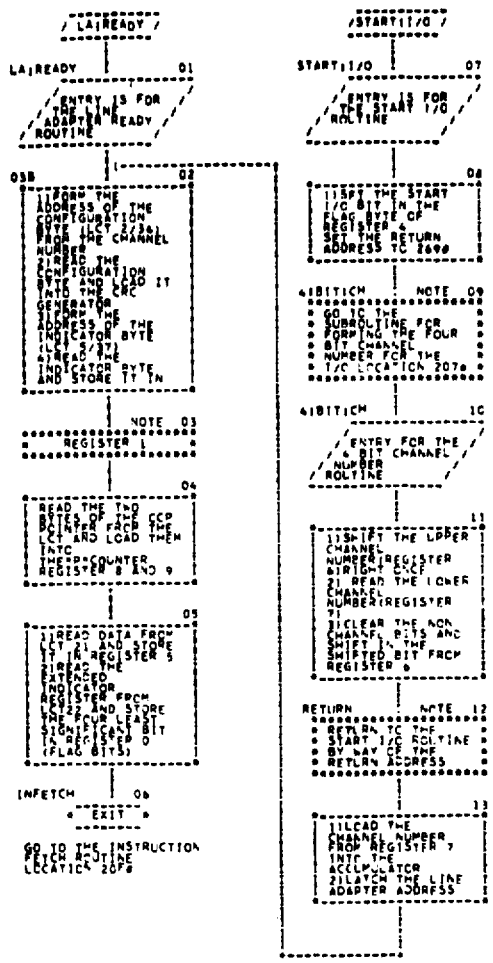
Line Adapter Ready/Start I/O/Form 4-Bit Channel Number for I/O Routines

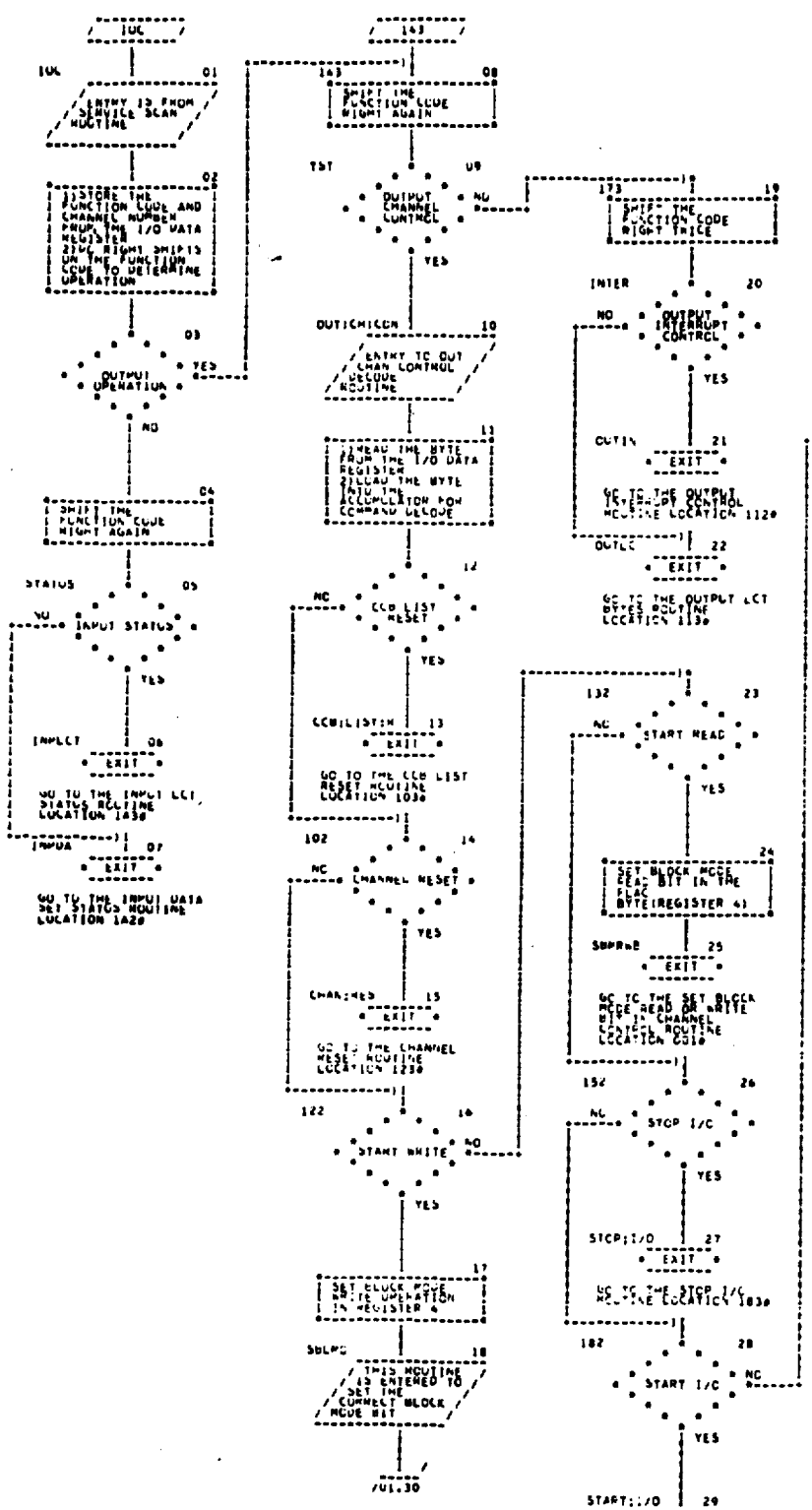
I/O Command Decode/Output Channel Control/
Set Block Mode Routines

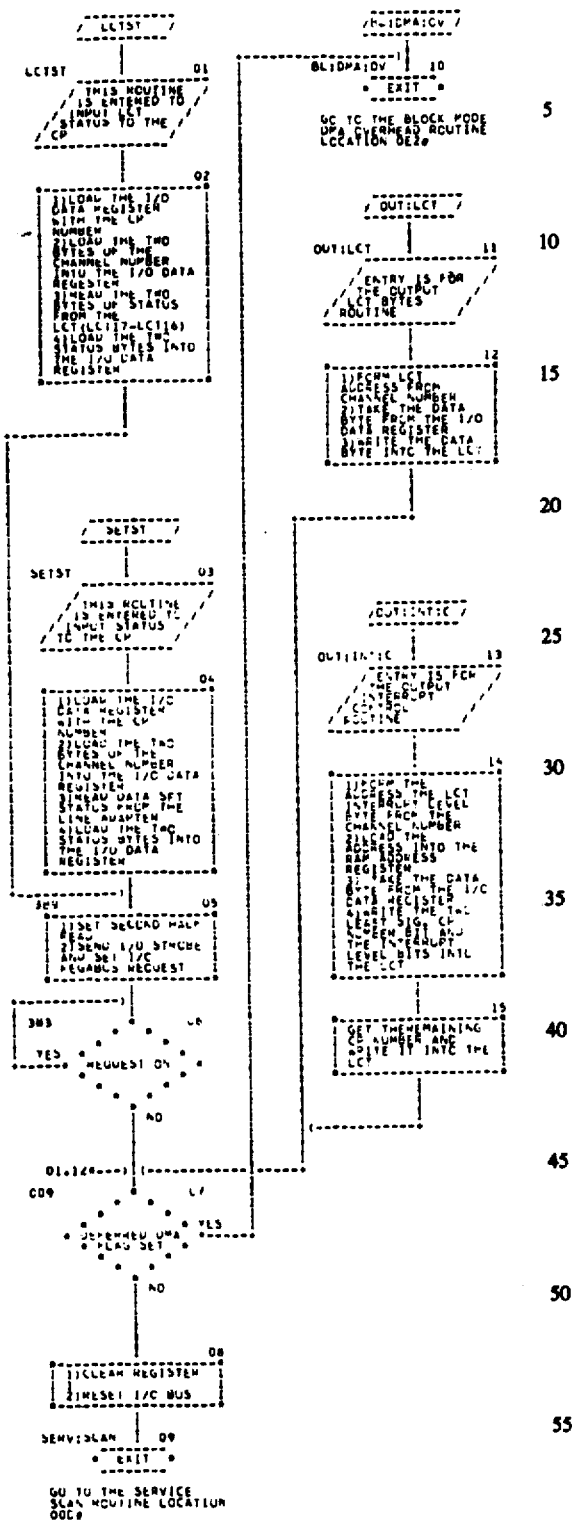
Initialize Routine
Input LCT Status/Input Data Set Status/Output
Interrupt Control/Output LCT Bytes Routines

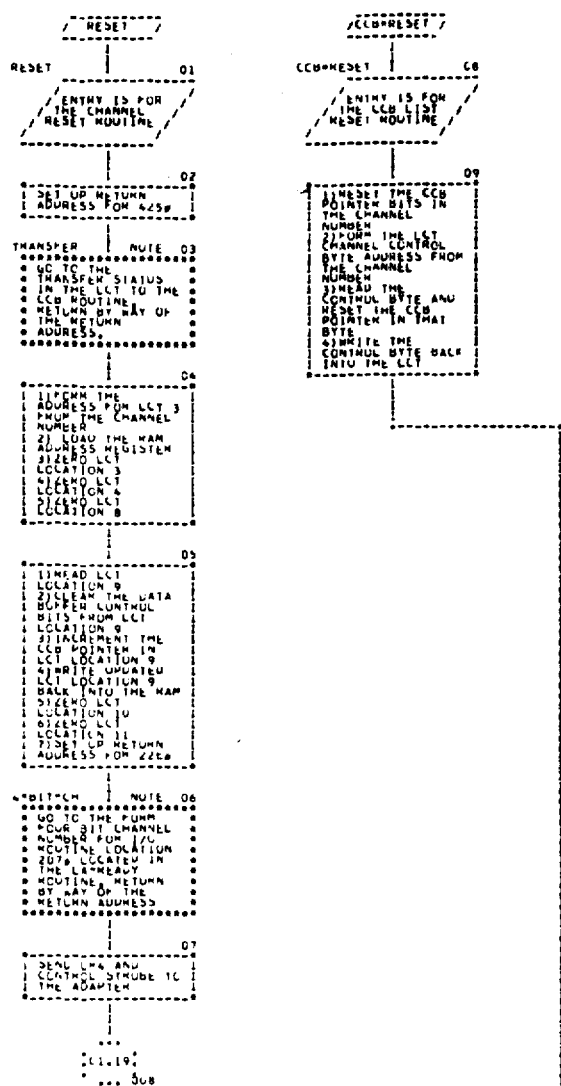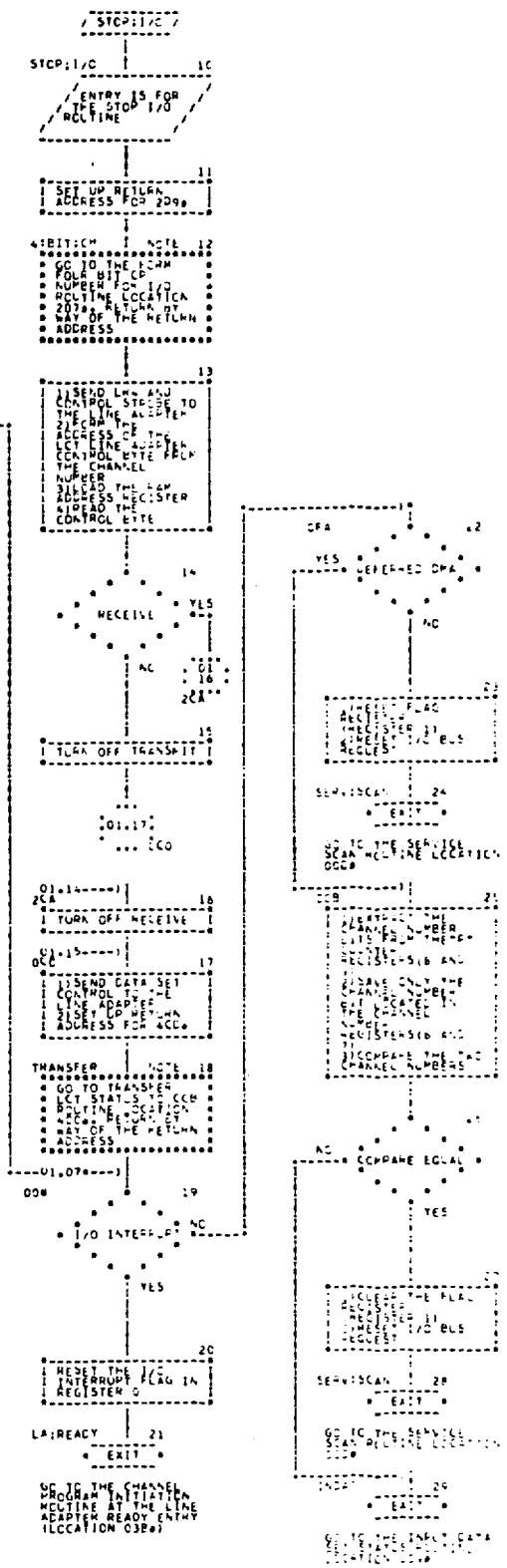
Channel Reset/Stop I/O/CCB List Reset Routines

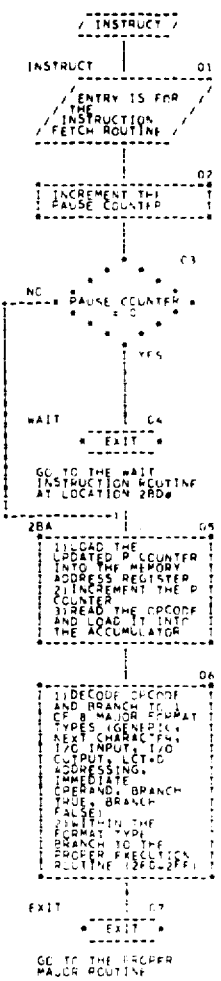
Instruction Fetch Routine

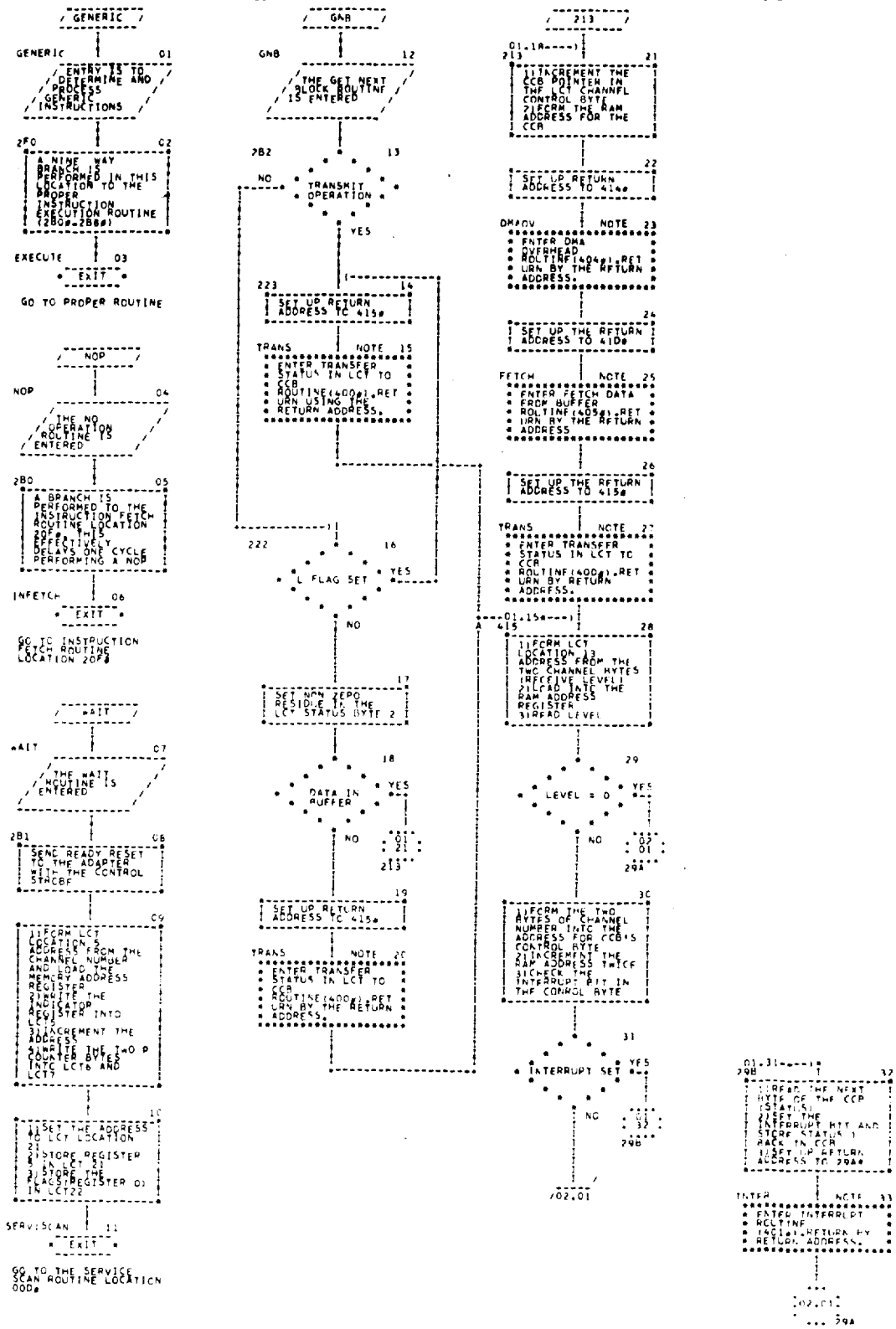
Generic Instructions Routines (Sheet 1 of 2)

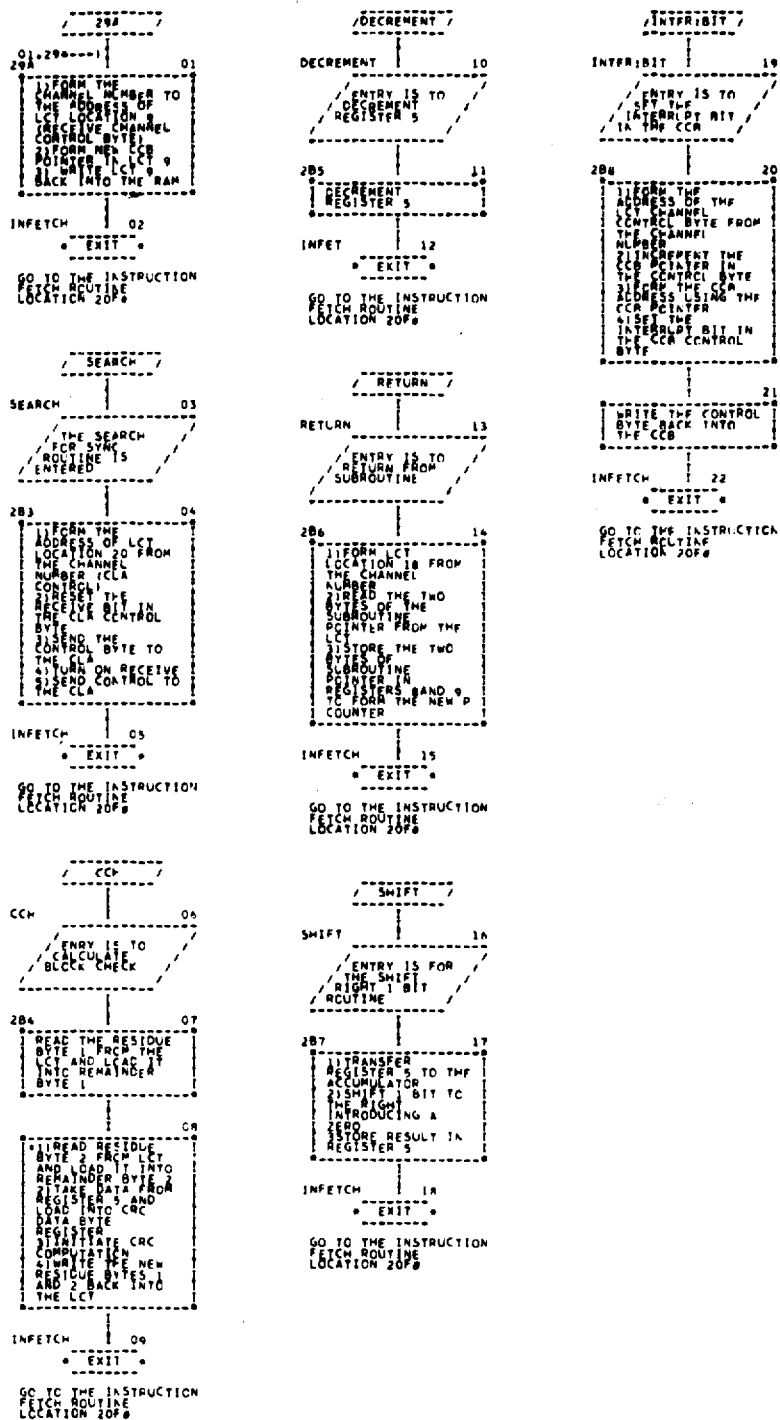
Generic Instructions Routines (Sheet 2 of 2)

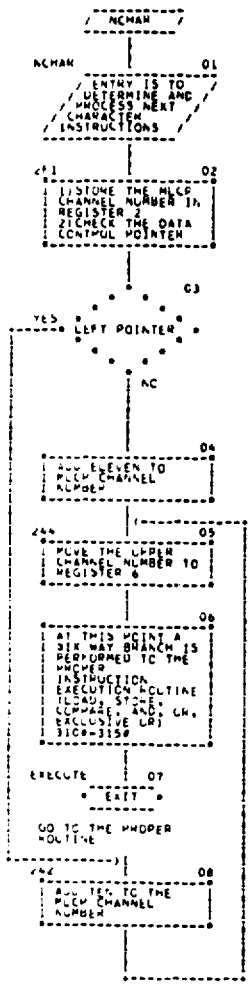
Input Line Register Instructions Routines (Sheet 1 of 4)

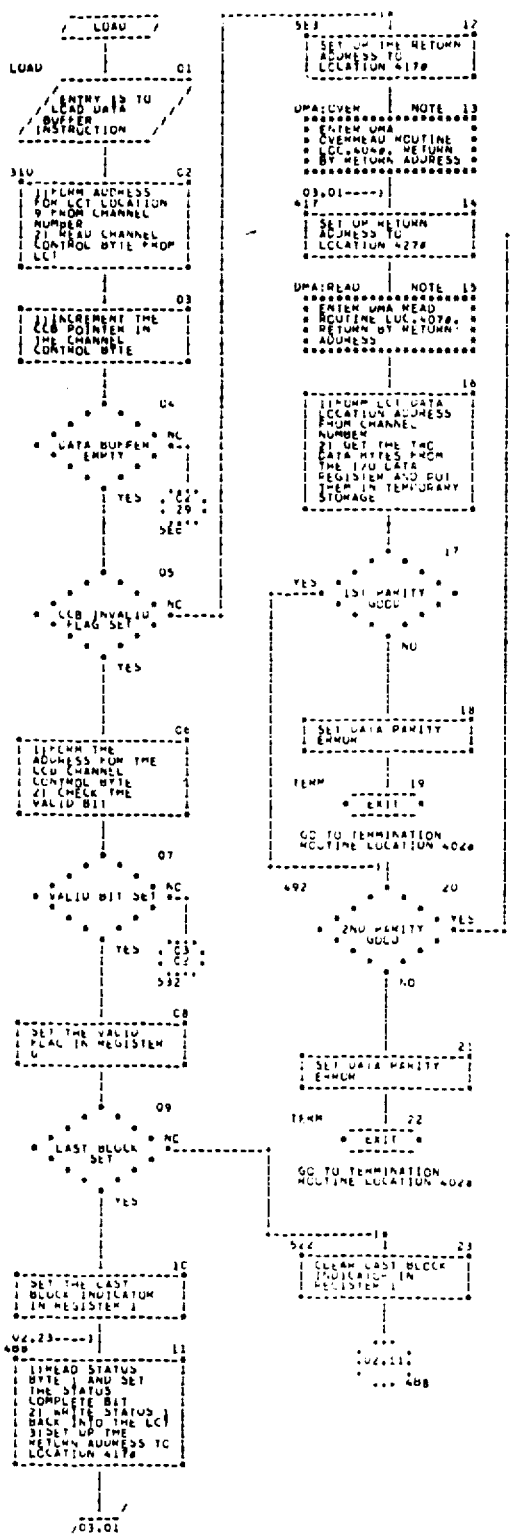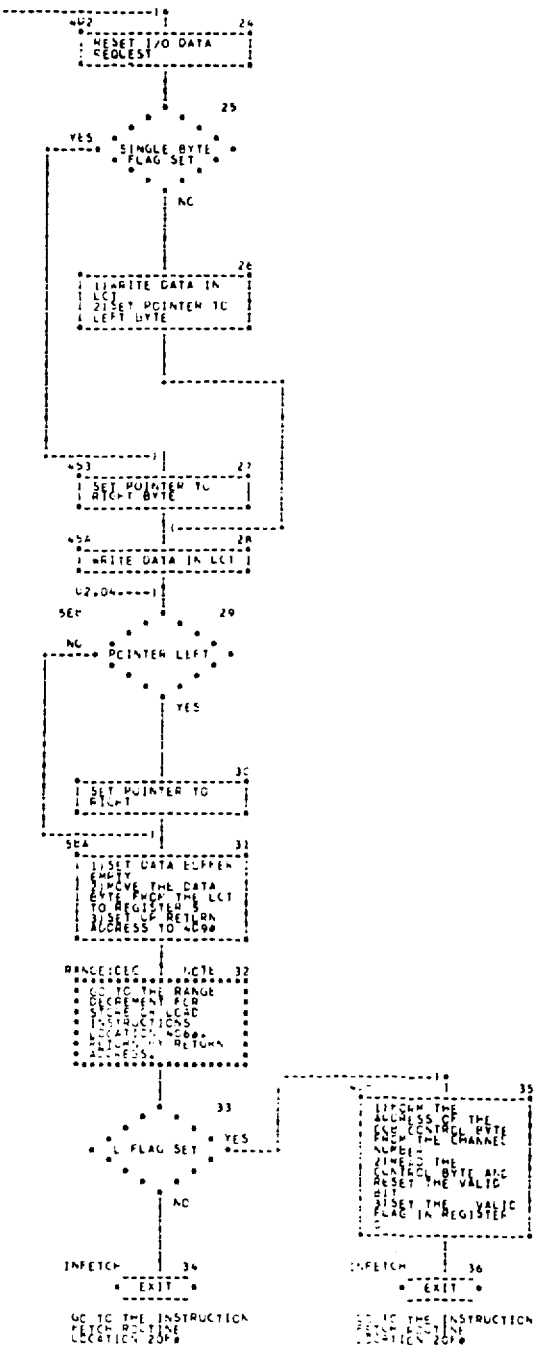
Input Line Register Instructions Routines (Sheet 2 of 4)

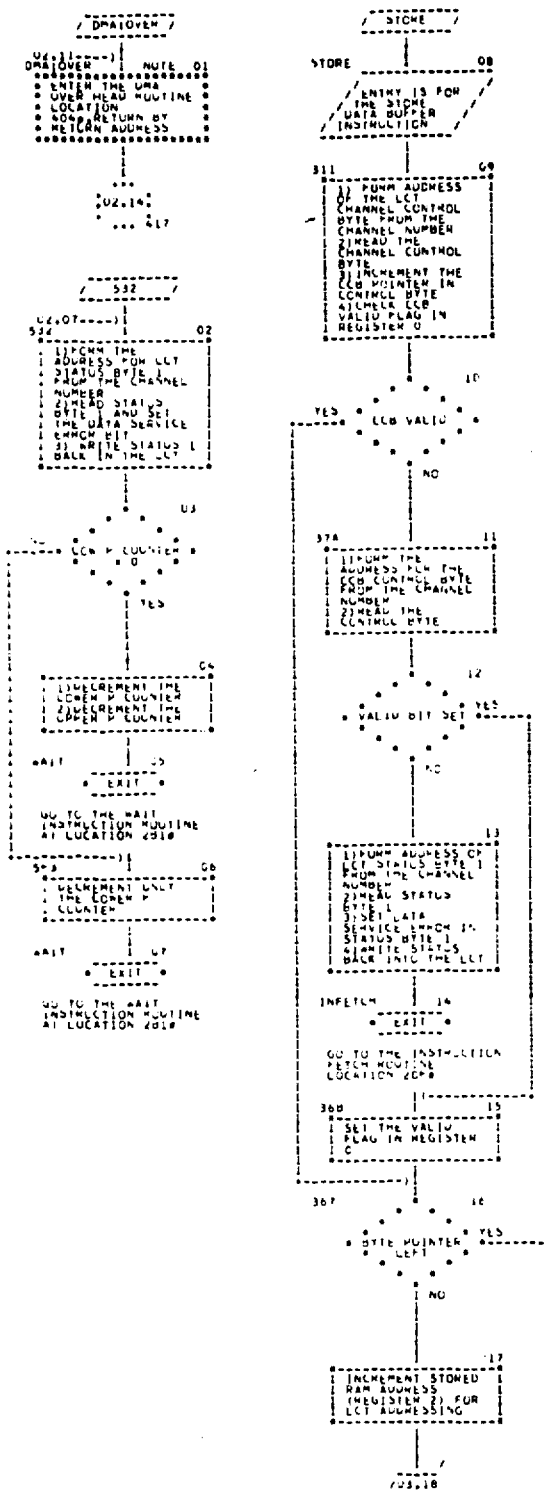
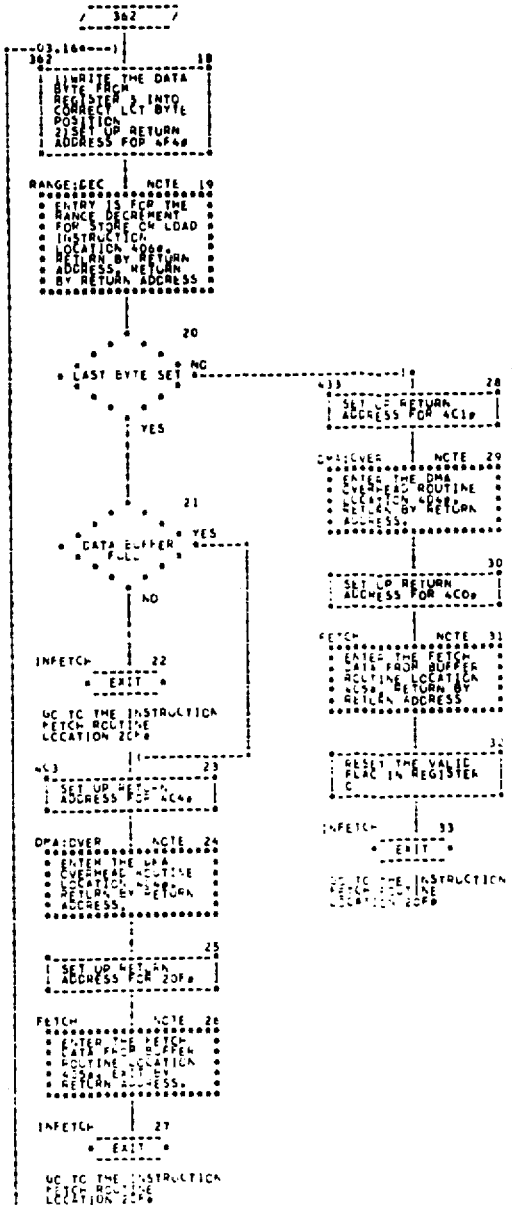
Input Line Register Instructions Routines (Sheet 3 of 4)

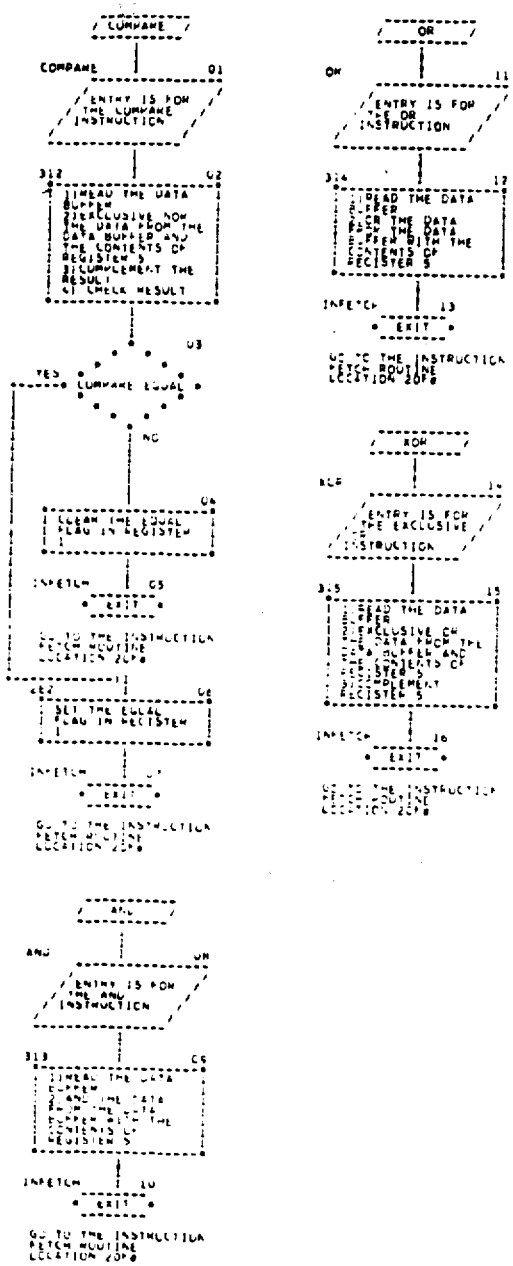
Input Line Register Instructions Routines (Sheet 4 of 4)

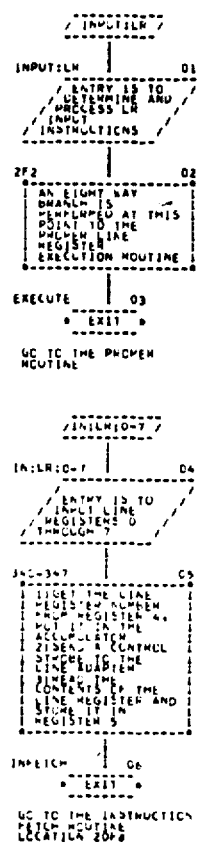
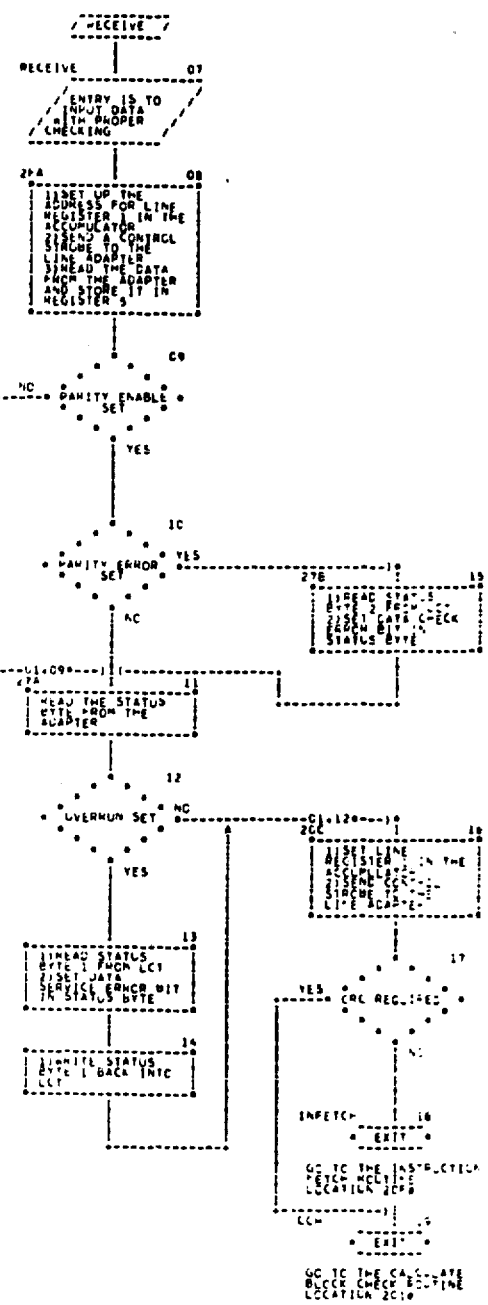
Input Line Register/Receive Routines

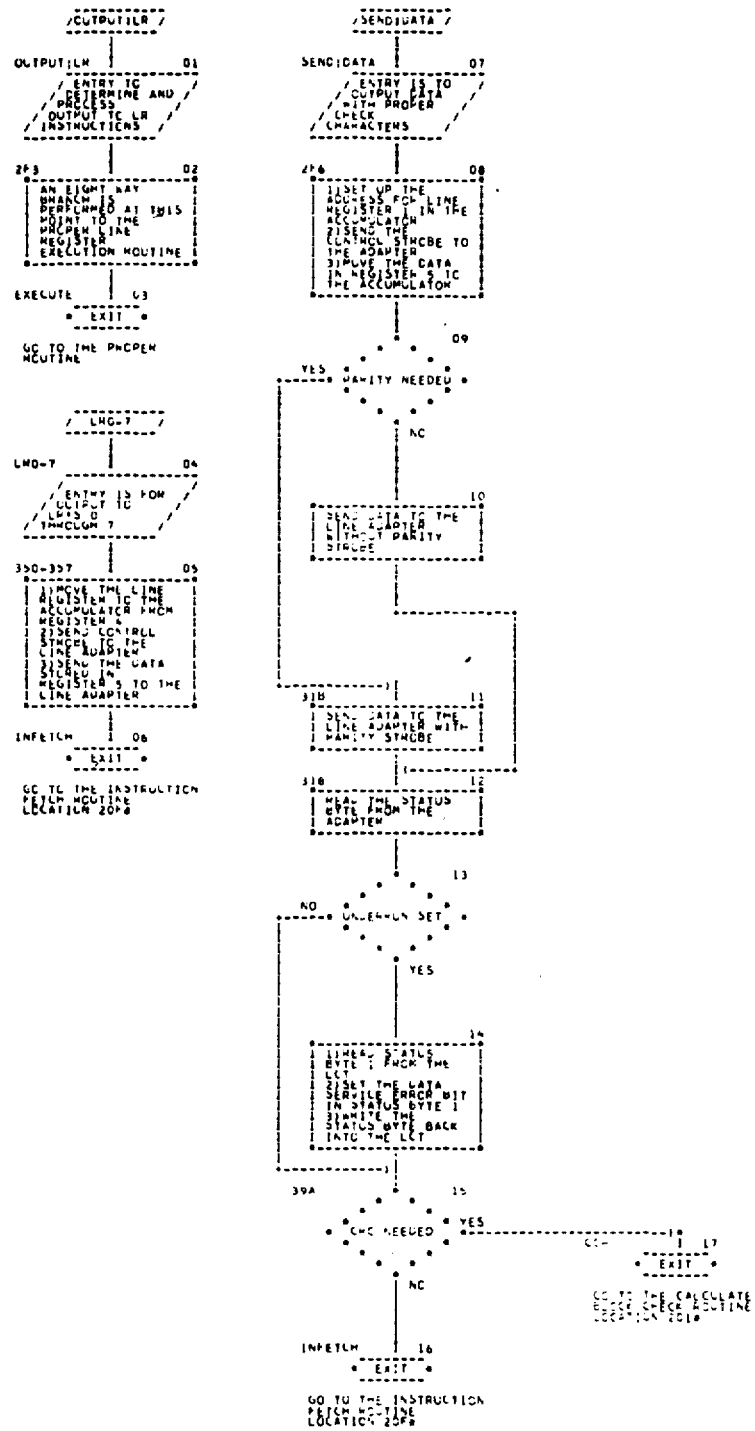
Output to Line Register Instruction Routines

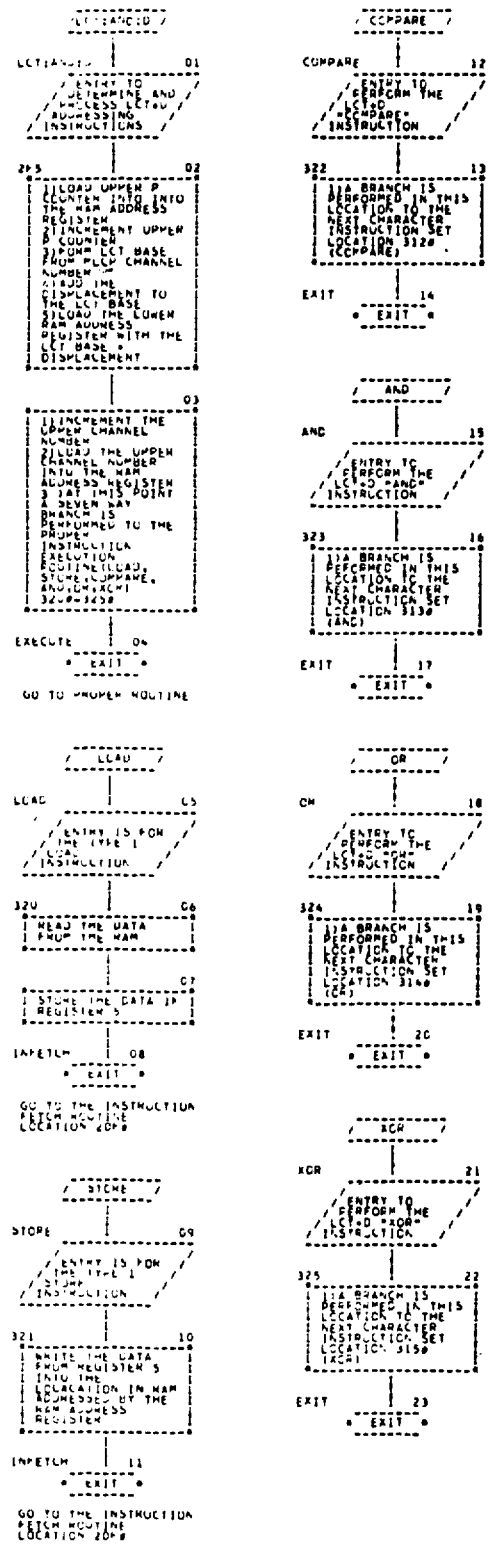
LCT and Displacement Addressing
Instruction Routines

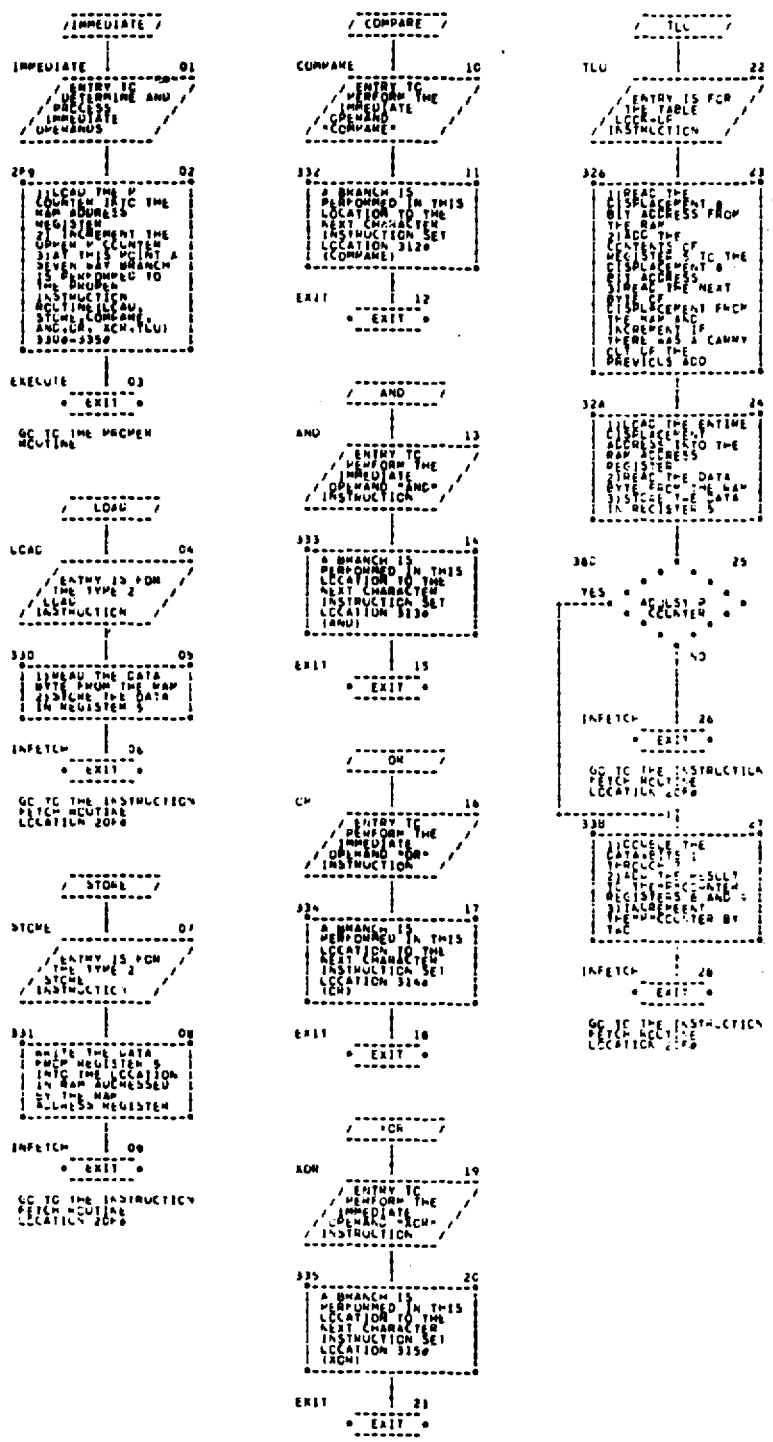
Immediate Operand Instruction Routines

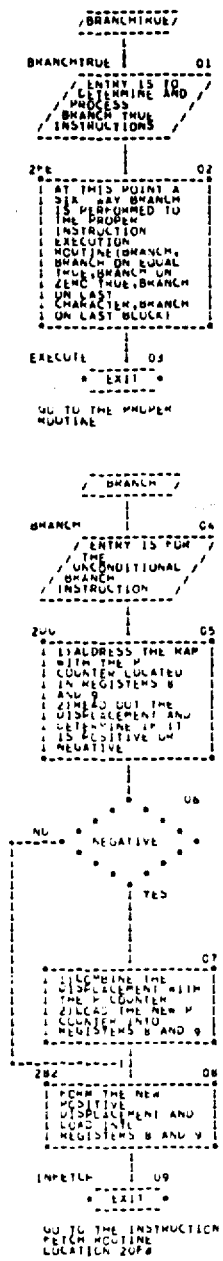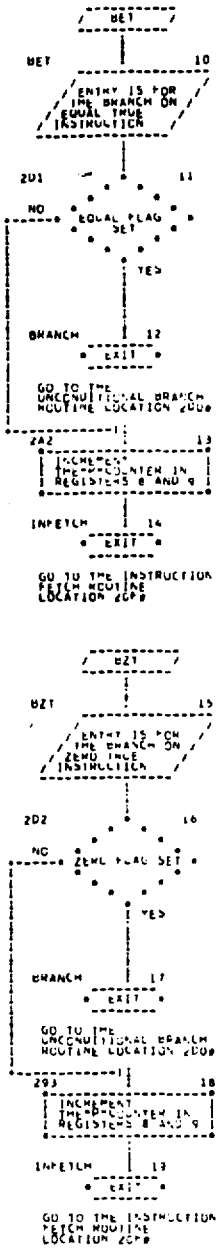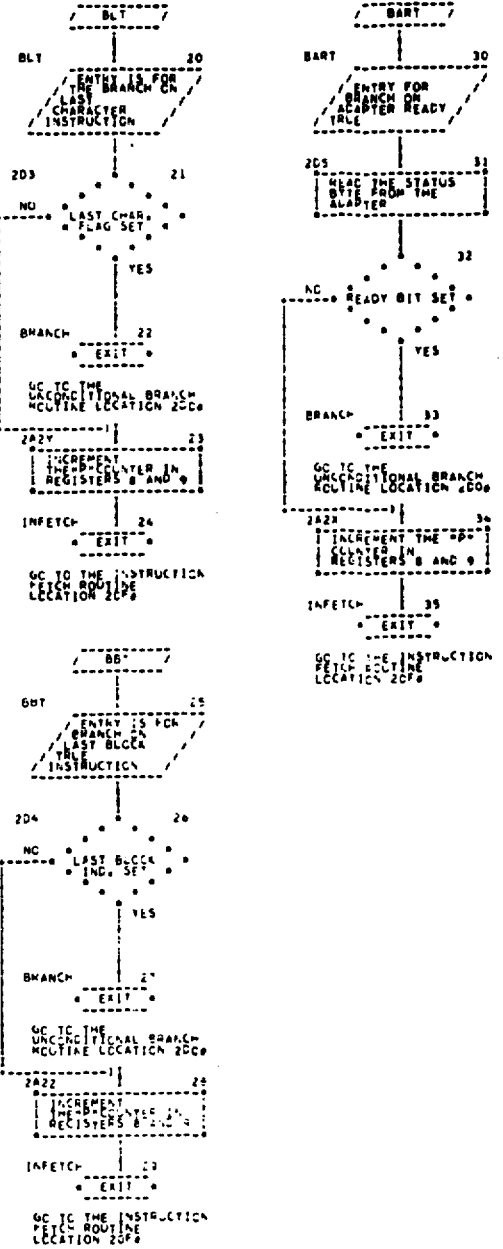
Branch True Instruction Routines

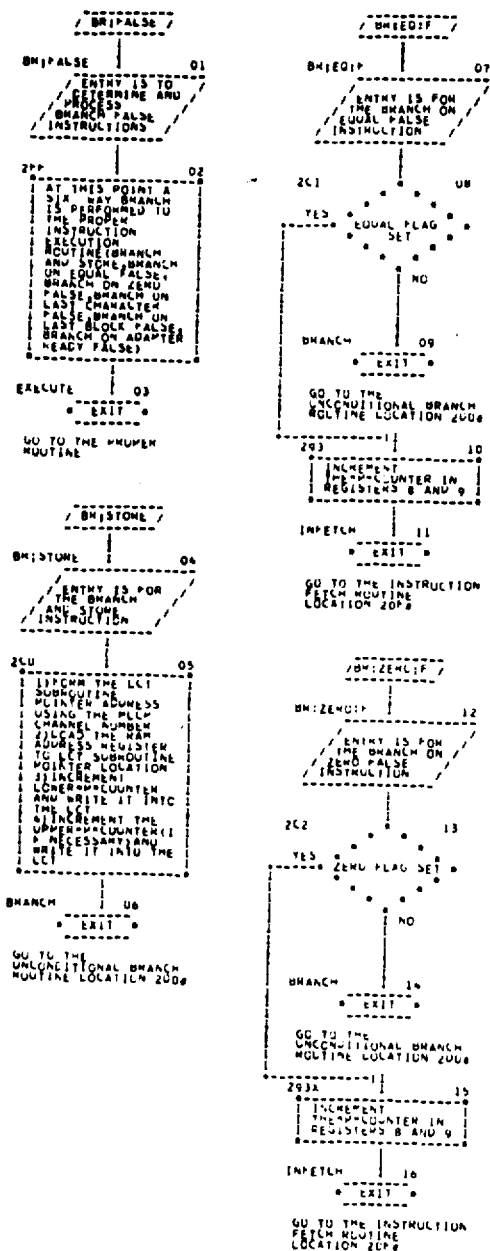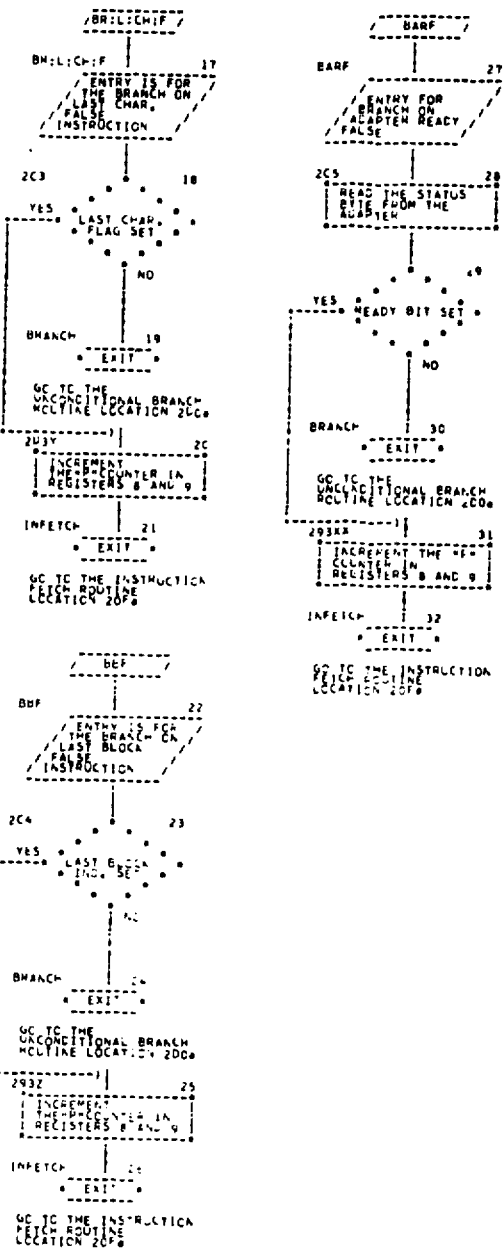
Branch False Instruction Routines

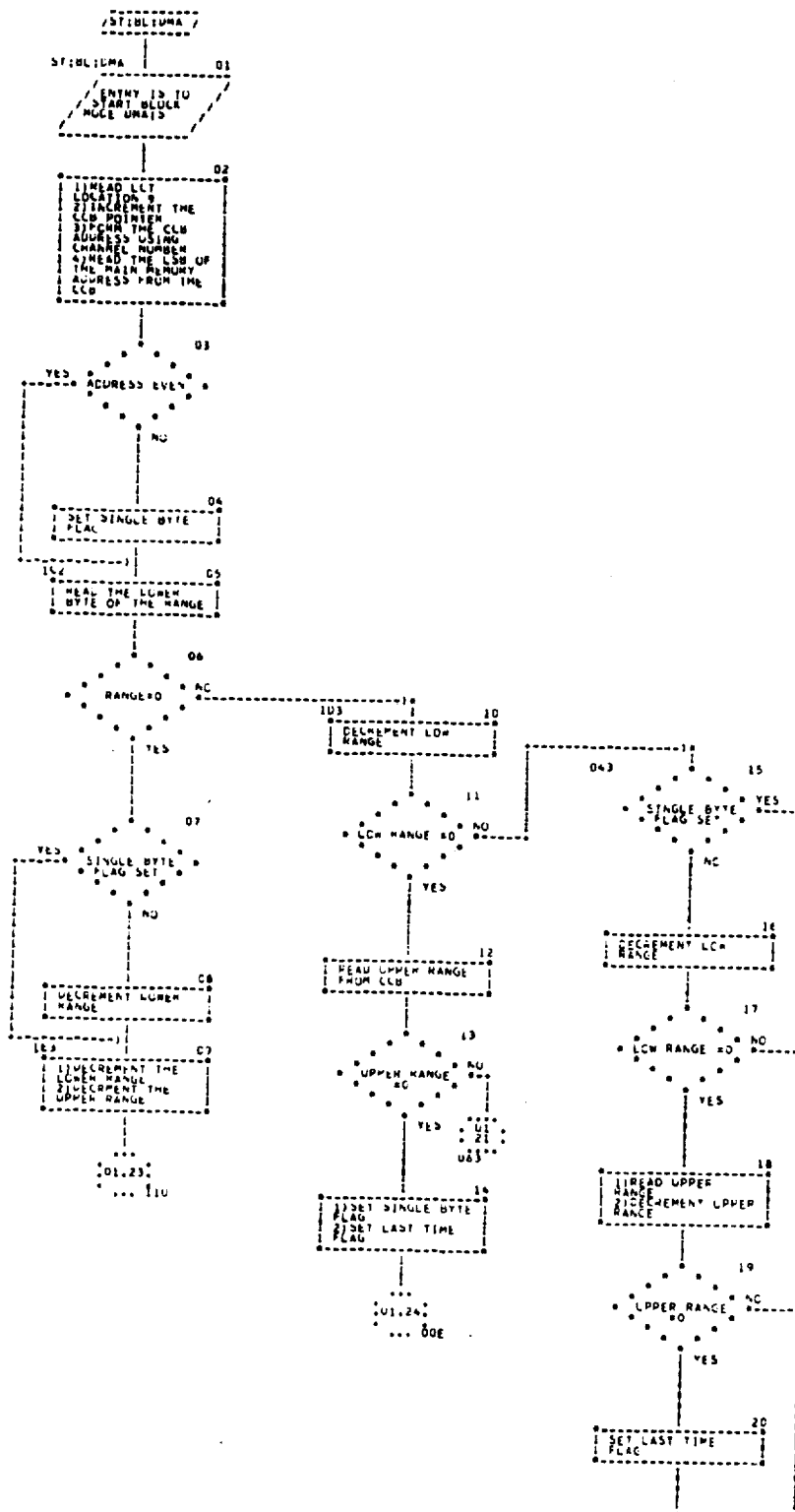
Block Mode DMA Routine

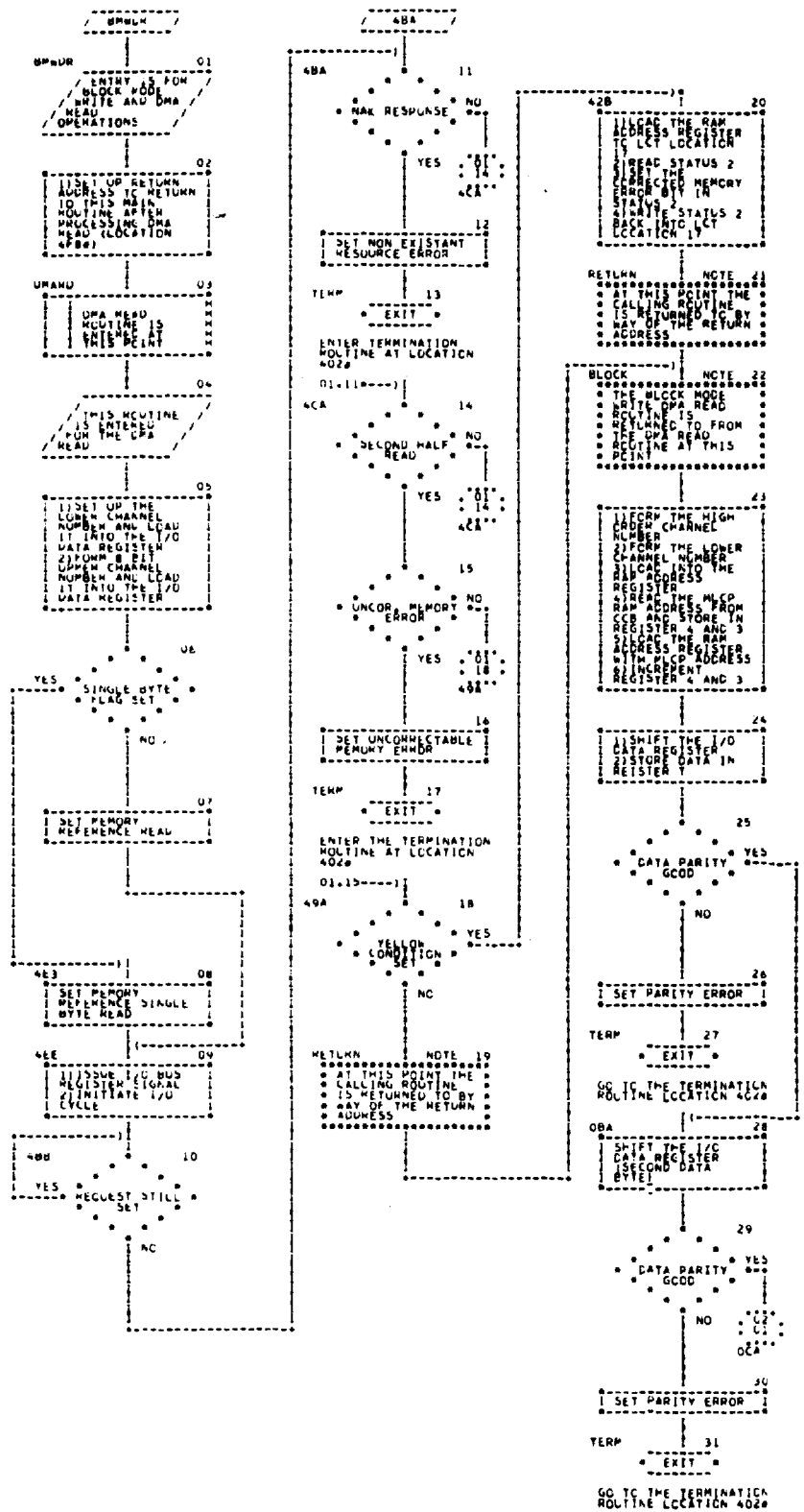
Block Mode Write DMA Read/DMA Read Routines (Sheet 1 of 2)

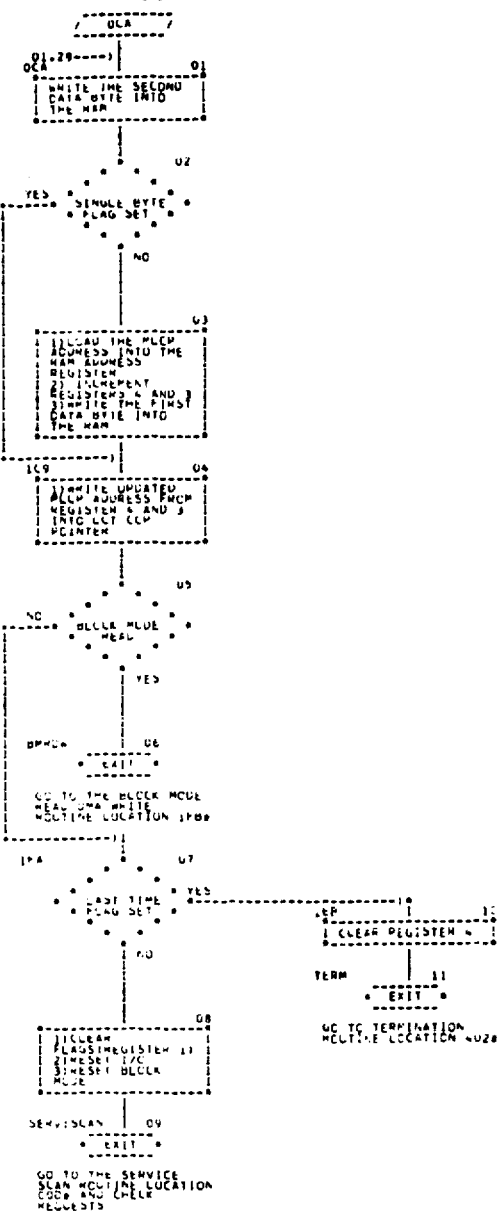
Block Mode Write DMA Read/DMA Read Routines (Sheet 2 of 2)

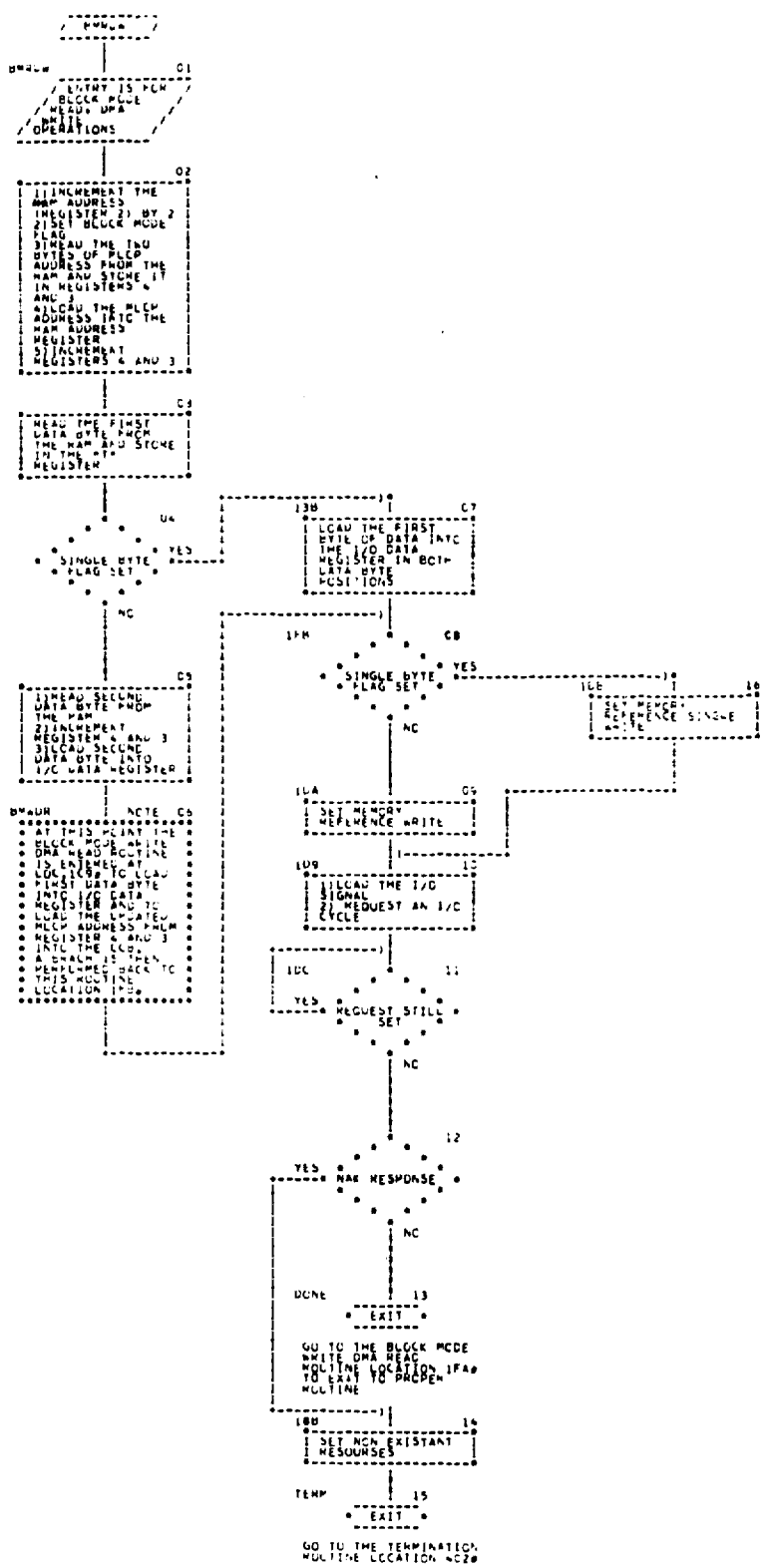
Block Mode Read DMA Write Routine

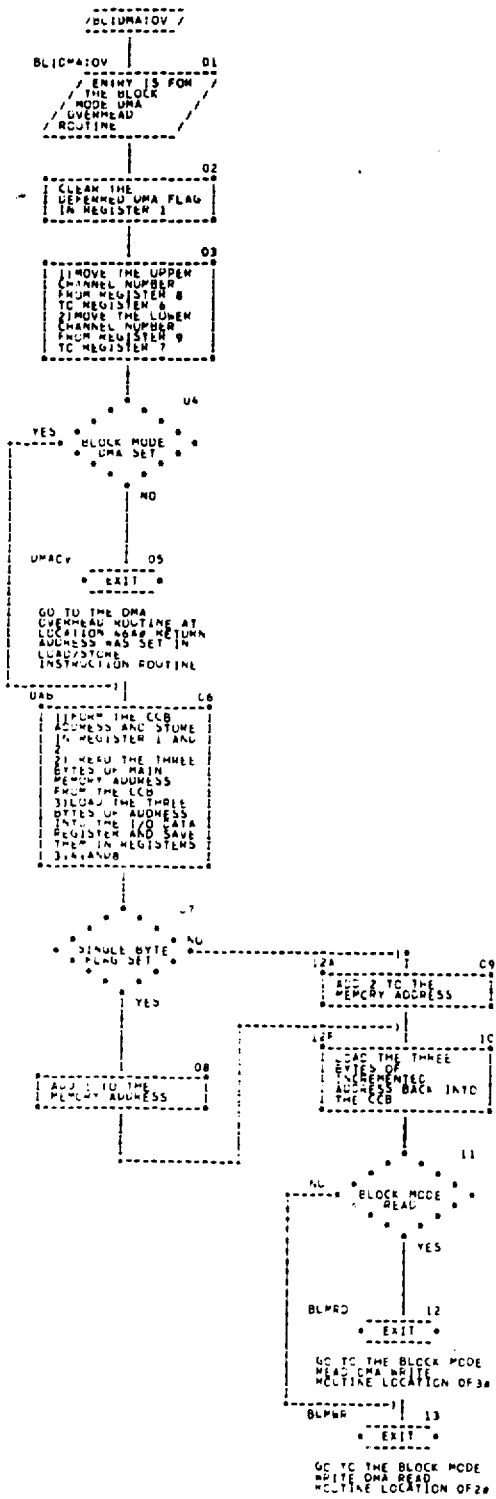
Deferred DMA Routine

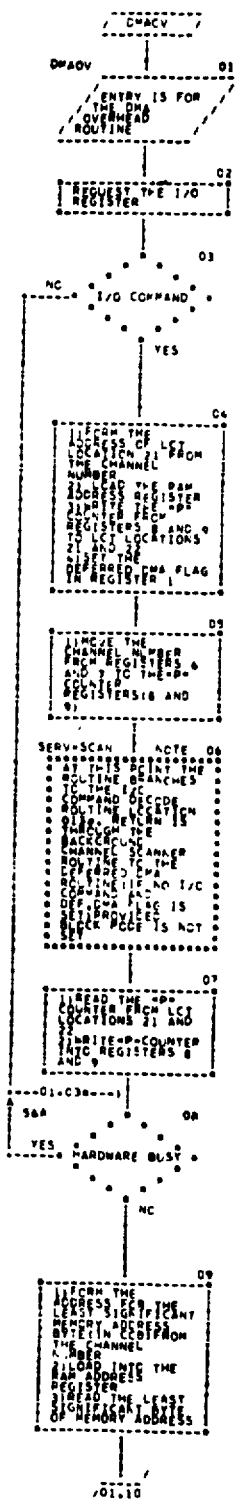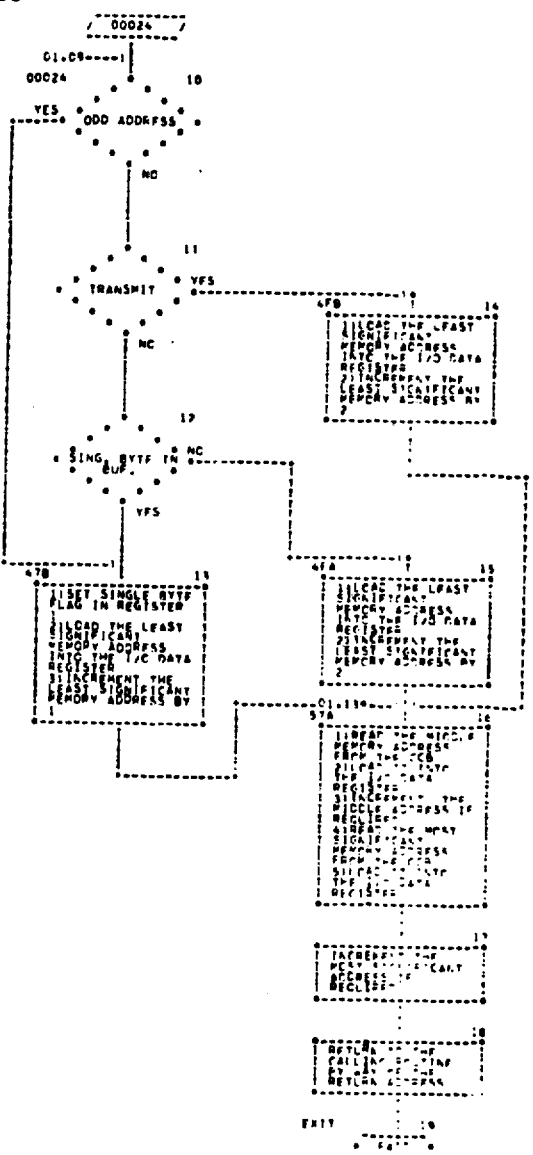
DMA Overhead Routine

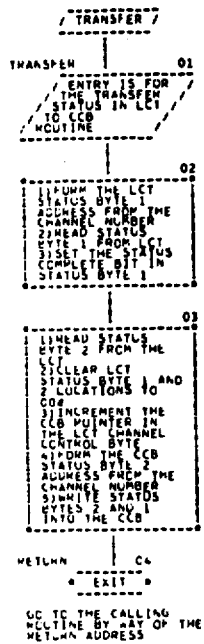
Transfer Status in LCT to CCB Routines

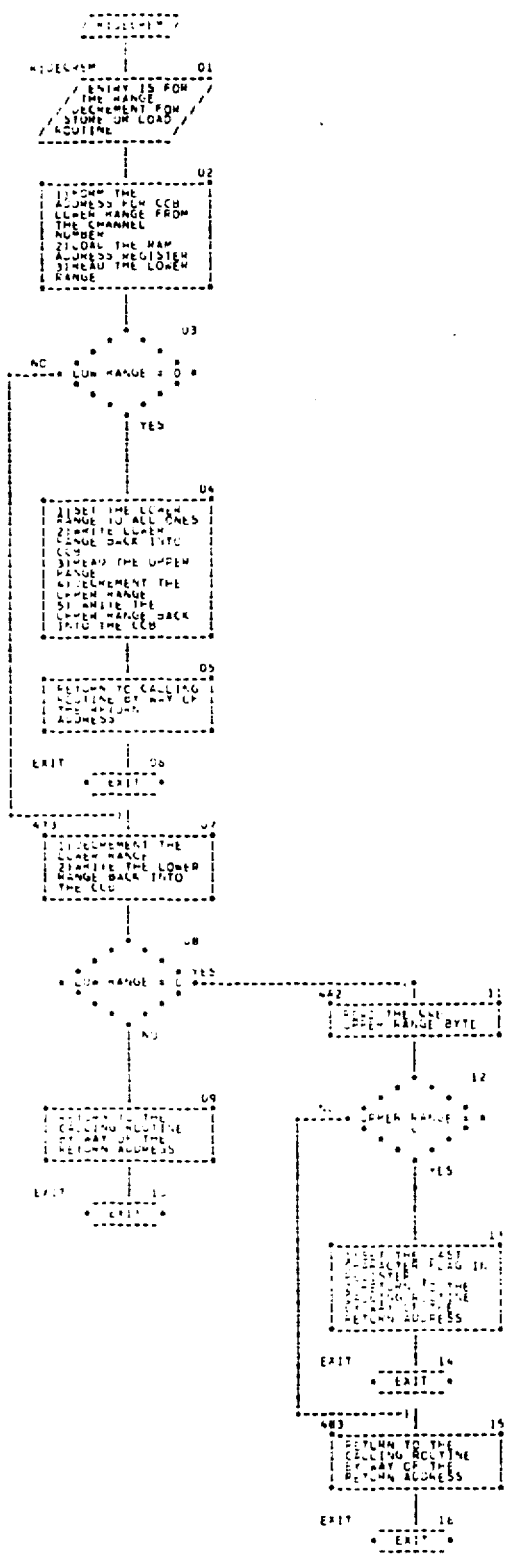
Range Decrement Routine

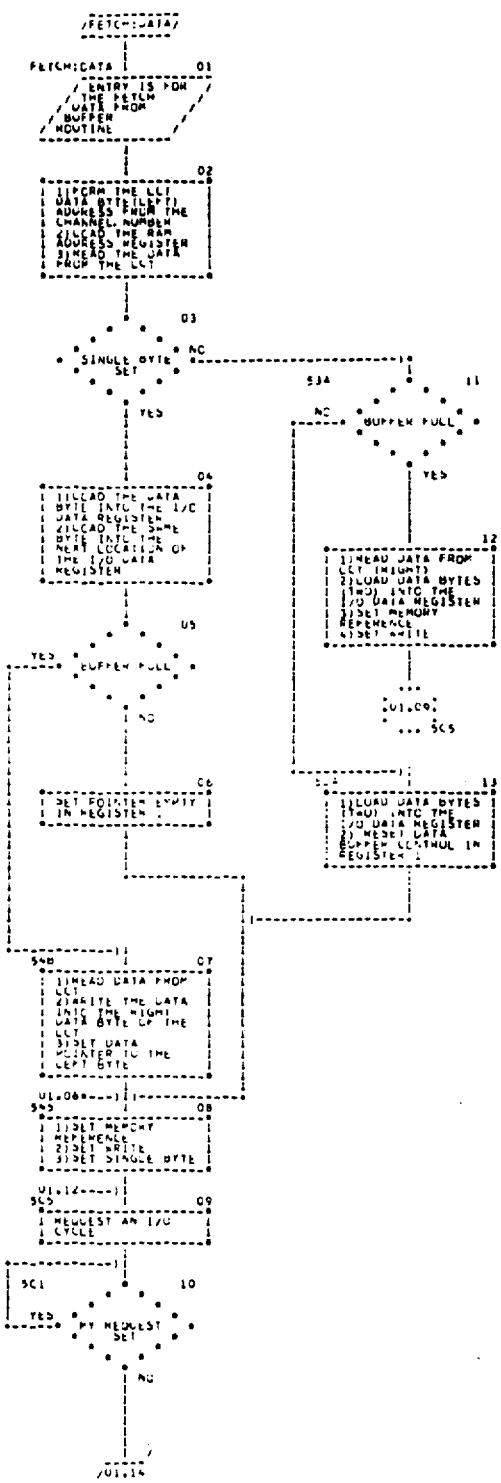
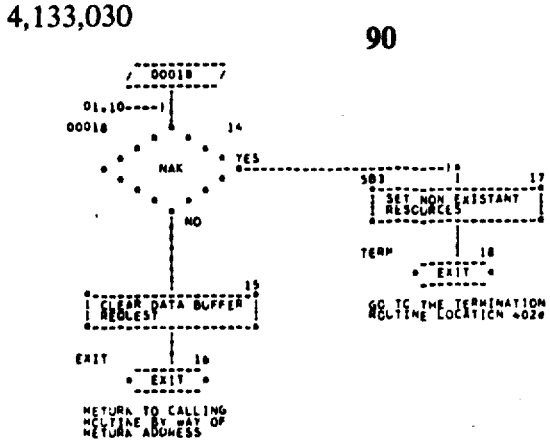
Fetch Data From Buffer Routine

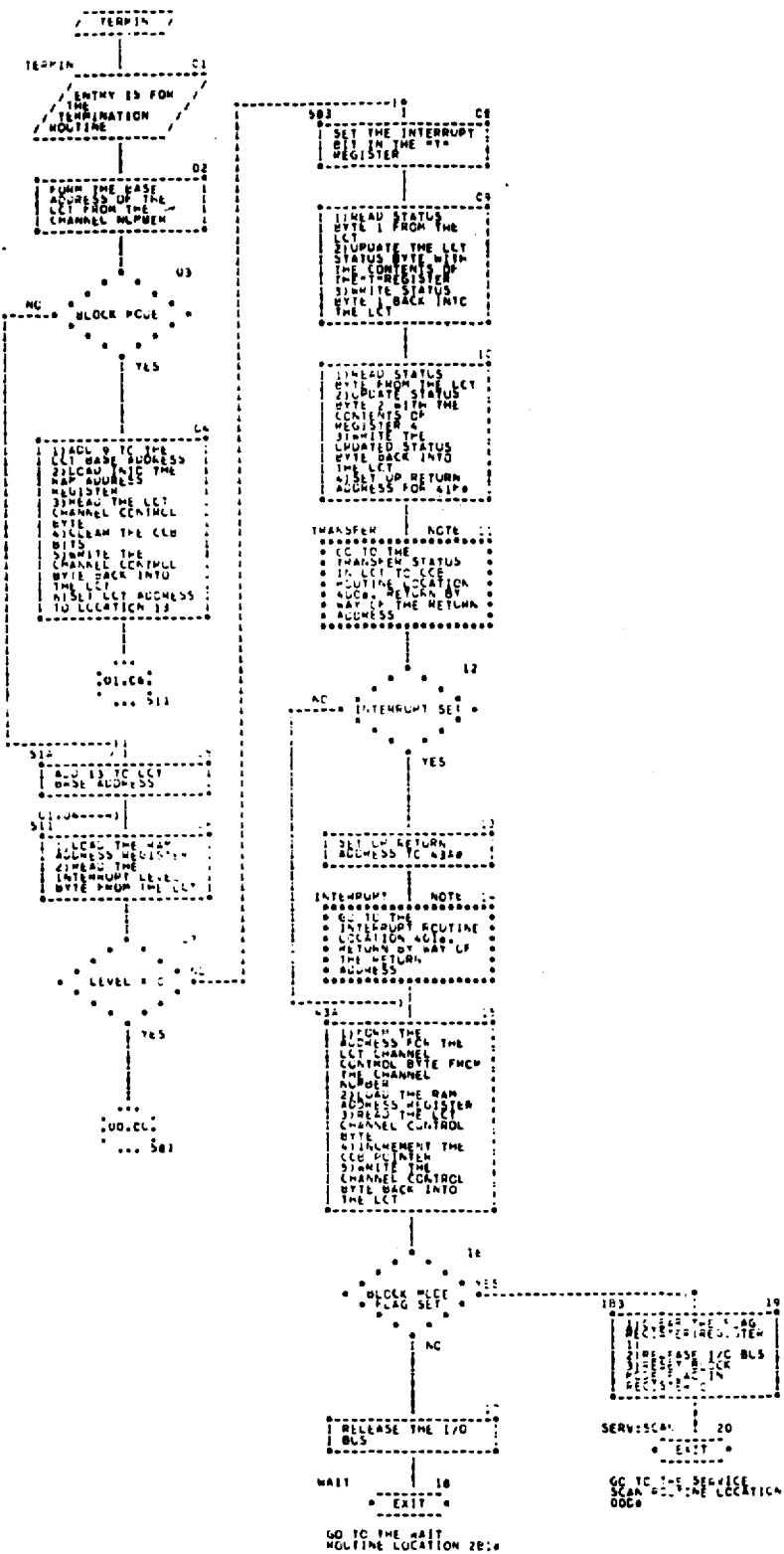
Termination Routine

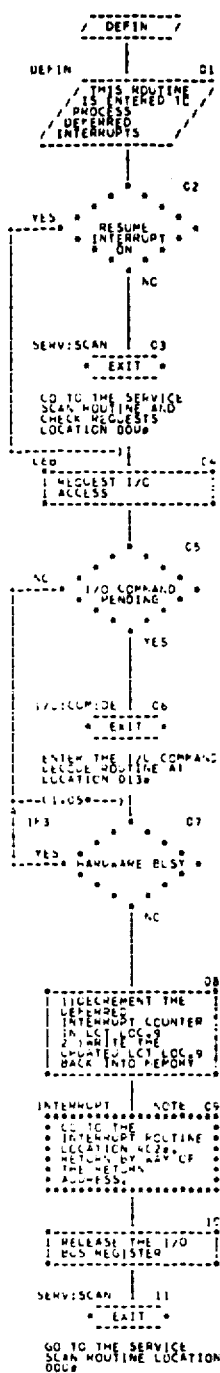
Deferred Interrupt Routine
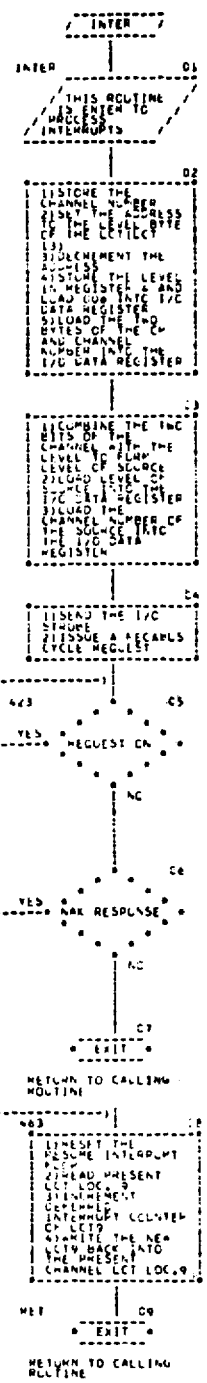
Interrupt Routine

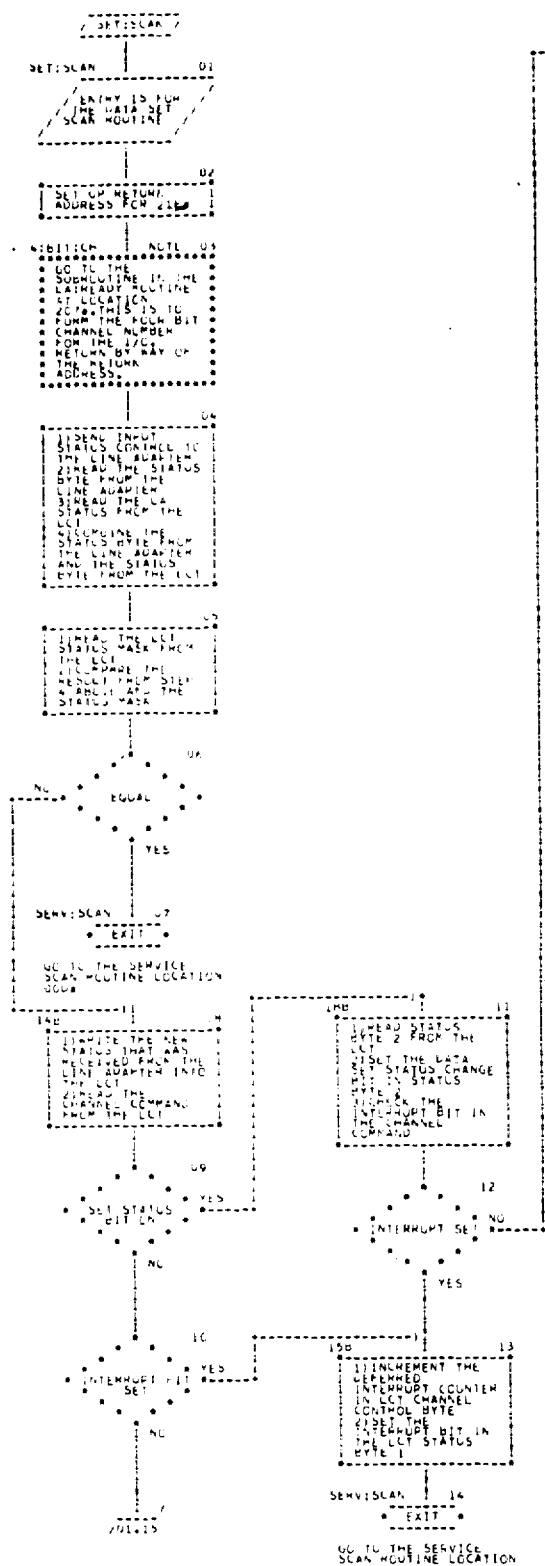
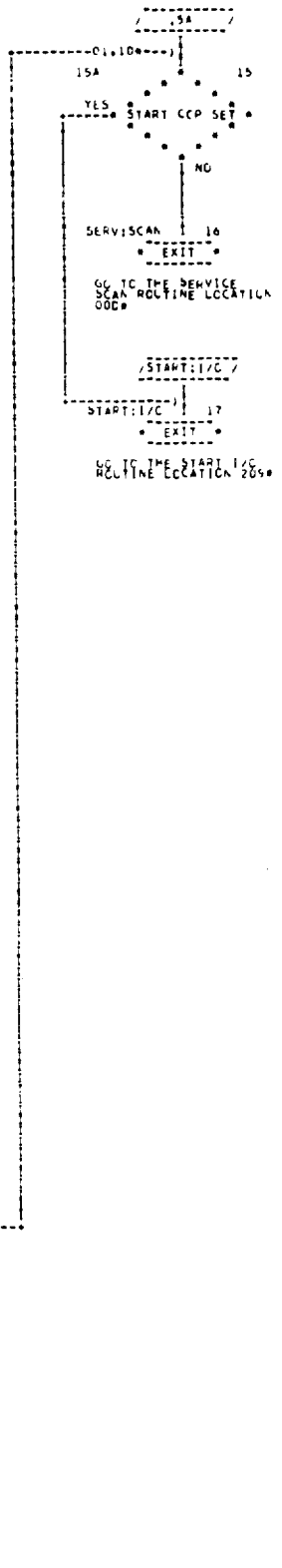
Data Set Scan Routine

Having described the invention, what is claimed as new and novel and for which it is desired to secure Letters Patent is:

1. A data processing system for transferring data included in a message comprising:
   A. a main memory having a plurality of data blocks for storing said data, each of said data blocks having a starting address and a range indicative of the number of storage locations in said block;
   B. a plurality of communication channels;
   C. an auxiliary memory including a plurality of control block storage locations for storing control information indicating the starting address, range and status of said data blocks in said main memory; and
   D. means for transferring said message data between said data blocks in said main memory and said communcation channels under the control of said control information, said means for transferring including:
      1. means for allocating a predetermined number of said control blocks in said auxiliary memory for each said channel,
      2. means for loading said message data in said data block indicated by the starting address in a first said control block,
      3. means for switching to another control block upon completing the transfer of data as indicated by the range in said first control block, and
      4. means for generating an interrupt signal upon completing the transfer of all said message data as indicated by said status in the last said control block utilized to control the transfer of said message data.

2. A system as in claim 1 further comprising:
   A. a central processing unit coupled to transfer control information with said means for transferring;
   B. first means for enabling said control block storage locations to be loaded with said control information under the control of said unit; and
   C. second means for enabling the control information in said control block storage locations to be accessed by said unit in order to determine the status thereof.

3. A system as in claim 2 further comprising:
   A. means for receiving a load command from said unit directing said first means for enabling to load said control information in storage locations in said auxiliary memory representing a selected control block; and
   B. means for receiving a status command from said unit directing said second means for enabling to access the status of said control block.

4. A system as in claim 3 further comprising means for disabling the receipt of said load command if the number of said control blocks loaded is equal to said predetermined number.

5. A system as in claim 3 further comprising means for disabling the receipt of said status command if there are no said control blocks loaded for the particular said channel for which said status command is received.

6. A system as in claim 3 further comprising:
   A. first means for indicating that the number of said control blocks allocated for a channel which have received control information in response to said load commands, is equal to said predetermined number;
   B. second means for indicating that none of said control blocks allocated for said channel have been loaded with control information in response to said load commands;
   C. third means, responsive to said first means for indicating and to a further load command from said unit, for indicating to said unit that said further load command is rejected; and
   D. fourth means, responsive to said second means for indicating and to a further status command from said unit, for indicating to said unit that said further status command is rejected.

7. A system as in claim 6 wherein:
   A. said first means for enabling includes a load counter and means for incrementing the count in said load counter each time a load command is received;
   B. said second means for enabling includes a status counter and means for incrementing the count in said status counter each time a status command is received;
   C. said first and second means for indicating include: a control block counter; means for changing the value of said control block counter in a first direction each time a load command is received; means for changing the value of said control block counter in a second direction each time a status command is received; and
   D. said third and fourth means for indicating include acknowledgement means for enabling the receipt of said load and status commands depending upon the value in said control block counter.

8. A system as in claim 7 wherein said acknowledgement means is constructed and arranged to enable the receipt of a said load command if said value in said control block counter at the time of receipt of a load command does not equal said predetermined value and wherein said acknowledgement means further operates to enable the receipt of said status command if the value in said control block counter is not equal to zero.

9. A system as in claim 8 wherein said change in said first direction causes an increase in the value in said control block counter and wherein said change in said second direction causes a decrease in the value in said control block counter.

10. A system as in claim 7 wherein said first and second means for enabling further comprise:
    A. means for addressing said auxiliary memory means to access said control block locations in accordance with the counts in said load counter and said status counter.

11. A system as in claim 10 further comprising:
    A. means included in said means for receiving said load and status commands for translating each said command; and
    B. means for addressing given ones of said control block storage locations in response to a translated subportion of each said command.

12. A system as in claim 7 further comprising:
    A. a local memory; and
    B. means for storing in said local memory said values in said load, status, and control block counters, in the locations allocated for a particular channel, each time said load or status command is received for said particular channel.

13. A system as in claim 12 wherein said acknowledgement means comprises:
A. means for storing in said local memory an indication that one of said load or status commands will not be received by said means for transferring as indicated by the value in said control block counter; and
B. means responsive to said stored indication for indicating to said unit that said command will not be received, thereby enabling the system to proceed with other operations with minimal delay.

14. A system as in claim 1 wherein said means for switching is also enabled in response to an end message character in a said message.

* * * * *